US010969805B2

(12) United States Patent
Lange et al.

(10) Patent No.: US 10,969,805 B2
(45) Date of Patent: Apr. 6, 2021

(54) PAINT SPRAYER DISTRIBUTED CONTROL AND OUTPUT VOLUME MONITORING ARCHITECTURES

(71) Applicant: Graco Minnesota Inc., Minneapolis, MN (US)

(72) Inventors: Christopher M. Lange, Shoreview, MN (US); Nicholas A. Pagano, Blaine, MN (US); Benjamin R. Godding, St. Cloud, MN (US); Mark T. Weinberger, Mounds View, MN (US); Michael J. Mansheim, Burnsville, MN (US); Nicholas H. Reath, Anoka, MN (US); Andrew J. Kopel, Stanchfield, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 66 days.

(21) Appl. No.: 16/579,424

(22) Filed: Sep. 23, 2019

(65) Prior Publication Data
US 2020/0050223 A1 Feb. 13, 2020

Related U.S. Application Data

(63) Continuation-in-part of application No. 15/910,279, filed on Mar. 2, 2018, which is a continuation-in-part
(Continued)

(51) Int. Cl.
*G05D 16/20* (2006.01)
*G05D 23/19* (2006.01)
(Continued)

(52) U.S. Cl.
CPC ....... *G05D 16/2066* (2013.01); *B05B 7/0408* (2013.01); *B05B 7/166* (2013.01);
(Continued)

(58) Field of Classification Search
CPC .................. G05B 15/02; H04Q 9/00
(Continued)

(56) References Cited

U.S. PATENT DOCUMENTS 5,260,875 A * 11/1993 Tofte .................... A01B 79/005
111/903
6,704,617 B2   3/2004 Cherfane et al.
(Continued)

FOREIGN PATENT DOCUMENTS

JP    2006250049 A    9/2006
KR  20120086800 A    8/2012
(Continued)

OTHER PUBLICATIONS

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards committee of the IEEE Computer Society, Dec. 28, 2012, 628 Pages.
(Continued)

*Primary Examiner* — Md Azad
(74) *Attorney, Agent, or Firm* — Shumaker & Sieffert, P.A.

(57) ABSTRACT

A sprayer for spraying fluid includes a pump, a motor that drives the pump, a drive cycle indicator, a wireless module configured to send and receive information, and control circuitry. The drive cycle indicator outputs an indication of cycle status of the pump. The control circuitry is configured to receive the plurality of cycle status indications of the pump, determine a plurality of output values representing paint spray fluid output volume over a plurality of time windows based on the plurality of cycle status indications of the pump, store the plurality of output values in memory, and cause the wireless module to transmit one or more of the stored plurality of output values externally from the sprayer.

31 Claims, 24 Drawing Sheets

Related U.S. Application Data of application No. 14/766,712, filed as application No. PCT/US2014/015698 on Feb. 11, 2014, now Pat. No. 9,939,822.

(60) Provisional application No. 61/763,252, filed on Feb. 11, 2013, provisional application No. 62/735,524, filed on Sep. 24, 2018, provisional application No. 62/755,181, filed on Nov. 2, 2018, provisional application No. 62/789,219, filed on Jan. 7, 2019, provisional application No. 62/792,107, filed on Jan. 14, 2019.

(51) Int. Cl.
  *G05B 15/02* (2006.01)
  *B05B 7/04* (2006.01)
  *B05B 7/16* (2006.01)
  *H04Q 9/00* (2006.01)
  *B05B 12/00* (2018.01)

(52) U.S. Cl.
  CPC .......... *B05B 7/1613* (2013.01); *B05B 12/006* (2013.01); *G05B 15/02* (2013.01); *G05D 23/1919* (2013.01); *H04Q 9/00* (2013.01)

(58) Field of Classification Search
  USPC ......................................................... 700/282
  See application file for complete search history.

(56) References Cited

U.S. PATENT DOCUMENTS

| | | |
|---|---|---|
| 7,610,113 B2 | 10/2009 | Cocciadiferro et al. |
| 7,643,910 B1 * | 1/2010 | Gustafson ............ G05D 7/0688 |
| | | 700/283 |
| 8,561,921 B1 | 10/2013 | Showman et al. |
| 8,649,909 B1 | 2/2014 | Phillips |
| 9,939,822 B2 | 4/2018 | Lange et al. |
| 2001/0000611 A1 * | 5/2001 | Cline ........................ B05B 7/32 |
| | | 222/1 |
| 2002/0085054 A1 | 7/2002 | Tokie |
| 2004/0124255 A1 | 7/2004 | Heerdt |
| 2006/0027253 A1 | 2/2006 | Kaiser |
| 2007/0090132 A1 | 4/2007 | Williams et al. |
| 2008/0311898 A1 | 12/2008 | Benco et al. |
| 2010/0322795 A1 * | 12/2010 | Jones .................... H02P 25/032 |
| | | 417/415 |
| 2010/0332149 A1 | 12/2010 | Scholpp |
| 2012/0156336 A1 | 6/2012 | Hansen et al. |
| 2012/0158336 A1 | 6/2012 | Duchamp et al. |
| 2012/0163781 A1 | 6/2012 | Sedlacek et al. |
| 2012/0282121 A1 | 11/2012 | Kieffer et al. |
| 2015/0316908 A1 | 11/2015 | Eller et al. |
| 2016/0008834 A1 * | 1/2016 | Brudevold ............ B05B 7/1693 |
| | | 427/8 |
| 2016/0153441 A1 * | 6/2016 | Fehr ........................ F04B 53/14 |
| | | 73/168 |
| 2016/0184846 A1 | 6/2016 | Pellin et al. |
| 2018/0192167 A1 | 7/2018 | Lange et al. |
| 2020/0230632 A1 * | 7/2020 | Kieffer .................. B05B 12/085 |

FOREIGN PATENT DOCUMENTS

| | | |
|---|---|---|
| KR | 101189561 B1 | 10/2012 |
| WO | 2016010597 A1 | 1/2016 |
| WO | 2016192024 A1 | 12/2016 |
| WO | 2017222666 A1 | 12/2017 |

OTHER PUBLICATIONS

International Search Report and Written Opinion of International Application No. PCT/US2019/052463, dated Dec. 18, 2019, 17 pp.

* cited by examiner

| | Name | Device Model | Status | Daily Material Usage | Daily Actual Spray Time | Daily Power On Time | Daily Cycle Count | Cycle Count | Temp A (°F) | Temp B (°F) | Hose (°F) | Pressure A | Pressure B | Last Device Data | Data Location |
|---|---|---|---|---|---|---|---|---|---|---|---|---|---|---|---|
| – | Device 2 | E-XP21 | ○ | 26.5 | 0.7 | 1.1 | 1230 | 30 | 117/32 | 118/32 | 119/32 | 1170/256 | 1175/256 | Feb 4, 2014 1:02:27 PM | J Y E ⚠ |
| | Device Serial Number: 955.213.6316.128.425<br>Inlet Pressure A/B: 89.0/90.0<br>Inlet Temperature A/B: 73.0/80.0<br>Device Ambient Temperature: 78.980.2014-02-04 12:57:33<br>Last GPS Update:<br>Device Properties | | | | | | | | | | | | | | |
| – | Device | | ○ | 1902.0 | 13.0 | 13.0 | 31307 | 152668 | 69/70 | 68/70 | 71/70 | 958/– | 1062/– | Feb 4, 2014 1:02:20 PM | J Y ⚠ |
| | Device Serial Number: 955.213.6523.68.931<br>Last GPS Update: 2014-02-04 12:51:59<br>Device Properties | | | | | | | | | | | | | | |
| + | Spray Rig 1 | E-30 | ● | 5.0 | 1.8 | 5.0 | 177 | 41296 | 122/128 | 130/125 | 127/120 | 1101/1100 | 1249/1100 | Feb 4, 2014 4:59:10 AM | J Y ⚠ |
| + | Spray Rig 2 | E-30 | ○ | 20.0 | 7.5 | 13.0 | 727 | 59851 | 124/125 | 124/125 | 127/125 | 1256/– | 1256/– | Feb 4, 2014 1:02:55 PM | J Y ⚠ |
| + | Spray Rig 3 | H-95 | ○ | 21.0 | 7.7 | 9.0 | 349 | 55273 | 109/110 | 124/125 | 177/195 | 8073/1100 | 1256/– | Feb 4, 2014 1:02:52 PM | J Y ⚠ |
| + | Spray Rig 4 | E-30 | ○ | 5.5 | 4.8 | 9.0 | 469 | 55566 | 109/110 | 112/110 | 111/110 | 8073/1100 | 1170/1100 | Feb 4, 2014 1:02:32 PM | J Y ⚠ |
| + | Spray Rig 5 | E-XP2 | ● | 6.0 | 3.2 | 7.0 | 297 | 47769 | –/– | –/– | –/– | –/– | –/– | Feb 4, 2014 8:59:53 AM | J Y ⚠ |

FIG. 3A

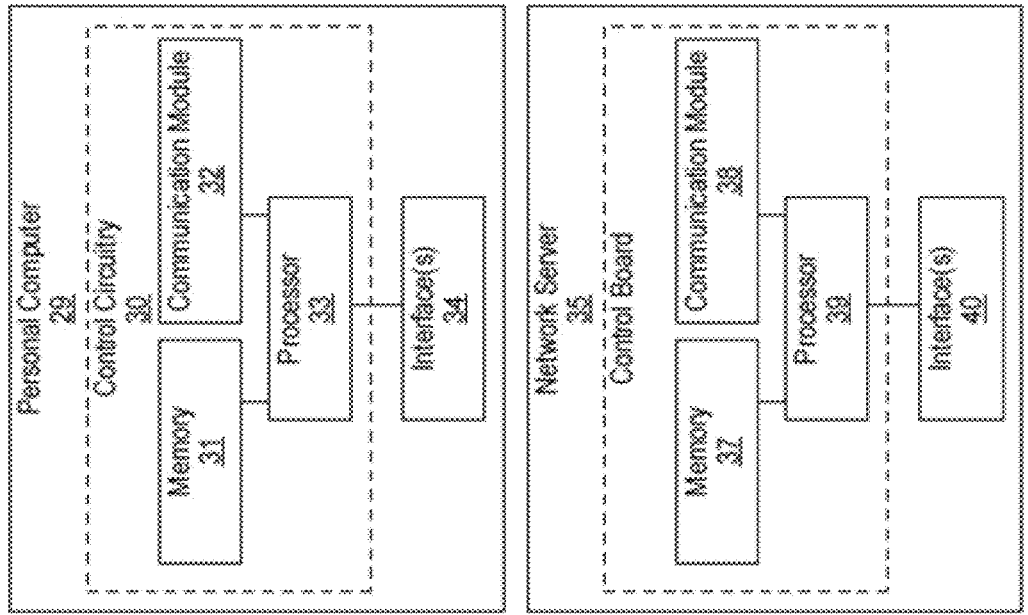
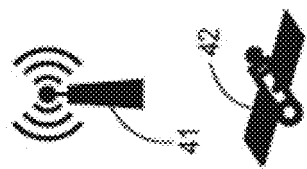
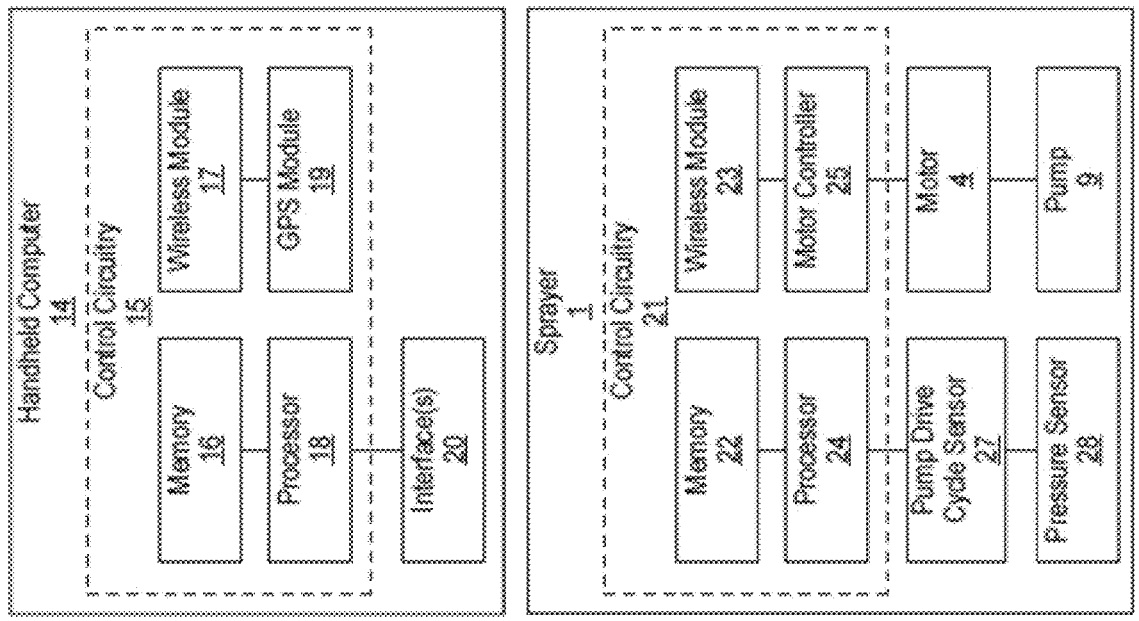
FIG. 7

Sprayer 1

| Window # | Date | Time | Spray Volume | Cleaning Volume | Avg. Pressure | Job | Lifetime Gallons | Maintenance Threshold Count |
|---|---|---|---|---|---|---|---|---|
| 13256 | 8/5/2018 | 6am-7am | 0.0 | 0.0 | N/A | High School | 202.1 | 88.0 |
| 13257 | 8/5/2018 | 7am-8am | 4.5 | 0.0 | 3,000 | High School | 206.6 | 92.5 |
| 13258 | 8/5/2018 | 8am-9am | 5.4 | 0.0 | 2,800 | High School | 212.0 | 97.9 |
| 13259 | 8/5/2018 | 9am-10am | 1.8 | 0.0 | 2,600 | High School | 213.8 | 99.7 |
| 13260 | 8/5/2018 | 10am-11am | 0.3 | 5.1 | 2,200 | High School | 214.1 | 100.0 |
| 13261 | 8/5/2018 | 11am-12pm | 0.0 | 0.0 | N/A | N/A | 214.1 | 100.0 |
| 13262 | 8/5/2018 | 12pm-1pm | 0.0 | 0 | N/A | N/A | 214.1 | 100.0 |
| 13263 | 8/5/2018 | 1pm-2pm | 2.6 | 0 | 2,200 | 12 Circle St. | 216.7 | 102.6 |
| 13264 | 8/5/2018 | 2pm-3pm | 3.5 | 0 | 2,200 | 12 Circle St. | 220.2 | 106.1 |
| 13265 | 8/5/2018 | 3pm-4pm | 3.4 | 0 | 2,200 | 12 Circle St. | 223.6 | 109.5 |
| 13266 | 8/5/2018 | 4pm-5pm | 1.0 | 5.0 | 2,200 | 12 Circle St. | 224.6 | 110.5 |
| 13267 | 8/5/2018 | 5pm-6pm | 0.0 | 0.0 | N/A | N/A | 224.6 | 110.5 |
| | | Daily | 22.5 | 10.1 | 2,400 | | | |

Maintenance Notice
Sprayer 1
Replace packings
100 Gallons
10-1am, Aug 6
Job: High School

FIG. 18

Job: High School
Location: 20 Central Ave

| Date | Time | Sprayer 1 | | | | Sprayer 2 | | | | Hourly Spray Volume Total | Total Job Spray Volume |
|---|---|---|---|---|---|---|---|---|---|---|---|
| | | Spray Volume | Avg. Pressure | Cleaning Volume | Spray Volume | Avg. Pressure | Cleaning Volume | | | | |
| 8/6/2018 | 6am-7am | 0.0 | NA | 0.0 | 0.0 | NA | 0.0 | | | 0.0 | 35.5 |
| 8/6/2018 | 7am-8am | 3.5 | 3,000 | 0.0 | 0.0 | NA | 0.0 | | | 3.5 | 39.0 |
| 8/6/2018 | 8am-9am | 3.0 | 2,600 | 0.0 | 0.0 | 2,500 | 0.0 | | | 3.0 | 42.0 |
| 8/6/2018 | 9am-10am | 1.8 | 2,600 | 0.0 | 1.8 | 2,500 | 0.0 | | | 3.6 | 46.2 |
| 8/6/2018 | 10am-11am | 0.3 | 2,200 | 0.0 | 0.3 | 2,500 | 0.0 | | | 0.6 | 46.8 |
| 8/6/2018 | 11am-12pm | 0.0 | NA | 0.0 | 0.0 | NA | 0.0 | | | 0.0 | 46.8 |
| 8/6/2018 | 12pm-1pm | 4.3 | 2,300 | 0.0 | 4.3 | 2,800 | 0.0 | | | 8.6 | 55.4 |
| 8/6/2018 | 1pm-2pm | 2.6 | 2,300 | 0.0 | 2.6 | 2,600 | 0.0 | | | 5.2 | 60.6 |
| 8/6/2018 | 2pm-3pm | 3.5 | 2,400 | 0.0 | 3.5 | 2,600 | 0.0 | | | 7.0 | 67.6 |
| 8/6/2018 | 3pm-4pm | 3.4 | 2,400 | 4.5 | 3.4 | 2,600 | 3.2 | | | 6.8 | 74.4 |
| 8/6/2018 | 4pm-5pm | 1.0 | 2,400 | 0.0 | 0.0 | 2,600 | 0.0 | | | 1.0 | 75.4 |
| 8/6/2018 | 5pm-6pm | 0.0 | NA | 0.0 | 0.0 | NA | 0.0 | | | 0.0 | 75.4 |
| Daily | | 24.0 | 2467 | 4.5 | 16.9 | 2563 | 3.2 | | | 39.9 | |

Notice
2700 PSI Pressure
Limit Exceeded
Sprayer 1
3000 PSI
7-8am, Aug. 6
Job: High School Notice
Job Gallons
Exceeded
75 Gallons
4-5pm, Aug. 6
Job: High School

FIG. 19

PAINT SPRAYER DISTRIBUTED CONTROL AND OUTPUT VOLUME MONITORING ARCHITECTURES

This application is a continuation-in-part of U.S. application Ser. No. 15/910,279, filed Mar. 2, 2018, which is a continuation-in-part of U.S. application Ser. No. 14/766,712, filed Aug. 7, 2015, now U.S. Pat. No. 9,939,822, which is a National Stage entry of PCT Application No. PCT/US2014/015698, filed Feb. 11, 2014, which claims the benefit of U.S. Provisional Application No. 61/763,252, filed Feb. 11, 2013, which are hereby incorporated by reference in their entireties. This application also claims the benefit of U.S. Provisional Application 62/735,524, filed Sep. 24, 2018, U.S. Provisional Application 62/755,181, filed Nov. 2, 2018, U.S. Provisional Application 62/789,219, filed Jan. 7, 2019, and U.S. Provisional Application No. 62/792,107, filed Jan. 14, 2019, which are hereby incorporated by reference in their entireties.

BACKGROUND

The present disclosure relates generally to fluid dispensing systems. More specifically, this disclosure relates to displacement pumps for fluid spray systems.

Fluid dispensing systems, such as for spraying paint and other fluids, typically utilize axial displacement pumps to pull a fluid from a source and to drive the fluid downstream. The axial displacement pump includes a piston or diaphragm that is driven in a reciprocating manner along its longitudinal axis to pump the fluid and generate pressure sufficient for atomizing the fluid from a nozzle to generate a spray fan for applying the fluid to a surface.

SUMMARY

In one embodiment, a remote monitoring system comprises a fluid handling system and a communications module. The fluid handling system comprises a fluid delivery subsystem, at least one pressure sensor, at least one temperature sensor, and a fluid handling system processor. The fluid delivery subsystem is configured to pump and heat a fluid. The temperature and pressure sensors are disposed on the fluid delivery subsystem to sense temperatures and pressures of the fluid, respectively. The fluid handling system processor is configured to produce duty data and commanded pressures and temperatures for the fluid delivery subsystem, and to receive the sensed pressures and temperatures. The communications module is attached to the fluid handling system, and comprises a communications module processor and a transceiver. The communications module processor is configured to retrieve a first data set comprising the duty data, the commanded pressures and temperatures, and the sensed pressures and temperatures, and to produce a second data set that includes the first data set. The transceiver is disposed to transmit the second data set via a communication network to an end user-accessible data storage server.

In another embodiment, a remote monitoring system for a fluid applicator system is disclosed. The fluid applicator system is disposed to heat and pump spray fluid, and to transmit reports including sensed temperatures, pressures, and other operational parameters of the fluid applicator system via a wireless network. The remote monitoring system comprises a data storage server, and an end user interface. The data storage server is configured to receive and archive the reports. The end user interface is configured to provide a graphical user interface based on the reports. The graphical user interface illustrates a status of the fluid handling system, sensed and commanded temperatures of the fluid handling system, sensed and commanded pressures of the fluid handling system, and usage statistics of the fluid handling system.

In another embodiment, a remote monitoring system for use with a fluid applicator system is configured to pump two or more fluids, the fluid applicator system including an A-side fluid system with a A-side pump, a B-side fluid system with a B-side pump, and a heater system for the A-side fluid system and the B-side fluid system, wherein the remote monitoring system includes a communications module in communication with the fluid applicator system, the communications module including a communications module processor configured to retrieve a first data set comprising at least one commanded pressures or temperatures of the A- or B-side pumps or heaters, respectively, and further configured to produce a second data set and transmit the second data set from a transceiver via a communication network to an end user interface; and an end user interface disposed to provide a graphical user interface for displaying the second data set, wherein the end user interface receives the second data set sent by the transceiver. In some embodiments, the transceiver is configured to transmit the second data set from a transceiver via a cellular communication network to an end user interface. In some embodiments, the transceiver is configured to transmit the second data set from a transceiver via a wireless communication network to an end user interface. In some embodiments, a cellular device running an appropriate task-specific software application is configured to display the end user interface. In some embodiments, the end user interface is displayed on a wireless device running an appropriate task-specific software application. In some embodiments, the heater system comprises a single heater shared by the A-side fluid system and the B-side fluid system. In some embodiments, the heater system comprises an A-side heater and a separate B-side heater disposed within the A-side and B-side fluid systems, respectively.

In one example, the disclosure describes a spray system comprising a hand portable paint sprayer for spraying spray fluid, the sprayer comprising a piston pump that outputs paint under pressure for spraying, a motor that drives the pump, a drive cycle indicator configured to output a plurality of cycle status indications of the pump, a wireless module configured to wirelessly send and receive information, and control circuitry configured to receive the plurality of cycle status indications of the pump, determine a plurality of output values representing paint spray output volume over a plurality of time windows based on the plurality of cycle status indications of the pump, store the plurality of output values in memory, and cause the wireless module to transmit one or more of the stored output values externally from the sprayer.

In one example, the disclosure describes a method for tracking fluid volume, the method comprising outputting, with a pump of a sprayer, spray paint under pressure for spraying, generating a plurality of cycle status indications of the pump, determining, with control circuitry of the sprayer, a plurality of output values representing paint spray output volume over a plurality of time windows based on the plurality of cycle status indications of the pump, and transmitting, with a wireless module of the sprayer, one or more of the plurality of output values externally from the sprayer.

In one example, the disclosure describes a system for usage monitoring of a sprayer, the system comprising a sprayer for spraying fluid, the sprayer comprising memory configured to store a plurality of fluid output values for the sprayer, the plurality of fluid output values representing fluid output volumes of the sprayer over time and a handheld computer device configured to receive the plurality of fluid output values from the sprayer and configured to operate in an accessible mode in which the handheld computer device is in a first location where wireless connectivity, via a continuous or near continuous communication path, to a network server is accessible or operate in an inaccessible mode in which the handheld computer device is in a second location out of range of the continuous or near continuous communication path to the network server. In the accessible mode, the handheld computer device is configured to transmit at least some of the plurality of fluid output values to the network server. In the inaccessible mode, the handheld computer device is configured to receive at least some of the fluid output values from the sprayer, store the received fluid output values in memory of the handheld device, and transition from the inaccessible mode to the accessible mode in response to determining that the continuous or near continuous communication path to the network server is accessible for transmitting the stored fluid output values.

In one example, the disclosure describes a method for usage monitoring of a sprayer, the method comprising in a first time instance, operating a handheld computer device in an accessible mode in which the handheld device is in a first location where wireless connectivity, via a continuous or near continuous communication path, to a network server is accessible. In the accessible mode, the method comprises transmitting at least some of a plurality of fluid output values, received from a sprayer, to the network server. In a second time instance, the method includes operating the handheld computer device in an inaccessible mode in which the handheld computer device is in a second location out of range of the continuous or near continuous communication path to the network server. In the inaccessible mode, the method comprises receiving at least some of the fluid output values from the sprayer, storing the received fluid output values in memory of the handheld device, and transitioning from the inaccessible mode to the accessible mode in response to determining that the continuous or near continuous communication path to the network server is accessible for transmitting the stored fluid output values.

In one example, the disclosure describes a method comprising receiving, by a handheld computer, user credentials of a user of the handheld computer and identification information of a sprayer that is in wireless communication with the handheld computer, receiving, by the handheld computer from the sprayer via the wireless communication, a plurality of fluid parameter values representing fluid output by the sprayer over time, wherein the plurality of fluid parameter values include a first set of fluid parameter values generated during use of the sprayer by the user and a second set of fluid parameter values generated prior to use of the sprayer by the user, determining whether the user credentials are authorized for viewing one or more of the plurality of fluid parameter values including the first set of fluid parameter values and the second set of fluid parameter values, wirelessly transmitting, by the handheld computer, the plurality of fluid parameter values to a network server that is remote from the sprayer and the handheld computer, and preventing the user from viewing at least the second set of fluid parameter values at the handheld computer in response to determining that the user credentials are not authorized for viewing the second set of fluid parameter values of the plurality of fluid parameter values, displaying, by the handheld computer, at least some of the first set of fluid parameter values despite determining that the user credentials are not authorized for viewing the second set of fluid parameter values of the plurality of fluid parameter values, and displaying, by the handheld computer, the second set of fluid parameter values based on the user credentials of the user indicating that viewing the second set of fluid parameter values is enabled.

In one example, the disclosure describes a system comprising a sprayer and a handheld computer comprising a wireless transceiver, a display device, and control circuitry, wherein the control circuitry configured to receive user credentials of a user of the handheld computer and identification information of the sprayer that is in wireless communication with the handheld computer, receive, from the sprayer via the wireless transceiver, a plurality of fluid parameter values representing fluid output by the sprayer over time, wherein the plurality of fluid parameter values include a first set of fluid parameter values generated during use of the sprayer by the user and a second set of fluid parameter values generated prior to use of the sprayer by the user, determine whether the user credentials are authorized for viewing one or more of the plurality of fluid parameter values including the first set of fluid parameter values and the second set of fluid parameter values, cause the wireless transceiver to wirelessly transmit the plurality of fluid parameter values to a network server that is remote from the sprayer and the handheld computer, prevent the user from viewing, via the display device, at least the second set of fluid parameter values at the handheld computer in response to determining that the user credentials are not authorized for viewing the second set of fluid parameter values of the plurality of fluid parameter values, cause, the display device, to display at least some of the first set of fluid parameter values despite determining that the user credentials are not authorized for viewing the second set of fluid parameter values of the plurality of fluid parameter values, and cause, the display device, to display the second set of fluid parameter values based on the user credentials of the user indicating that viewing the second set of fluid parameter values is enabled.

In one example, the disclosure describes a system comprising a sprayer comprising a pump that outputs fluid under pressure for spraying, a motor that drives the pump, sprayer control circuitry configured to generate data indicative of spray volume, and a wireless module configured to wirelessly send information including the data indicative of spray volume. The system includes control circuitry, outside of the sprayer, configured to receive the data indicative of spray volume, maintain a spray volume maintenance log in memory by updating the spray volume maintenance log with the data indicative of the spray volume from the sprayer, compare the spray volume maintenance log to a spray volume threshold, and cause an alert to be issued when the spray volume maintenance log is greater than the spray volume threshold.

In one example, the disclosure describes a sprayer system comprising a sprayer for spraying spray fluid, the sprayer comprising a pump that outputs spray fluid under pressure for spraying, a motor that drives the pump, a pressure sensor that measures fluid pressure output from the pump, and a wireless module configured to wirelessly send and receive information. The system also includes control circuitry configured to receive a plurality of pressure values when the pump is being operated during a window, determine an aggregate pressure metric for the window based on the plurality of pressure values received during the window, and cause the wireless module to transmit the aggregate pressure metric.

In one example, the disclosure describes a sprayer system comprising a pump that outputs spray fluid under pressure for spraying, a motor that drives the pump, a pressure sensor configured to sense an actual pressure downstream of the pump, a wireless module configured to wirelessly send and receive information, a pressure control input for user input of a pump output pressure setting, and control circuitry configured to receive a threshold pressure wirelessly received via the wireless transceiver, receive the pump output pressure setting, and control operation of the sprayer based on the threshold pressure, the pump output pressure setting, and the actual pressure, wherein the control circuitry causes the motor to drive output of the pump to the pump output pressure setting unless the pump output pressure setting is greater than the threshold pressure in which case the control circuitry causes the motor to drive output of the pump to the threshold pressure.

In one example, the disclosure describes a system for paint spraying volume tracking, the system comprising one or more sprayers for spraying fluid for a plurality of jobs, one or more handheld computer devices communicative couplable to the one or more sprayers, wherein each of the one or more handheld computer devices is configured to receive information indicative of one or more jobs from the plurality of jobs, receive user selection of a job of the one or more jobs, receive information from the one or more sprayers, the information indicative of an amount of fluid sprayed by the one or more sprayers with which the one or more handheld computer devices are communicatively coupled, and output the information indicative of the amount of fluid sprayed in association with the selected job of the one or more jobs from the plurality of jobs. The system also includes a network server configured to receive from each of the one or more handheld computer devices respective information indicative of the amount of fluid sprayed for respective jobs, update respective spray volume logs based on respective information indicative of the amount of fluid sprayed for respective jobs, wherein the spray volume logs are respectively associated with the plurality of jobs and each spray volume log includes information indicative of the amount of fluid sprayed at the associated jobs, and generate information for display indicative of respective amounts of fluid sprayed for the plurality of jobs based on the spray volume logs.

In one example, the disclosure describes a system for paint spraying volume tracking, the system comprising one or more sprayers for spraying fluid for a plurality of jobs and a network server configured to receive information generated by the one or more sprayers, the information indicative of the amount of fluid sprayed for respective jobs, update respective spray volume logs based on respective information indicative of the amount of fluid sprayed for respective jobs, wherein the spray volume logs are respectively associated with the plurality of jobs and each spray volume log includes information indicative of the amount of fluid sprayed at the associated jobs, and generate information for display indicative of respective amounts of fluid sprayed for the plurality of jobs based on the spray volume logs.

In one example, the disclosure describes a method of fluid spray allocation, the method comprising receiving a plurality of job profiles respectively corresponding to a plurality of painting projects for one or more paint sprayers, generating a plurality of spray volume data sets with the one or more paint sprayers, transmitting the plurality of spray volume data sets, receiving the plurality of spray volume data sets, receiving inputs respectively associating the plurality of spray volume data sets with the plurality of painting projects, determining spray volume values for the plurality of painting projects based on the plurality of spray volume data sets respectively associated with the plurality of painting projects, and generating an output based on the spray volume values.

The details of one or more examples are set forth in the accompanying drawings and the description below. Other features, objects, and advantages will be apparent from the description and drawings, and from the claims.

BRIEF DESCRIPTION OF THE DRAWINGS

FIG. 3A is an illustrative view of a graphical user interface for an end user interface of the remote monitoring system.

FIG. 7 is a schematic block diagram of components of various equipment used in a wireless network for monitoring a fluid sprayer.

FIG. 13 is a flow diagram illustrating example operations for outputting a notification from a network server in response to receiving sprayer identification data of a sprayer associated with a status indicating that the sprayer is unaccounted for.

FIG. 18 is an example performance data report for a sprayer.

FIG. 19 is an example job data report for multiple sprayers.

DETAILED DESCRIPTION

Figure 1A:
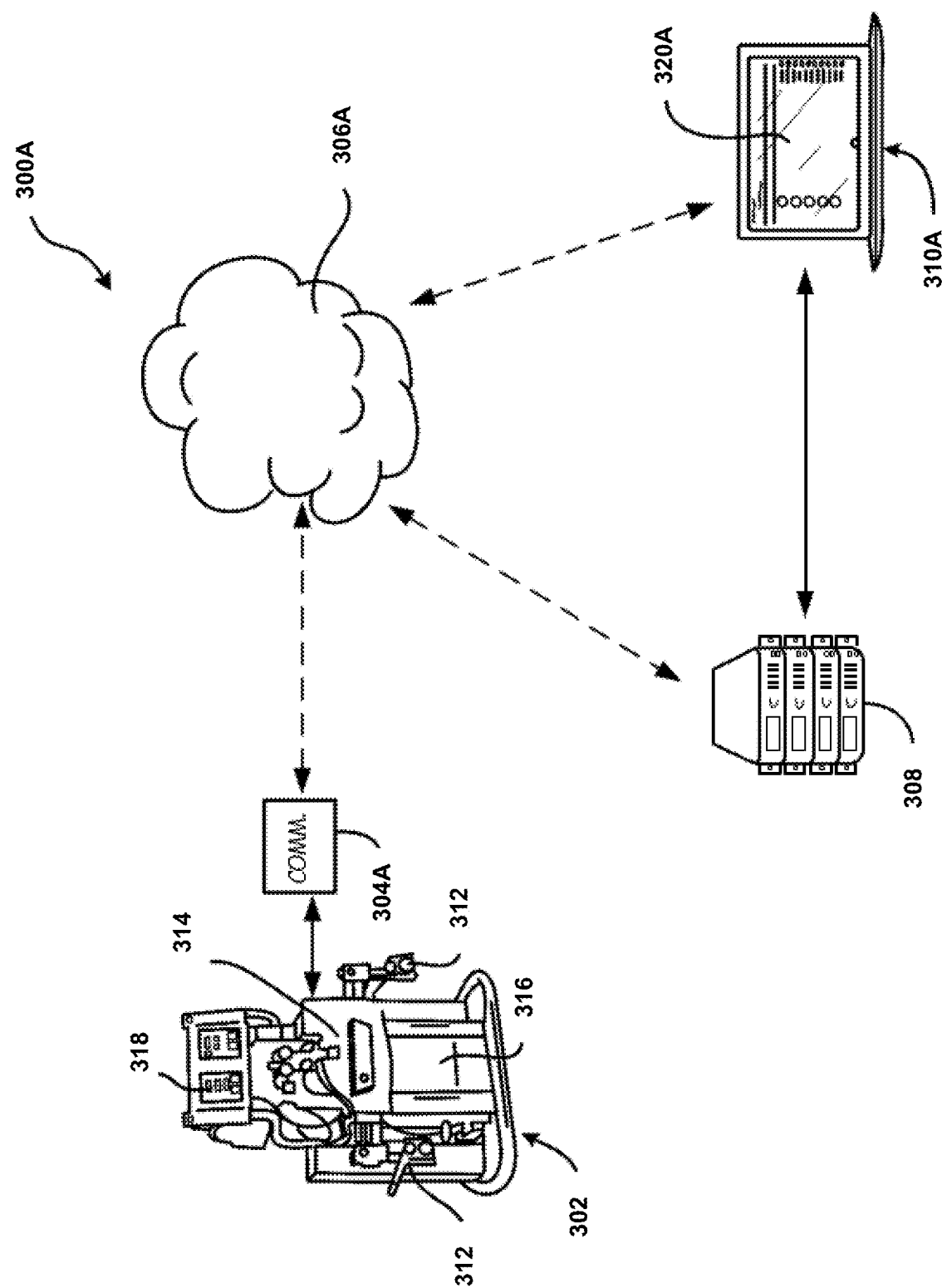
FIG. 1A is a pictorial schematic diagram of an embodiment of a remote monitoring system for a fluid handling system.

FIG. 1A is a pictorial schematic diagram illustrating one embodiment 300A of a remote monitoring system 300, which comprises fluid handling system 302, communications module 304A, communications network 306A, data storage server 308, and end user interface (EUI) 310. The illustrated embodiment is shown merely by way of example, and not limitation.

Fluid handling system 302 is a fluid system, such as a polyurethane sprayer or hot melt sprayer. Fluid handling system 302 comprises fluid hookups 312, pump module 314, heater module 316, and local operator interface (LOI) 318, as well as further logic components described below, with respect to FIG. 2. Pump module 314 is disposed to draw fluid from reservoirs (not shown) attached to fluid hookups 312, and to pressurize fluid to desired setpoint pressures. Pump module 314 can, for example, comprise a motorized pump or set of pumps driven by one or more electric, hydraulic, or pneumatic motors. Heater module 316 is configured to heat fluid pressurized by pump module 314 to desired setpoint temperatures. Heater module 316 can, for example, comprise a fluid channel or set of channels outfitted with electrically resistive or chemical heating elements. Pump module 314 and heater module 316 together make up a fluid delivery subsystem that brings fluids to specified pressures and temperatures (and thereby viscosities) suitable for spraying or other application to a work surface. In the illustrated embodiment, fluid handling system 302 is a two-side fluid system with A- and B-sides dedicated to different fluids that are mixed only when sprayed. In other embodiments, however, fluid handling system 302 can comprise any number of separate fluid lines, or a single fluid line. During use, fluid from heater module 316 and pump module 314 can, by way of example, be pumped through a hose or pipe to a sprayer or applicator (not shown).

LOI 318 is an interface device that enables a local operator to read off substantially real-time sensed values of fluid temperature and pressure, and specify setpoint temperatures and pressures to act as commanded values governing the operation of pump module 314 and heater module 316. Where pump module 314 and heater module 316 comprise multiple isolated fluid lines for separate fluids, LOI 318 allows users to select different commanded temperatures and pressures for each fluid line.

Communications module 304A is a remote communication device attached to fluid handling system 302. Fluid handling system 302 and communications module 304A together comprise a fluid applicator system that can be transported (e.g. via truck, or by cart) to an appropriate work location. Although communications module 304A is depicted as a separate device connected to fluid handling system 302, communications module 304 can be either a separate device affixed to fluid handling system 302, or an integrated component of fluid handling system 302, as desired for particular applications. For example, communications modules 304A-304C may be integrated with transceiver 354. Communications modules 304A-304C retrieve operating parameter data from fluid handling system 302, gathers additional location-specific data, and transmits reports including both of these data sets, as described in greater detail below with respect to FIGS. 2 and 4. Communication module 304 allows local information about the fluid applicator system, and particularly about fluid handling system 302, to be accessed, aggregated, and archived at remote locations.

Communications module 304A transmits reports (either periodically, or on demand) through communications network 306A to data storage server 308 via communications network 306A. In some embodiments, communications module 304A regularly assembles and transmits reports based at least in part on a pre-set schedule. In further embodiments, communications module 304A can transmit reports based on the content of process data received from fluid handling system 302, e.g. conditionally transmitting some reports in the event of unexpected sensor readings or event/error codes. Communications networks 306A-306C are illustrated as a cloud, but can be any data distribution network. In particular, communications networks 306A-306C can include a cellular or other wireless network, either a dedicated network purposed specifically for use with remote monitoring system 300A-300C, or a general purpose network shared with other applications. Data storage server 308 can, for example, be a single storage device or storage stack, or an array of distributed devices.

Data storage server 308 may archive reports from communications module 304, either indefinitely or for a predetermined time (e.g. for the last week, or the last six months), so that history data is accessible at EUI 310A. EUIs 310A-310C can be dedicated hardware terminal designed for use with remote monitoring system 300, a general purpose computing device with suitable memory and processor capabilities running application software specific to remote monitoring system 300, or a general purpose computing device such as a personal computer, a wireless tablet, or cellular device capable of running a general purpose web browser that accesses information archived at data storage server 308. EUI 310 can, for example, be a personal computer or a wireless tablet or cellular device running an appropriate task-specific software application. EUI 310 has graphical user interface (GUI), for example 320A or 320B (see FIGS. 3A and 3B), which provides end users with a range of aggregated, historical, and real-time data about fluid handling system 302, as described in greater detail below. Although GUI 320A is displayed on EUI 310A, the information displayed in GUIs 320A-320B can be assembled (i.e. by aggregating operational parameter data form reports, producing metadata, and calculating secondary quantities from reported data) either at data storage server 308, or at EUIs 310A-310C. In many embodiments, data storage server 308 and EUI 310 can communicate via communication network 306A with a plurality of communications modules 304 attached to fluid handling systems 302. In this way, EUI 310 enables end users to remotely access aggregated, historical, and real-time data about multiple, geographically distributed fluid handling devices.

Figure 1B:
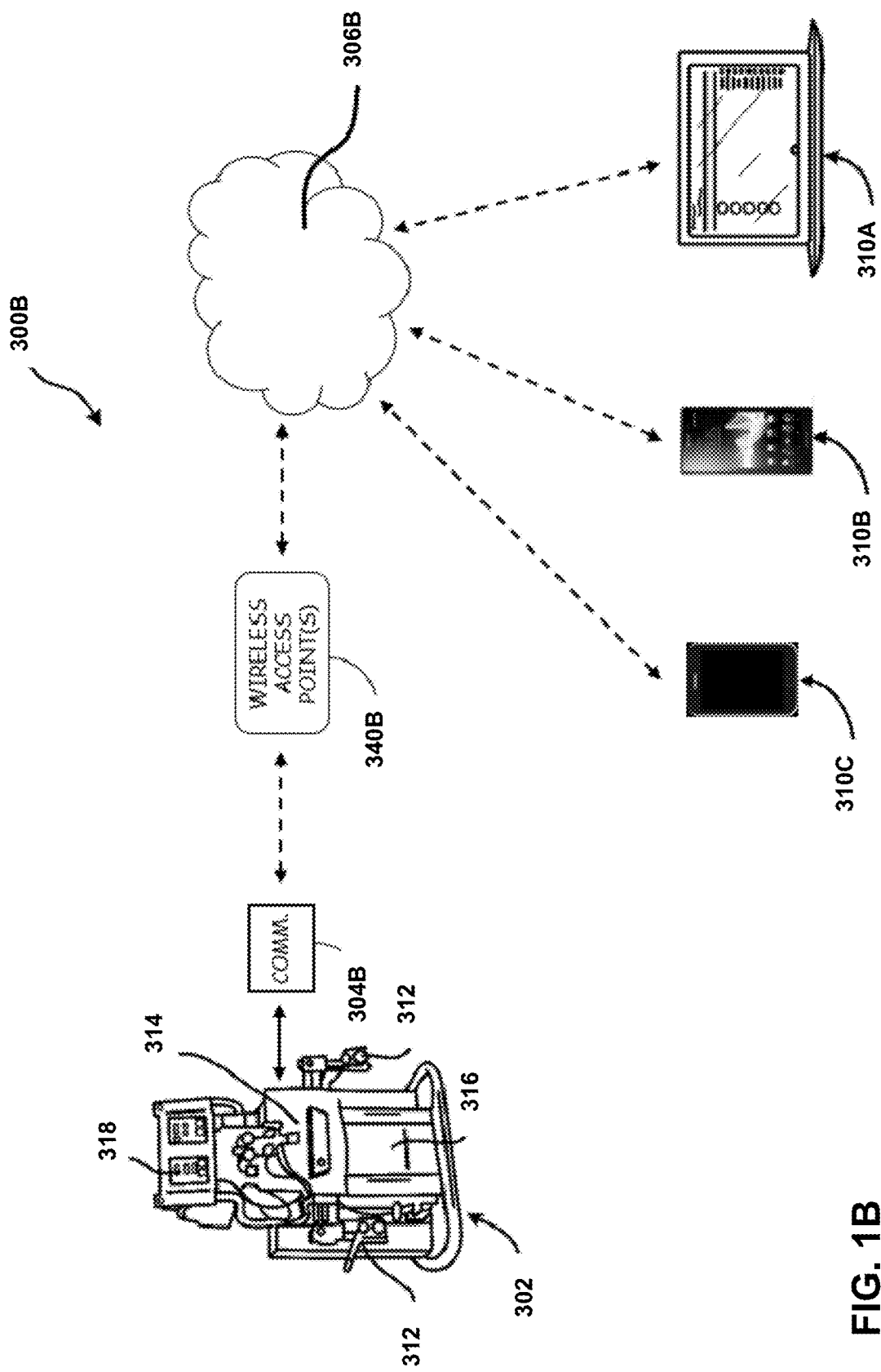
FIG. 1B is a pictorial schematic diagram of an embodiment of a remote monitoring system for a fluid handling system.
Figure 1C:
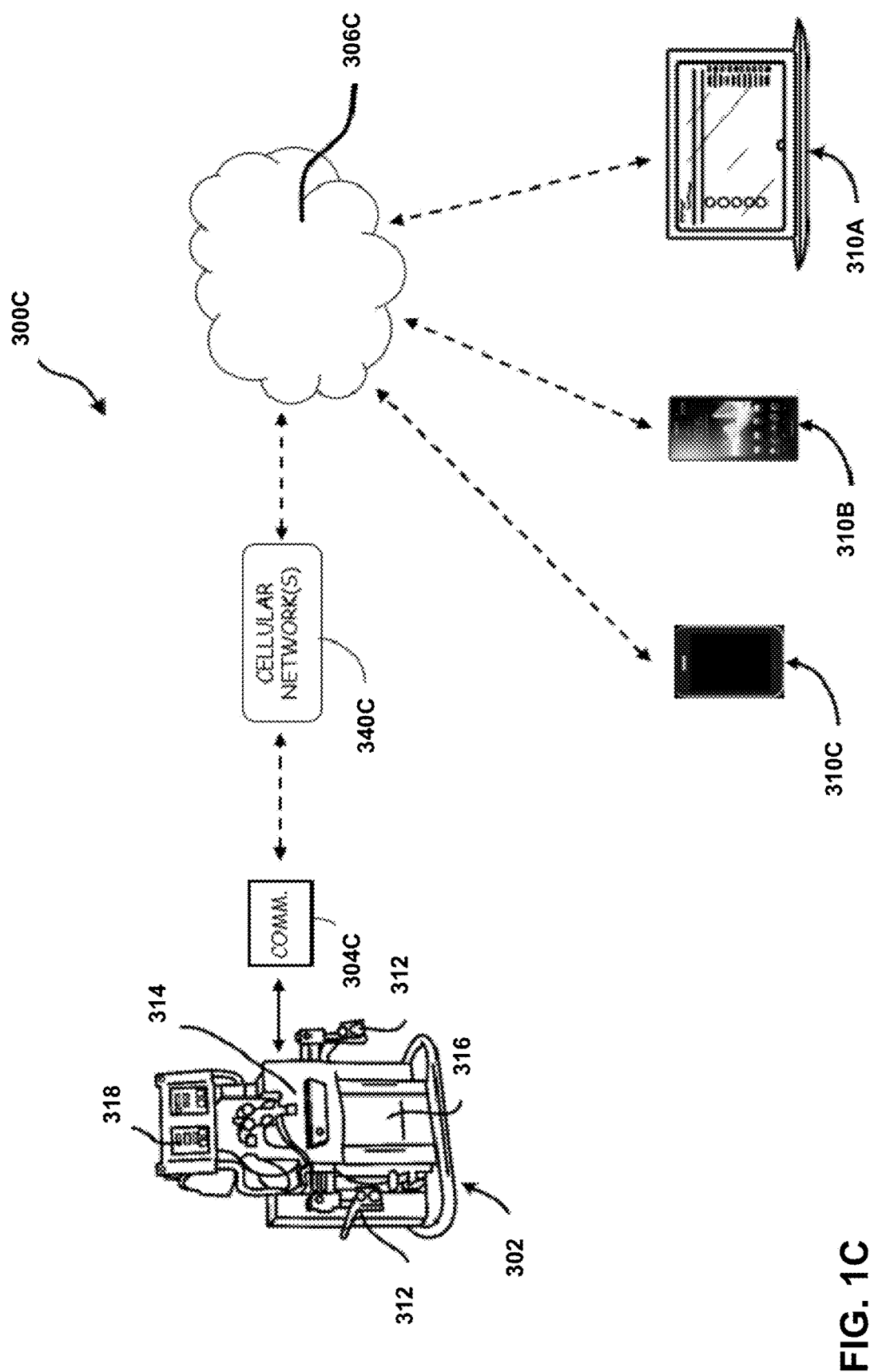
FIG. 1C is a pictorial schematic diagram of an embodiment of a remote monitoring system for a fluid handling system.

Data storage server 308 may be located anywhere between the fluid handling system 302 and the various EUIs. In some embodiments, data storage server 308 is a component of the network 306A-306C. For example, the embodiments of FIGS. 1A-1C may have a locally hosted data storage server 308 (i.e., hosted on a node within the network) or a cloud-based data storage server 308 (FIGS. 1B and 1C). In other embodiments, the end user device (e.g., EUIs 310A-310C) or communications module (e.g., 304A-304C) may be configured to act as the data storage server 308 for retaining historical and other values. For example, if a communication module such as 304B is configured to communicate directly with at least one EUI without transmitting data via the Internet, then either the EUI (e.g., 310A-310C) or the communications module 304B may serve as the data storage server 308.

FIGS. 1B and 1C show various communication networks (e.g., Wi-Fi and Cellular, but may also include such exemplary networks as satellite, USB, Bluetooth, Zigbee, etc.) for transmitting data from a fluid handling system 302 to an end user device (e.g., EUIs 310A-310C). In such embodiments, the operator may view and change key system parameters (e.g., pressures or temperatures) at the end of the hose (i.e., the spray gun end) opposite of the fluid handling system 302. Previously, this functionality could only be had at interface 318, which could be more than 400 feet from the point of application. In the illustrated embodiments of FIGS. 1B and 1C, data storage server 308 is part of the network (not shown).

FIG. 1B is a pictorial schematic diagram illustrating alternative embodiment 300B of a remote monitoring system 300, which comprises fluid handling system 302, communications module 304B, communications network 306B, and at least one end user interface (EUI), such as 310A-310C. The illustrated embodiment is shown merely by way of example, and not limitation. In embodiment 300B, communications module 304B is configured to communicate with at least a Wi-Fi network (e.g., IEEE 802.1x, Bluetooth, etc.). In some embodiments, such as the illustrated embodiment of FIG. 1B, the transmitted data travels through a network that includes the Internet, similar to embodiment 300A. In other embodiments, the proximity of fluid handling system 302 to the end under device (e.g., EUI 310A-310C) may allow direct communication between the EUI and the communications module. For example, FIG. 1B includes a communication module 304B configured to communicate with one or more Wireless Access Point(s) 3040B (e.g., IEEE 802.1x, etc.), wherein the data is transmitted to at least one of EUIs 310A-310C via Wireless Access Point 340B (e.g., IEEE 802.1x router). Wireless Access Point may be configured to communicate via the Internet to at least one of EUIs 310A-310C, or alternatively, may be configured to communicate directly to at least one of EUIs 310A-310C. In other embodiments, communication module 304B may communicate directly with at least one of EUIs 310A-310C over a Wi-Fi network (e.g., IEEE 802.1x, Bluetooth, etc.), in which case there is no need for a Wireless Access Point or Internet. In such embodiments with direct Wi-Fi communication, communication module 304B (e.g., Bluetooth, Wi-Fi, etc.) will pair with a smart device (e.g., EUIs 310A-310C). Transmitted data may be communicated to the fluid handling system 302 (e.g., proportioner, etc.) via a CAN network to control and view key system parameters. EUI 310B may be configured as a smart device app, which will serve as the interface for viewing and controlling the system. In many embodiments, little to no software changes are needed to be made to the existing software since it is already designed to accept control inputs from the current wired remote display module.

FIG. 1C is a pictorial schematic diagram illustrating an alternative embodiment 300C of remote monitoring system 300, which comprises fluid handling system 302, communications module 304C, communications network 306C, and at least one end user interface (EUI), such as 310A-310C. The illustrated embodiment is shown merely by way of example, and not limitation. In embodiment 300C, communications module 304C is configured to communicate with at least a cellular network 340C. In some embodiments, the transmitted data travels through a network that includes the Internet, similar to embodiment 300A.

Figure 2:
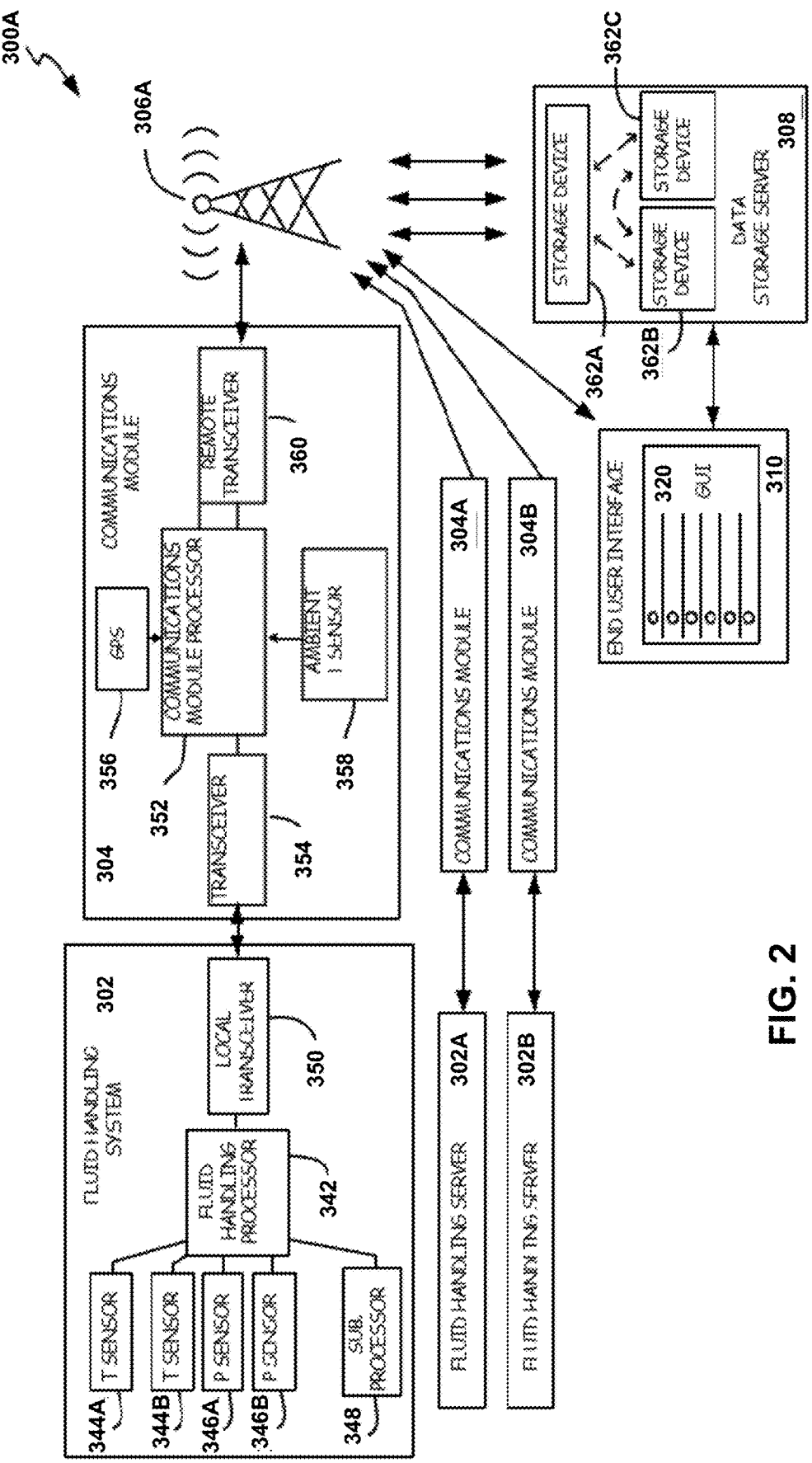
FIG. 2 is a schematic block diagram of an embodiment of a communication network of the remote monitoring system of FIG. 1A.

FIG. 2 is a schematic block diagram illustrating logic components of remote monitoring system 300A. As described above, remote monitoring system 300A comprises fluid handling system 302, communications module 304, communications network 306, data storage server 308, and EUI 310. As illustrated in FIG. 2, remote monitoring system 300 further comprises additional fluid handling systems 302a and 302b connected to additional communications modules 304a and 304b, respectively. Fluid handling systems 302a and 302b can, for example, be additional identical or similar fluid handling systems to fluid handling system 302. Fluid handling systems 302a and 302b may differ from each other and from fluid handling system 302 in specifics of form and function, but are generally fluid handling systems as described above with respect to FIG. 1. In general, remote monitoring system 300 can include any number of fluid handling systems with corresponding communications modules.

In addition to heating and pressurizing fluid (see FIG. 1), fluid handling system 302 collects, receives, and produces data regarding a range of operational parameters, including actual and commanded temperatures and pressures, error or event codes and states, and "duty data" such as device on-time, hours of use, pump cycle counts and other duty cycle data. In the illustrated embodiment, fluid handling system 302 comprises temperature sensors 344a and 344b, pressure sensors 346a and 346b, subsidiary processor 348, fluid handling processor 342, and local transceiver 350. Temperature sensors 344a and 344b can, for instance, be thermocouples, resistive temperature detectors, bimetallic sensors, or other temperature sensors selected for suitability for the operating conditions of fluid handling system 302. Temperature sensors 344a and 344b can, for example, be disposed at inlet and/or outlet locations of fluid handling system 302 and/or heater module 316. Pressure sensors 346a and 346b can, for example, be piezoelectric or capacitive pressure sensors disposed at inlet and/or outlet locations of fluid handling system 302 and/or pump module 314. Although only two temperature sensors 344a and 344b and two pressures sensors 346a and 346b are shown in FIG. 2, fluid handling system 302 can comprise any number of pressure and temperatures sensors. In particular, embodiments of fluid handling system 302 with separate A-side and B-side fluid lines can incorporate separate sets of temperature and pressure sensors for each fluid line.

Fluid handling processor 342 and sub-processor 348 are logic-capable devices that receive, retrieve, and/or produce operational parameters of fluid handling system 302. Although fluid handling processor 342 is depicted as a single element, some embodiments of fluid handling processor 342 can constitute a plurality of separate logic processors, each separately in communication with appropriate sensors and with local transceiver 350. In one such embodiment, fluid handling processor 342 comprises a motor controller processor dedicated to pump motors of pump module 314, and a heater controller processor dedicated to heater module 316. Some embodiments of fluid handling system 302 may include sub-processor 348, an additional logic-capable processor that communicates with local transceiver 350 only via fluid handling processor 342. For example, fluid handling processor 342 may comprise a motor controller processor that, in addition to receiving sensor data and commanded setpoint pressures related to pump operation, receives and aggregates signals from a heater controller processor.

Fluid handling processor 342 (and, in some embodiments, sub-processor 348) receives user inputs specifying setpoint temperatures and pressures for fluid handling system 302. These setpoint temperatures and pressures act as commanded or target values towards which heater module 316 and pump module 314 respectively operate. Fluid handling 342 also generates and/or gathers (e.g. from sub-processor 348) error and event codes corresponding to events such as malfunctions, overheating events, pump jams, and the like, and counts pump cycles of pump(s) in pump module 314. In some embodiments, fluid handling processor 342 displays some or all of this operational data on LOI 318, and receives inputs (including temperature and pressures setpoints) from LOI 318. Fluid handling processor 342 transmits some or all of this operational data to local transceiver 350, which transmits the operational data to communications module 304. Local transceiver 350 can transmit operational data periodically, continuously, on demand, or as retrieved/produced by fluid handling processor 342. This operational data can further include software version numbers or codes identifying versions of software currently used by fluid handling processor 342, sub processor 348, and the like.

Communications module 304A is a device attached to, integrated into, or otherwise commonly situated with fluid handling system 302. Communications module 304A comprises communications module processor 352, local transceiver 354, Global Positioning System (GPS) module 356, ambient temperature sensor 358, and remote transceiver 360. In some embodiments, communications modules 304A-304C may be a modular add-on component to fluid handling system 302. In other embodiments, communications modules 304A-304C may be an internal component inside the same housing or structure as fluid handling system 302. In the depicted embodiment, communications module processor 352 receives operational data from fluid handling processor 342 via local transceivers 350 and 354. For embodiments in which communications modules 304A-304C are integrated into fluid handling system 302, transceivers 350 and 354 may be unnecessary.

GPS module 356 is a global positioning device capable of receiving GPS signals, and thence determining the location of communications module 304 (and thereby fluid handling system 302). GPS module 356 can be a GPS transceiver disposed to communicate with GPS satellites and transmit GPS signals to communication module processor 352 for processing, or a logic-capable GPS transceiver-processor that itself determines the location of communications module 304 from received GPS signals. Although communications module 304A is illustrated with GPS module 356, other location finding systems such as cellular triangulation may equivalently be used. GPS module 356 provides communications module 352 with either processed location data (e.g. latitude and longitude), or with unprocessed location data (e.g. satellite signals used by communications module 352 to determine latitude and longitude).

Ambient temperature sensor 358 is a temperature sensor disposed to sense environmental temperatures at or near communications module 304 and fluid handling system 302. Extreme temperatures can adversely affect the viscosity, composition, and degradation of fluids processed by fluid handling system 302. Ambient temperature sensor 358 provides a measurement of environmental temperatures that can be used to assess the risk of such adverse temperature reactions.

Communications module processor 352 retrieves operational parameters from fluid handling processor 342 as described above, GPS location information from GPS module 356, and sensed environmental temperatures from ambient temperature sensor 358. Communications module processor 352 aggregates these data to form a data report that includes both operational parameter information (e.g. commanded and sensed temperatures and pressures, pump cycle counts, software version numbers) and location information (e.g. location coordinates based on the GPS location information and a temperature at the location from the sensed environmental temperature). This data report is transmitted to data storage server 308 via communication network 306 by remote transceiver 360. Remote transceiver 360 can, for instance, be a cellular or other wireless transceiver capable of transmitting and receiving signals to and from remote locations. Communications module processor 352 can assemble and transmit data reports periodically, continuously or semi-continuously, or on-demand in response to user requests or fluid handling system events (e.g. errors or alerts generated by fluid handling processor 342).

Data storage server 308 receives data reports from communications module 304, and parallel, similar reports from any additional communications modules 304a and 304b. Additional communications modules 304a and 304b can collect different data set from fluid handling systems 302a and 302b, respectively, and may accordingly transmit reports that differ from the data reports generated by communications module 304.

Data storage server 308 is a persistent data storage medium that can further include a logic-capable processor. In the depicted embodiment, data storage server 308 comprises a plurality of interconnected storage devices 362a, 362b, and 362c. Storage devices 362a, 362b, and 362c can, for example, be separate drives arranged in a redundant array and/or distributed storage devices situated in disparate locations. More generally, data storage server 308 may comprise any number of data storage devices, including only a single data storage device. Data storage server 308 receives data reports from all communication modules (304, 304a, 304b, etc.) in remote monitoring system 300, and archives both operational parameter information and location information for each fluid handling system (302, 302a, 302b, etc.) in remote monitoring system 300.

EUI 310 acts as a terminal by which a human operator can access information stored in data storage server 308 using GUI 320. Although only one EUI 310 is shown in FIG. 2, some embodiments of remote monitoring system 300 may allow a greater number, or any number, of EUIs 310. GUI 320 provides users with a range of aggregated, historical, and real-time data about multiple fluid handling systems, accessible from the single location of EUI 310, which may be remote from any fluid handling systems. For example, an employee of a company or project employing many fluid handling systems (e.g. 302, 302a, and 302b) at various locations monitor all of these devices from EUI 310. Moreover, because data storage server 308 archives the contents of data reports from each fluid handling system 302, 302a, 302b for an extended period, EUI 310 enables users to access and compare historical data including historical sensed and commanded temperatures and pressures, software version histories, pump cycle counts, error and event log histories, and past device locations/movement. Software version numbers and histories can be used to identify reading discrepancies between different machines due to differences in software version. Data storage server 308 can selectively purge some or all of this information periodically, e.g. automatically deleting data older than a threshold period. EUI 310 may communicate with data storage device server 308 either directly, or via communication network 306.

EUI 310 and data storage server 308 cooperate to provide users with real-time (or substantially real-time) data and historical data, as well as data derived from real-time and/or historical data. These derived data can be produced at EUI 310 using archived data retrieved from data storage server 308, or locally at data storage server 308, e.g. on demand from EUI 310. Derived data available via GUI 320 at EUI 310 can include pumped fluid volumes (per hour, per day, etc.) derived from pump cycle counts and pumping volumes known for each model and application of fluid handling system 302. Derived data can also include alerts or alarms generated whenever particular event or error codes are received, and/or whenever operating parameters deviate sufficiently from expected values. For example, EUI 310 and/or data storage server 308 can automatically generate alerts whenever sensed pressures exceed commanded values by more than a threshold amount, or whenever sensed temperatures deviate from commanded values by more than a threshold amount for a sufficient time. EUI 310 allows users to access a wide range of data pertaining to multiple fluid applicator systems from a remote location, using GUI 320.

FIG. 3A is an illustrative view of one embodiment 320A of GUI 320. As shown in FIG. 3, GUI 320A includes information screen 400 with a plurality of rows 402 (including rows 402a and 402b) with header row 404, and columns 406-432 corresponding to particular parameters. Each row 402 corresponds to an individual fluid applicator system comprising a fluid handling system (e.g. 302, 302a, 302b) and a communications device (e.g. 304, 304a, 304b), with column entries for that row representing operational parameter data, location data, or derived data for that fluid applicator system. Although only one information screen 400 is shown, some embodiments of GUI 320 can include multiple information screens 400 that can be displayed simultaneously, or which users can page between to access information, e.g., pertaining to different projects or different fluid applicator system types. Each information screen 400 can be scrollable and/or resizable to change the range and/or scale of rows and columns shown.

As depicted in FIG. 3A, information screen 400 includes device model column 406, device status column 408, daily material usage column 410, daily actual spray time column 412, daily power on time column 414, daily cycle count column 416, resettable cycle count column 418, A-side temperature column 420, B-side temperature column 422, hose temperature column 424, A-side pressure column 426, B-side pressure column 428, last device data column 430, and data/location column 432. These columns represent one embodiment of information screen 400; in other embodiments, additional or fewer parameters can be displayed. In some embodiments, the columns displayed on information screen 400 can be configurable by end users. Some embodiments may not include location information 432.

In the depicted embodiment of FIG. 3A, device model column 406 displays the particular make or model of each fluid applicator system represented in rows 402. EUI 310 and/or data storage server 308 can associate each make or model with particular fluid tasks, and/or with known pump displacement values. Status column 408 provides indicators of device status for each fluid applicator system in the form of a colored icon or graphic. Status column 408 can, for instance, show a green circle for a presently active (i.e. heating and/or pumping) fluid applicator system, a yellow circle for an applicator system that was recently active, and a red circle for an applicator for a system that has not been active for some time (e.g. >10 minutes). In some embodiments, status column 408 can include color or text indicators of alarm conditions or urgent events. In alternative embodiments, other types of indicators may be used. Daily material usage column 410 represents fluid volume pumped by each fluid applicator system, as calculated from cycle counts and known pump displacement volumes for each device model. Daily actual spray time column 412, daily power on time column 414, and daily cycle count column 416 represent corresponding duty parameters determined from archived process parameter data included in the data reports, and resettable cycle count column 418 represents a count of pump cycles since manually reset by a user at EUI 310 or LOI 318. These daily value columns correspond to aggregated historical values based on archived data reports across an extended time period. Although these columns are shown and described herein as fields corresponding to daily values, other time periods can be used as appropriate to each application, e.g. hourly, weekly, monthly, etc.

A-side temperature column 420, B-side temperature column 422, hose temperature column 424, A-side pressure column 426, and B-side pressure column 428 represent temperatures and pressures taken from the most recent data reports from each fluid applicator system. A-side and B-side temperature columns 420 and 422 can, for example, represent inlet or outlet fluid temperatures at respective sides of each fluid applicator system, while hose temperature column 424 can represent temperatures at the hose-end spray/application location of each fluid applicator system. Last device data column 430 indicates the last time at which a data report was received from each fluid applicator system.

Data and location column 432 provides a plurality of additional data buttons, including job log button 434, daily usage log button 436, event log button 438, and location button 440. Each button calls up additional detailed historical data when clicked, e.g. in a popup or drop-down window. Job log button 434 calls up a history of temperatures, pressures, cycle counts, and other operational parameters from data storage server 308. Daily usage button 436 calls up a history by day (in the exemplary embodiment) of usage statistics, e.g. corresponding to columns 410, 412, 414, and 416. Event log button 438 calls up a history of event and/or error codes. Location button 440 calls up a history of locations based on GPS location data, indicating where a fluid applicator system has been, and when it has moved. The historical data accessed via buttons 434, 436, 438, and 440 can span the full archived history available from data storage server 308, or only recent events (e.g. the last month, year, etc.).

Each row 402 further includes an expand/contract button 442 that expands that row to display additional details 444 (see rows 402a and 402b). Additional details 444 may, for example, include device address information, ambient temperature, and last update times for particular information, e.g. GPS location, ambient temperature, and/or inlet temperatures. Additional details 444 include data retrieved and archived in data storage server 308 but not otherwise shown in columns 406-432.

GUI 320 enables users to assess the current status and historical performance of multiple devices at a glance, from a remote central location. GUI 320 may, in some embodiments, be customizable to allow each user to immediately view the information most relevant to his or her own task. In an exemplary embodiment, GUI 320 may be customizable to hide or show particular fields by clicking an icon or graphic such as button 442. In further or alternative embodiments, GUI 320 may be customizable to hide or show particular fields by editing a configuration file.

Figure 3B:
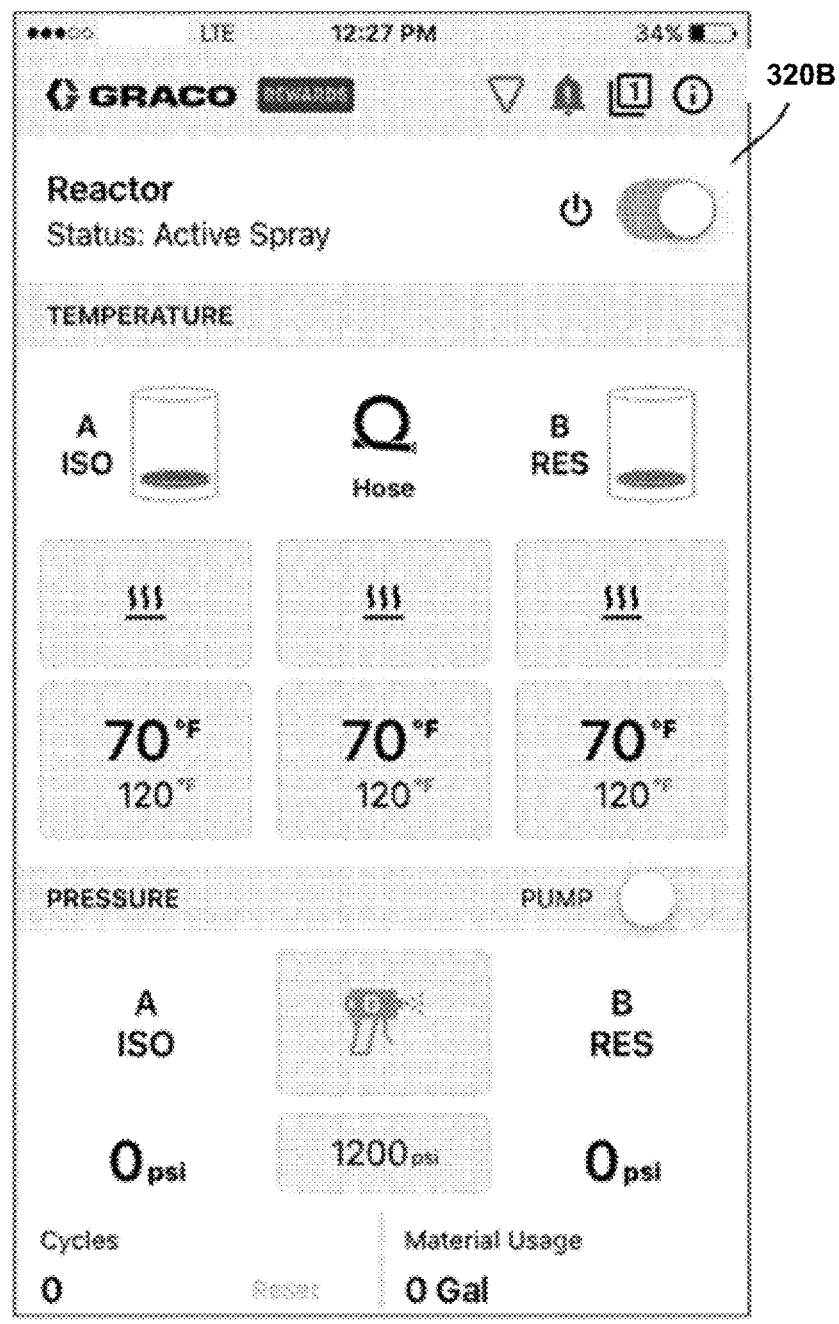
FIG. 3B is an illustrative view of a graphical user interface for an end user interface of the remote monitoring system.

FIG. 3B is an illustrative view of embodiment 320B, an alternative embodiment of GUI 320. As depicted in FIG. 3B, the information screen may include, for example, A-side temperature (actual), B-side temperature (actual), hose temperature (actual), A-side pressure (actual), and B-side pressure (actual). Some embodiments may not include all of the above information. For example, some embodiments may only include one temperature, especially in embodiments that are configured for single heater fluid handling systems 302. Other information displayed may include, for example, temperature and/or pressure set point(s), pump status (e.g., on or off, etc.), material usage (e.g., cycle count, volume, etc.), and unit conversion (e.g., degrees F./C, psi/bar/Mpa, etc.).

Figure 4:
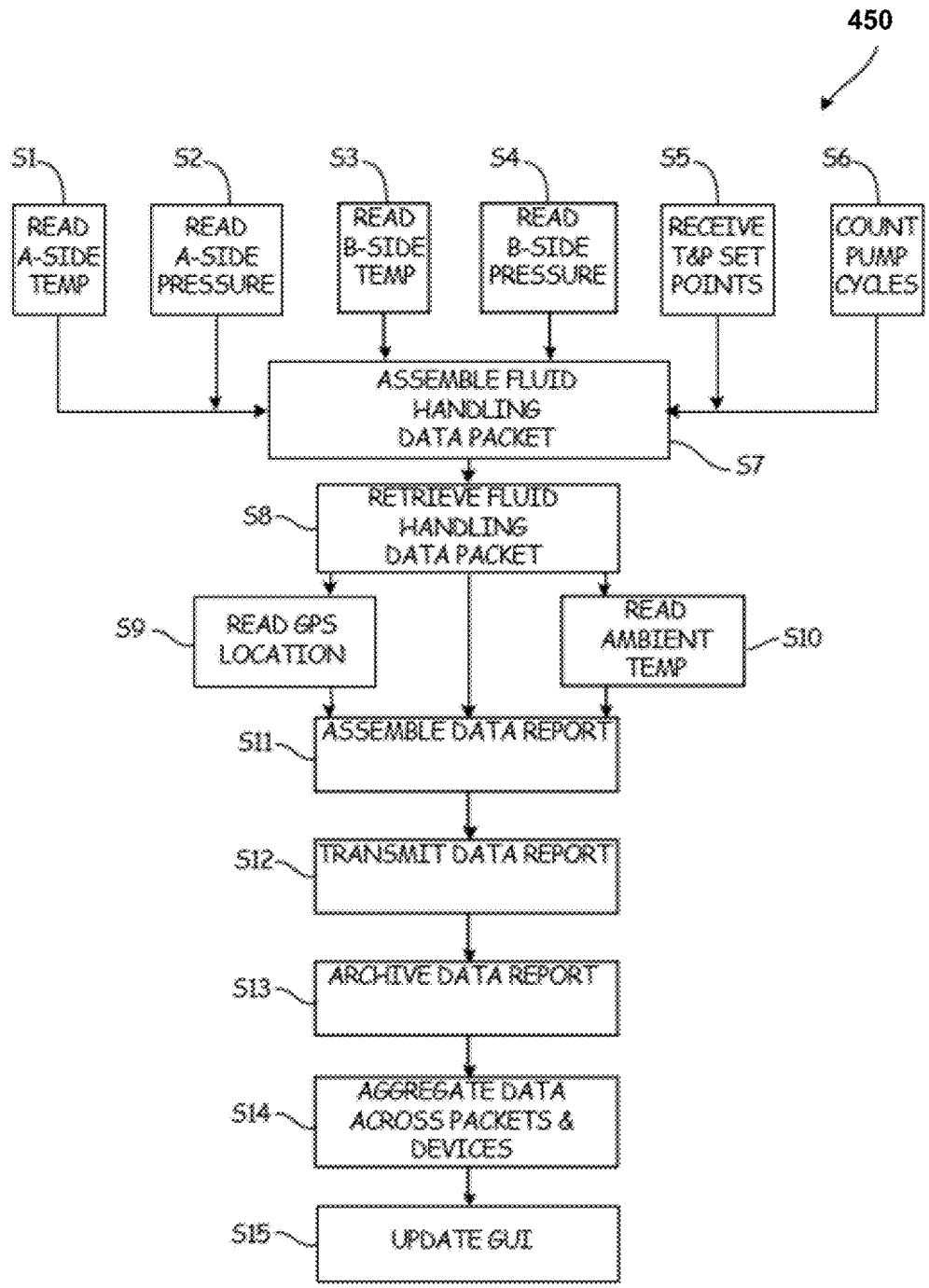
FIG. 4 is a method flowchart illustrating one embodiment of a method of operation of the remote monitoring system of FIGS. 1A and 2.

FIG. 4 is a method flowchart of method 450, an illustrative embodiment of one method of operating remote monitoring system 300. Although method 450 illustrates steps performed in one illustrative order, alternative embodiments of the present invention may perform steps of method 450 in different orders, without departure from the present invention.

First, fluid handling system processor 342 retrieves or produces a variety of parameters, as described above. In the depicted embodiment, fluid handling system processor 342 reads an A-side temperature from temperature sensor 344a (Step S1), an A-side pressure from pressure sensor 346a (Step S2), a B-side temperature from temperature sensor 344b (Step S3), and a B-side pressure from pressure sensor 346b (Step S4), either directly or via a subsidiary processor such as sub-processor 348. Fluid handling system processor 342 receives temperature and pressure set points corresponding to A-side and B-side commanded temperatures and pressures (Step S5), and pump cycle counts (Step S6). All of these operational parameters are assembled into a fluid handling data packet (Step S7) that is retrieved by communications module processor 352 via local transceivers 350 and 354. (Step S8). The fluid handling data packet can additionally contain other information, as described above with respect to FIG. 2, such as error and/or event codes, and software versions.

Communications module processor 352 reads a GPS location from GPS module 356 (Step S9), reads an environmental temperature from ambient temperature sensor 358 (Step S10), and assembles a data report comprising a composite data packet including the contents of the fluid handling data packet, the GPS location, and the environmental temperature (Step S11). In some cases or embodiments, communications module processor 352 may assemble some data reports without the GPS location and/or the environmental temperature, providing this information less frequently, or on demand. Communications module processor 352 transmits the data report through communications network 306 via remote transceiver 360 to data storage server 308, (Step S12) where all of the contained data is archived (Step S13). EUI 310 and/or data storage server 308 aggregates data across multiple packets from disparate devices, assembling historical and derived data. (Step S14). GUI 320 of EUI 310 is then updated with this information. (Step S15). Method 450 repeats at each iteration of data collection, for each fluid applicator system, although some data collection steps of method 450 may be skipped in some iterations (e.g. reading GPS locations). Method 450 may automatically repeat at fixed intervals and/or on demand.

Method 450 ensures that GUI 320 provides users with substantially up-to-date information about a plurality of fluid applicator systems. This information includes not only real-time or quasi-real-time operational parameter data such as commanded and actual temperature and pressure readings, but also historical data including usage statistics for the past days or months of operation, and derived data such as material usage statistics.

Pumps according to the present disclosure reciprocate a piston within a cylinder to pump various fluids, examples of which include paint, water, oil, stains, finishes, aggregate, coatings, putty, sealants, and solvents, amongst other options. One category of fluid is architectural coatings, which includes paint, for roofs, ceilings, walls (interior and exterior), and floors of structures. Paint will be used herein as an example, although any embodiment referenced herein can be used with any type of fluid. A piston pump can generate high fluid pumping pressure, such as between 1,000-5,000 pounds per square inch or even higher, although 2,000-3,500 pounds per square inch is a typical range. High fluid pumping pressure is useful for atomizing the paint from a nozzle into a spray for applying the paint to a surface as a coating.

Figure 5:
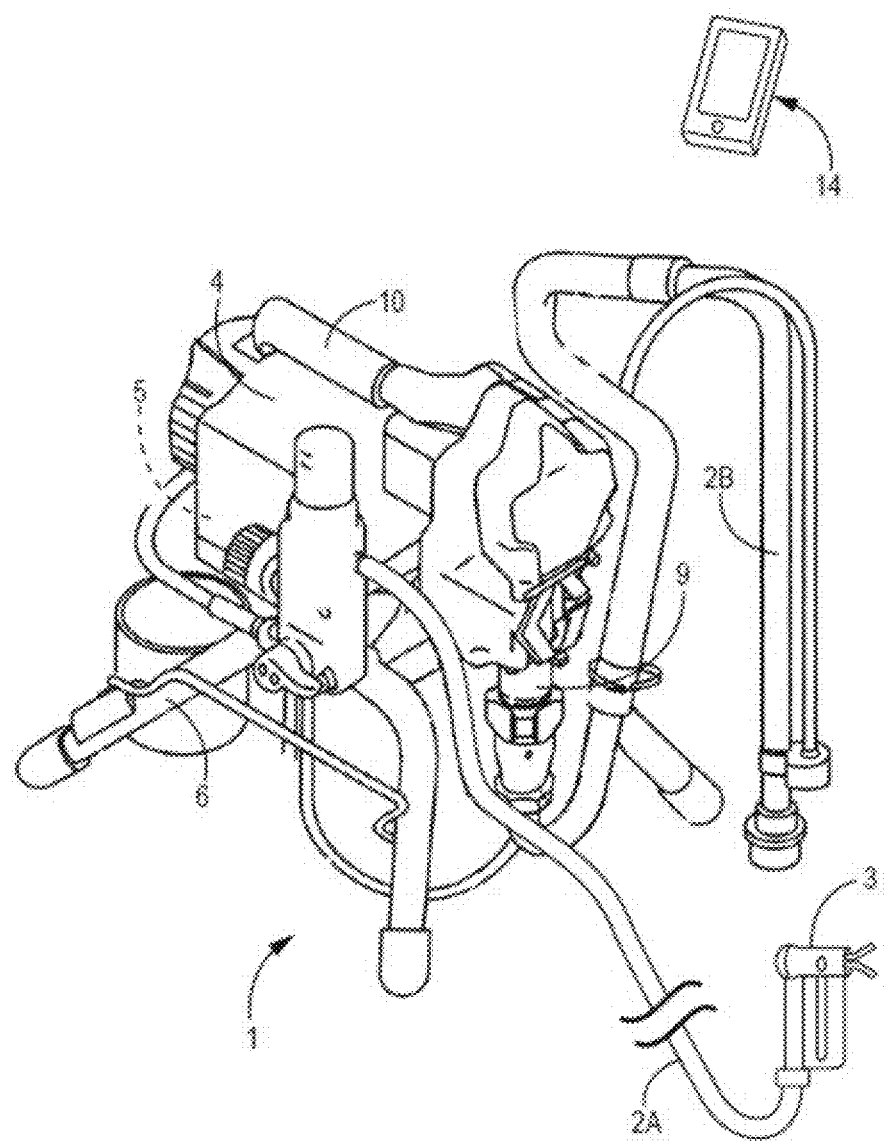
FIG. 5 is an isometric view of a fluid sprayer.

FIG. 5 is an isometric view of fluid sprayer 1. FIG. 5 also shows a handheld computer 14. The handheld computer 14 can be any type of hand-portable computer. As shown, the handheld computer 14 is a cellular phone, more specifically a smart phone, but can also be a tablet or other type of portable device. The handheld computer 14 has wireless connectivity to both the fluid sprayer 1 and an information network, such as the internet, via a cellular, Wi-Fi, or other type of data transfer connection. The handheld computer 14 is portable and is intended to be fully supported by a single hand of a person and ordinarily carried around by a person while working.

Figure 6:
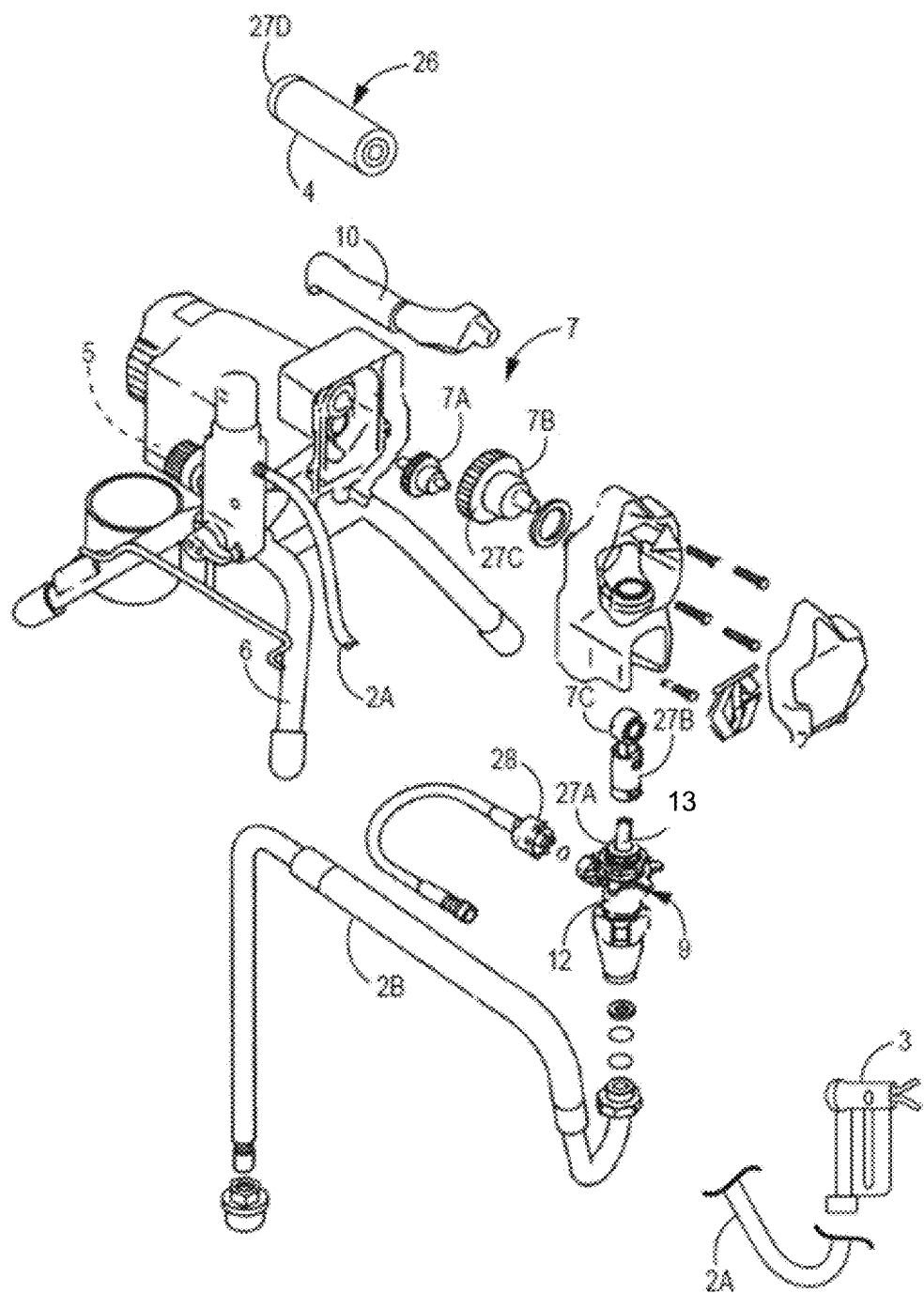
FIG. 6 is an exploded view of the fluid sprayer of FIG. 5.

FIG. 6 is an exploded view of fluid sprayer 1. FIGS. 5 and 6 will be discussed together. The fluid sprayer 1 includes a frame 6. The frame 6 includes legs in this embodiment for supporting the fluid sprayer 1 on the floor. The frame 6 can additionally or alternatively include wheels or other ground-contacting support. In any case, the fluid sprayer 1 can be carried or otherwise moved by a single person for transport for use at various job sites. The frame 6 fully supports a main housing that contains a motor 4 and control 5. The motor 4 is mounted on the frame 6. The fluid sprayer 1 is man-portable and includes a handle 10 fixed to the frame 6 for picking up and carrying the fluid spray system 1 by hand. Some larger embodiments of the fluid sprayer 1 may be wheeled by a person tilting and pushing the fluid sprayer 1.

The control 5 delivers power to the motor 4. The motor 4 can be an electric brushless rotor stator motor, amongst other options. In other versions, the motor 4 can be a gas (combustion), pneumatic, or hydraulic powered motor, amongst other options. In this and various other embodiments, the motor 4 outputs rotational motion. The motor 4 turns drive 7, which in the illustrated embodiment includes drive components 7A-7C. Drive components 7A-7C in this embodiment includes various components such as gearing, eccentric, and a crank for turning rotational motion output by the motor 4 into linear reciprocating motion. The drive components 7A-7C can include different components, such as a scotch yoke or other mechanism for converting rotation motion into linear reciprocating motion. The drive 7 connects with a top of a piston 13 of the pump 9 to reciprocate the piston 13 relative to a cylinder 12 of the pump 9. The pump 9 can be mounted on the frame 6, such as with a clamp, to brace or otherwise hold the cylinder 12 in place during reciprocation of piston 13.

The pump 9 takes paint in through the intake hose 2B. The end of the intake hose 2B can be submerged in a bucket filled with paint or other fluid to be sprayed. The pump 9 places the paint under pressure and outputs the paint through the hose 2A to the gun 3. The gun 3 includes a trigger which can be actuated by hand to open an internal valve (not illustrated) and release the paint as an atomized spray fan. Once the control 5 is turned on to power the motor 4 and the pump 9 is primed, the fluid sprayer 1 can be operated to spray by pulling the trigger of the gun 3.

In typical operation, the fluid sprayer 1 will be used at remote sites for painting projects. Some small projects can be completed in an hour, while some projects can take days, weeks, or months. Each painter will typically be responsible for multiple projects at a time and might attend to several projects in one day. Sometimes the painter owns the fluid sprayer 1, and may own several fluid sprayers. Sometimes the painter is employed by a contractor company that owns multiple fluid sprayers and employs multiple other painters. In this case, the fluid sprayer 1 may remain physically located at the site for days while multiple painters from the same employer operate the fluid sprayer 1.

Whether the fluid sprayer 1 is owned by a single painter or is part of a fleet of sprayers, it is desired to track the usage of the fluid sprayer 1. This is for several reasons. The first reason is to track productivity and cost associated with a painting project. The main driving costs of painting projects are the cost of the paint being sprayed and the labor of the painter operating the fluid sprayer 1. The painting project is usually bid out based on square footage of surface to be painted, with the cost of paint and labor hours being factored into the bid. The painter is then tracked on how efficiently the project can be completed. The painter is attempting to manage both the volume of paint sprayed and labor hours so as not to exceed the paint gallons or labor hour assumptions underlying the bid.

Another reason for tracking usage of the fluid sprayer 1 is to ensure it is being used when expected and not being used when expected to be idle (e.g., during off hours by a moonlighting worker). Another reason for tracking usage is to manage maintenance of the fluid sprayer 1. For example, seals of the pump 9 should be replaced after a particular number of gallons have been sprayed, whereas continuing to spray without maintenance past that number of gallons risks the fluid sprayer 1 breaking down in the middle of a project.

Aspects of the current disclosure provide features for monitoring the productivity of the fluid sprayer 1, including as part of a fleet of fluid sprayers, to track usage, productivity, and maintenance, as further shown herein. For example, the example techniques described in this disclosure provide for a technical solution with practical application to improve the operation of fluid sprayer 1 (e.g., such as ensuring the fluid sprayer 1 is properly maintained before breaking down, ensuring that fluid sprayer 1 is utilized efficiently, etc.). As described in more detail, the example techniques utilize computational resources available in devices like handheld computer 14 and/or resources available in a cloud-based infrastructure to monitor the productivity of the fluid sprayer 1, including as part of a fleet of fluid sprayers, to track usage, productivity, and maintenance.

FIG. 7 shows a schematic diagram of components of various equipment used in a wireless network for monitoring the fluid sprayer 1. As shown, the fluid sprayer 1 includes control circuitry 21. The control circuitry 21 can be one or more control boards, and can be the same as the control 5. The control circuitry 21 in this embodiment includes a processor 24 operatively connected to memory 22. The processor 24 can be a microprocessor, integrated chip, a controller, a digital signal processor (DSP), an application specific integrated circuit (ASIC), a field-programmable gate array (FPGA), or other equivalent discrete or integrated logic circuitry. The processor 24 can be described, in some examples, as processing circuitry. The memory 22 can be one or more nonvolatile semiconductor memory chip(s), or other type of memory, for storing firmware, software, and/or other type of executable program instructions executable by the processor 24 for managing the operation of the fluid sprayer 1, as well as storing data and other information that can be generated and/or received by the fluid sprayer 1. Memory 22 can include a dedicated space for firmware and temporary memory space (e.g., a first-in-first-out buffer) as the same or separate chips, for example.

The control circuitry 21 can include a clock module, or the processor 24 can operate a counting routine or other clock function to determine current time and date. In some examples, rather than or in addition to control circuitry 21 including a clock module or processor 24 operating a counting routine or other clock function to determine current time and date, handheld computer 14, personal computer 29, and/or network server 35 may include clock modules and or operate a counting routine or other clock function to determine current time and date. As described in more detail, control circuitry (e.g., one or combination of control circuitry 15 of handheld computer 14 or control circuitry 21 of fluid sprayer 1, or possibly other control circuitry) may be configured to determine timing information (e.g., a time window defined by a difference between two events) to determine usage information of fluid sprayer 1.

Determining usage information of fluid sprayer 1 associated with a timing information (e.g., time window) may allow control circuitry to generate usage information in a way that is packetized for ease of storage in memory (e.g., memory 22 or memory of other devices illustrated in FIG. 7) and ease of transmission. In this manner, the example components illustrated in FIG. 7 may operate in a manner that promotes efficient memory storage and bandwidth usage while providing for usage information used to monitor the productivity of the fluid sprayer 1.

In the example of FIG. 7, the control circuitry 21 includes a wireless module 23, which can be a wireless transceiver configured to send and receive data wirelessly with one or more remote computing devices, such as the handheld computer 14. In some embodiments, the wireless module 23 can be separate from the control circuitry 21 but operatively connected to the control circuitry 21. As further explained herein, the wireless module 23 can wirelessly communicate with the handheld computer 14. The wireless module 23 can be configured for wireless communication over a limited distance, such as less than 50 feet, or less than 25 feet, in some embodiments. For example, the wireless module 23 can be configured for BLUETOOTH™ protocol communication by sending and receiving data over short distances using short-wavelength ultrahigh frequency radio waves in the ISM band from 2.4 to 2.485 GHz. The wireless module 23 is operatively connected to the processor 24 for receiving commands from the processor 24 as well as providing data to the processor 24. In some embodiments, the wireless module 23 can send commands and/or data to the processor 24 such that communication is bidirectional.

Although the above example describes the wireless module 23 as communicating directly over a limited distance with the handheld computer 14, the techniques of this disclosure are not so limited. In some examples, wireless module 23 may be configured to communicate indirectly with a network, such as the Internet, via cellular network 41, such as a cellular base station, WiFi base station, or orbiting satellite base station. Accordingly, in some examples, rather than BLUETOOTH communication, the wireless module 23 may communicate with the handheld computer 14, the personal computer 29, or the network server 35 using the cellular network 41. In such examples, the handheld computer 14 need not be nearby fluid sprayer 1 and can communicate with the fluid sprayer 23 using its connection to the network (e.g., Internet). For example, the wireless module 23 can be used to upload and download data from the internet, such as a data managed server network (e.g., in the manner of cloud computing).

Furthermore, in some examples, such as where the wireless module 23 is configured to communicate using the cellular network 41, the fluid sprayer 1 may communicate directly with the network server 35 and/or the personal computer 29 rather than through the handheld computer 14. Where the fluid sprayer 1 communicates with the network server 35 and/or the personal computer 29 without using the handheld computer 14, at least some, and possibly all, of the functionality of the handheld computer 14 may be offloaded to other devices (e.g., the personal computer 29 and/or the network server 35). Accordingly, the handheld computer 14 may not be necessary in all examples.

The control circuitry 21 further includes a motor controller 25. In some embodiments, the motor controller 25 is not part of control circuitry 21 but is nevertheless part of control 5. Motor controller 25 is operatively connected to the processor 24 for receiving instructions from the processor 24 as well as for providing data to the processor 24. The motor controller 25 can include one or more integrated chips for managing the operation of the motor 4. The motor controller 25 can output one or more signals gating electrical power to the motor 4 for driving the motor 4 and/or can deliver power to the motor 4 directly.

The motor 4 can be a brushed or brushless direct current electric motor. The motor 4 can be a rotor stator design. In some cases, the motor 4 can be a combustion engine, such as a gasoline- or diesel-powered motor. In such cases, the operation of the motor 4 can still be managed by the motor controller 25, such as by increasing or decreasing the power output of the motor 4 as needed (e.g., by regulating fuel feed). In some cases, there is no motor controller 25 connected to the processor 24, and the motor controller 25 can be a mechanical mechanism for increasing and decreasing the output of the motor 4, such as by increasing or decreasing the supply of fuel to the motor 4. As previously mentioned, the motor 4 reciprocates the piston 13 relative to the cylinder 12 via drive components 7A-7C.

The fluid sprayer 1 includes a pressure sensor 28. The pressure sensor 28 can be a pressure transducer that measures the hydraulic pressure of the paint exiting, or otherwise pumped downstream of, the pump 9. For example, the pressure sensor 28 can be located in the paint line anywhere between the pump 9 and the gun 3, although the pressure sensor 28 is typically located close the outlet of the pump 9. The pressure sensor 28 can be part of a hose fitting that attaches to the output of the pump 9. The pressure sensor 28 can be a force collector type having a diaphragm, piston, bourdon tube, or bellows that measures strain or deflection of an element due to applied force over an area, and can generate a signal based on the strain or deflection indicative of pressure.

Typically, the pump 9 generates pressures of between 500 to 8000 psi for atomizing the paint in a spray. The user can set a desired pressure level with an input (e.g., a potentiometer dial) of the control 5, which is stored in the memory 22. The processor 24 can then receive the output from the pressure sensor 28 and can in turn modulate the output of the motor 4 driving the pump 9 by controlling the motor controller 25 to approach and maintain the selected pressure.

The fluid sprayer 1 includes a pump cycle sensor 27, which is an example of a drive cycle indicator. Examples of the pump cycle sensor 27 are illustrated as the pump cycle sensor 27A, the pump cycle sensor 27B, the pump cycle sensor 27C, and the pump cycle sensor 27D in FIG. 6. Unless specifically described otherwise, the pump cycle sensor 27 may refer to any one or more of the pump cycle sensor 27A, the pump cycle sensor 27B, the pump cycle sensor 27C, or the pump cycle sensor 27D.

The pump cycle sensor 27 can take several forms and can measure movement or another parameter of various different components. The function of the pump cycle sensor 27 is to provide an indication to the processor 24 of one or both of the completion of a cycle or a stage, or progress in, the cycle of the pump 9. For example, the pump cycle sensor 27 can track and provide an output indicative of a full cycle (e.g., upstroke and downstroke), a half cycle (e.g., the upstroke or downstroke), or a smaller part of a cycle of the pump 9, such as a quarter or tenth of a stroke, amongst other options for cycle increments. The pump cycle sensor 27 can be a linear encoder or Hall effect sensor measuring the travel or cycle of the piston 13 relative to the cylinder 9 (e.g., pump cycle sensor 27A of FIG. 6). The pump cycle sensor 27 can be an encoder or Hall effect sensor that measures rotation of any of the drive components 7A-7C (e.g., pump cycle sensor 27B-27C of FIG. 6), such as one complete revolution or degrees of rotation, which have a direct relationship to the cycle of the piston 13. For example, one of the drive components 7A-7C can have a 24:1 relationship between its complete rotation and one cycle of the pump 9. Other ratios are possible.

The pump cycle sensor 27 can measure a parameter of the motor 4. For example, FIG. 6 illustrates an example of pump cycle sensor 27D that may be configured to measure a partial or complete rotation of a rotor, shaft, armature, or commutator of the motor 4. For ease, reference numeral 26 is shown in FIG. 6 to represent one or more of the rotor, shaft, armature, or commutator of motor 4. The pump cycle sensor 27 can be an encoder or hall effect sensor that senses partial or complete rotation of a rotating component of the motor 4, such as a rotor, shaft, armature, or commutator. In some cases, the pump cycle sensor 27 can be a sensor that measures voltage or current of one or more channels that connects with the armature and/or stator windings of the motor 4, the voltage or current being measured when the channel is not being used to drive the motor 4 to measure induced current indicative of rotation. As with the drive components 7A-7C, the rotation of the components of the motor 4 can be directly correlated to the position of the piston 13 or otherwise correlated to the cycle of the pump 9 to determine the status of the cycle of the pump 9.

As described above, the pump cycle sensor 27 is an example of a drive cycle indicator. The above describes some example ways in which the pump cycle sensor 27 may determine a status of the cycle of the pump 9 (e.g., by directly determining the status of cycle based on sensing the drive components 7A-7C or based on the correlations of the piston 13 with cycle of the pump 9). However, the above examples should not be considered limiting. A drive cycle indicator, such as the pump cycle sensor 27, may be configured in various ways to determine a status of the cycle of the pump 9.

The pump cycle sensor 27 outputs to the control circuitry 21. For example, the pump cycle sensor 27 can provide output, directly or indirectly, to the processor 24. The processor 24 can track cycles of the pump 9, based on the output received from the pump cycle sensor 27, to determine how much fluid has been output by the pump 9. For example, the diameter and displacement of the piston 13 can be known and/or an associated value, coefficient, or representative data can be stored in memory 22. For each partial or full cycle of the pump 9 sensed by the pump cycle sensor 27, a volume of fluid that was output by the partial or full stroke of the pump 9 can be calculated. That is, a volume of fluid that was output per stroke of the pump 9 can be represented as a ratio: (volume/stroke). The ratio may also be considered as a scaling coefficient. For example, twenty cycles of the pump 9 may correspond with a tenth of a gallon pumped (e.g., 0.1 gallon/20 cycles). Therefore, if the pump 9 cycled forty times, then it is known that two tenths of a gallon were output by the pump 9 (e.g., 40 cycles*0.1 gallon/20 cycles equals 0.2 gallons). In another example, a quarter cycle of the piston 13 may correspond to 0.01 gallons pumped, so that each quarter stroke measured can be used to increment a running total of volume pumped by 0.01 gallons (e.g., 0.01 gallon/0.25 cycles). As demonstrated, a ratio or coefficient representing volume pumped per pump cycle increment can be saved in memory (e.g., memory 22) and used to track volume pumped within a time period, such as by multiplying the cycle increments in the period of time by the ratio or coefficient, or incrementing a running total for each indication of pump cycle completion received.

As previously mentioned, the pump cycle sensor 27 may directly measure the movement of the piston 13 or indirectly measure movement of the piston 13 by measuring correlated movement of drive components 7A-7C, a component of the motor 4, or other component or aspect which can be used for identifying and counting partial and/or full cycles of the pump 9 and/or corresponding fluid output by the pump 9.

In addition to showing components of the sprayer 1, FIG. 7 shows example components of the handheld computer 14. As previously mentioned, the handheld computer 14 can be a phone or tablet. The handheld computer 14 includes control circuitry 15. The control circuitry 15 can be a single circuit board or can be composed of multiple operatively connected circuit boards. The control circuitry 15 includes a processor 18 operatively connected to a memory 16. The control circuitry 15 can include a clock module, or the processor 18 can operate a counting routine or other clock function to determine current time and date. The processor 18 and the memory 16 can be similar to any version of the processor 24 and the memory 22 as previously described, and therefore the previous discussion on processor and memory options will not be repeated for brevity.

The control circuitry 15 further includes a Global Positioning System (GPS) module 19 or module for another type of satellite geolocation system. The GPS module 19 communicates with the processor 18. The GPS module 19 can receive multiple location signals from a GPS network 42 which can be used (e.g., by the processor 18) to determine the particular coordinates of the handheld computer 14 on Earth (i.e., a geographic location of the handheld computer 14). There may be other ways in which to determine the particular coordinates of the handheld computer 14 and the GPS module 19 provides some example ways. In other examples of the techniques of this disclosure, the GPS module 19 is not included in the handheld computer 14.

The control circuitry 15 further includes a wireless module 17. The wireless module 17 can be used to wirelessly communicate with the cellular network 41, such as a cellular network. The wireless module 17 can additionally or alternatively be used to connect to other types of wireless networks, such as Wi-Fi networks, among other possibilities. The wireless module 17 is used for bidirectional communication of data over the cellular network 41 or other network. For example, the wireless module 17 can be used to upload and download data from the internet, such as a data managed server network (e.g., in the manner of cloud computing).

The handheld computer 14 further includes one or more interfaces 20. The one or more interfaces 20 can include a display, touch screen, keyboard, button(s), and/or other input and output. The one or more interfaces 20 can receive data from the processor 18 for representation, such as on a display. Likewise, the processor 18 can receive data or other signals from the one or more interfaces 20 corresponding to inputs from the user, such as inputs received in the form of user gestures (e.g., touch gestures, swipe gestures, pinch gestures, two-finger gestures, or other gesture input). While not illustrated in the example of FIG. 7, the handheld computer 14 can include a rechargeable battery. The one or more interfaces 20 can include and/or take the form of a graphical user interface (GUI) presented a display screen of the handheld computer 14, such as a touch screen display. The GUI can present graphical information to a user at the display screen. The GUI can include one or more graphical control elements, such as selection areas, buttons, radio buttons, menus, drop-down menus, or other graphical control elements configured to receive user input.

FIG. 7 also shows a personal computer 29. The personal computer 29 can be a desktop, laptop, tablet, or other type of computing device. In various embodiments, the personal computer 29 does not communicate directly with the sprayer 1 but may indirectly receive data from the sprayer 1 by way of the handheld computer 14, the cellular network 41 (or other wireless network), and the network server 35. Various other embodiments are not so limited. For example, as described above, in some examples, the fluid sprayer 1 may communicate directly with personal computer 29, bypassing handheld computer 14.

The personal computer 29 includes control circuitry 30. The control circuitry 30 includes a memory 31 and a processor 33 which can be configured or otherwise function as described elsewhere herein for other processor and memory components. The control circuitry 30 includes a communication module 32. The communication module 32 can be configured for wireless and/or wired data communication, including sending and receiving data. Communication module 32 can be a card for wireless connectivity to a data network and ultimately the internet. For example, the communication module 32 can include a chip, antenna, and/or other circuitry for wireless communication according to the IEEE 802.11 standards, commonly known as Wi-Fi. The communication module 32 can additionally or alternatively include a network interface card for wired connection with a data network and the Internet.

The personal computer 29 includes one or more interfaces 34. The one or more interfaces 34 can be a screen (e.g., a computer monitor), a touchscreen, a keyboard, a mouse, and/or other input or output component. The one or more interfaces 34 can receive data for displaying or otherwise representing data from the processor 33, and the one or more interfaces 34 can likewise transfer inputs from the user to the processor 33.

The network server 35 may be one of many network servers 35 that manage data in a distributed manner, such as in the manner of cloud computing. The network server 35 includes control circuitry 36. Control circuitry 36 can be similar to control circuitry 30, and as such can be a single or multiple circuit boards. The memory 37, the processor 39, the communication module 38, and the interface 40, can operate similarly to the memory 31, the processor 33, the communication module 32, and one or more interfaces 34 of the personal computer 29. However, it is expected, but not necessarily the case, that the memory 37 of the network server 35 has larger capacity and the processor 39 of the network server 35 is more powerful/faster.

As further described herein, the sprayer 1, the handheld computer 14, the personal computer 29, and the network server 35 work together to monitor the performance and productivity of the sprayer 1. Moreover, the sprayer 1 can be one of several sprayers, and the handheld computer 14 can be one of several handheld computers, such that the network server 35 and the personal computer 29 manage data for a fleet of sprayers. Even though the subsequent examples provide techniques for generation and extraction of data from the fluid sprayer 1 by the handheld computer 14, it will be understood that these and other functions can be performed with various other types of sprayers and handheld computers. Moreover, in some examples, the fluid sprayer 1, the handheld computer 14, the personal computer 29, and the network server 35 may operate together to perform the example techniques described in this disclosure. As an example, in some cases, control circuitry may refer to one or combination of the control circuitry 15 of the handheld computer 14, the control circuitry 21 of the fluid sprayer 1, the control circuitry 30 of the personal computer 29, or the processor 39 of the network server 35.

Figure 8A:
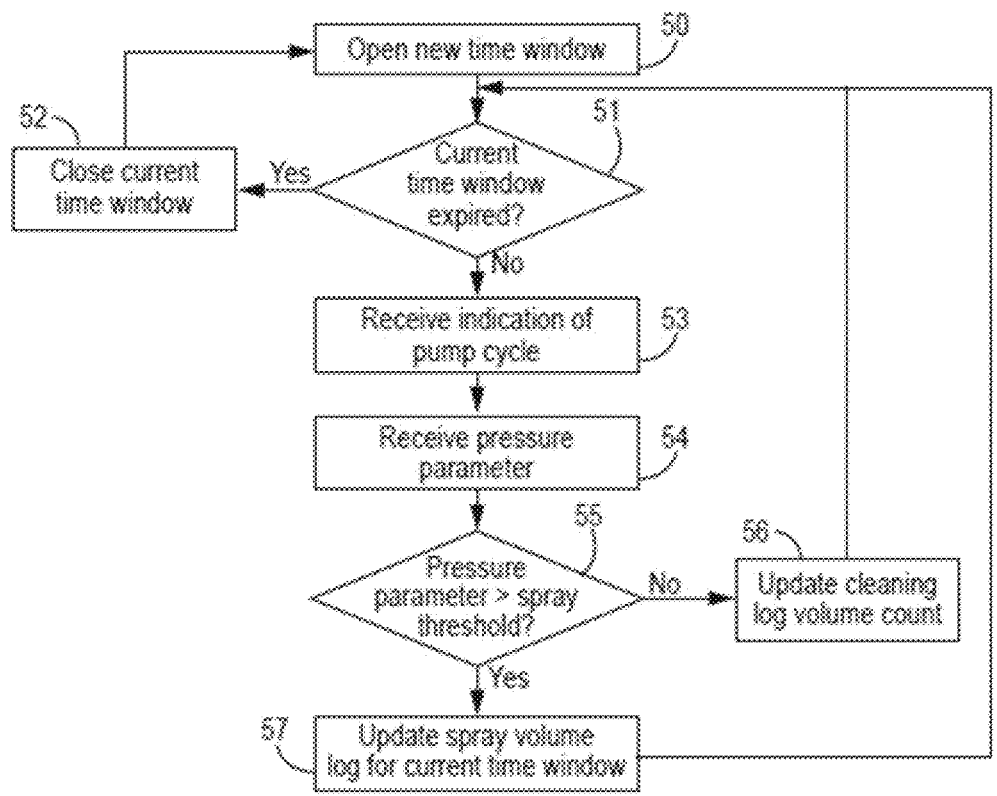
FIG. 8A is a flow diagram illustrating example operations for generating time-based usage information on a sprayer.
Figure 8B:
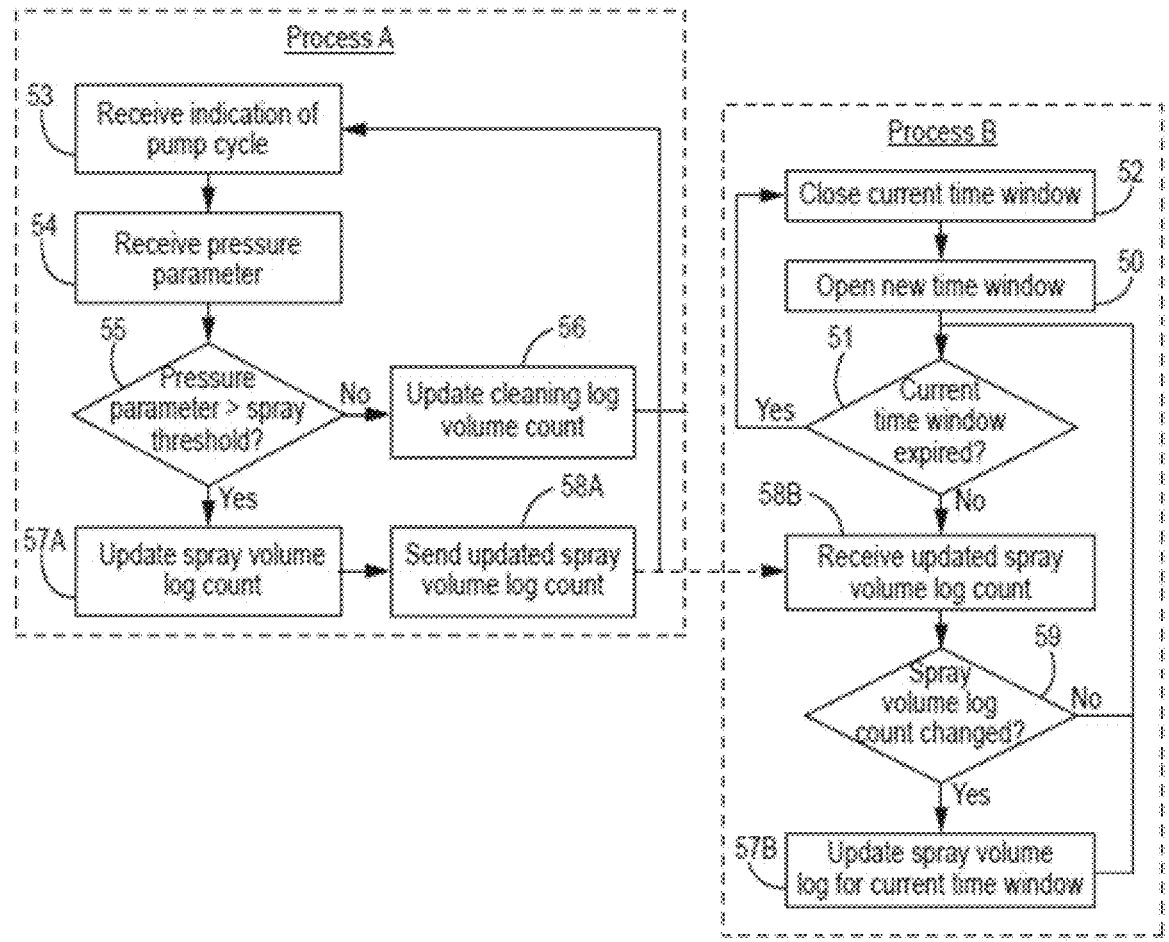
FIG. 8B is a flow diagram illustrating a variation of the operations of FIG. 8A divided into two concurrent processes A and B.

FIG. 8A shows a flowchart of a process for generating time-based usage information on the sprayer 1. The process can be performed by the control circuitry 21. More particularly, the process can be performed by the processor 24 and the memory 22 by receiving inputs from the pump cycle sensor 27 and the pressure sensor 28. FIG. 8B shows a variation of the process of FIG. 8A divided into two concurrent processes A and B. Both processes A and B can be performed by the control circuitry 21. In some cases, both processes A and B can be performed by processor 24 (which can be a single processor or respective processors for processes A and B). In some cases, process A is performed by processor 24 while process B is performed by wireless module 23 (which itself can include a processor). As noted above, the example techniques of FIGS. 8A and 8B may be performed by the control circuitry 21 or in combination with other control circuitry.

The process of FIG. 8A includes a step 50 of the control circuitry 21 opening a new time window. A spray volume log count can be created in the memory 22 for each window opened. A log as referenced herein can be a table, array, queue, linked list, hash table, or other type of organized storage in memory of similar data collected over time for later retrieval. A log count can be an incrementing of a log of a type of data when an event is recognized. A cleaning volume log count can be created in the memory 22 for each window opened. The cleaning volume log count can be a table, array, queue, linked list, hash table, or other type of log in which data can be stored in an organized manner for later retrieval. In various embodiments, each time window has only one cleaning volume log and only one spray log associated therewith, although other types of logs tracking other data may be maintained. Likewise, each cleaning log is associated with only one respective time window, and each spray volume log is associated with only one respective time window.

Each time window represents a predetermined amount of time. In various embodiments, that predetermined amount of time is one hour (60 minutes), such that each opened time window represents the volume of paint sprayed in an hour. Other time window durations are possible. In various embodiments, all time windows will have the same duration, one time window will be open at all times, and only one window will be open at any given time, such that the windows are consecutively open and closed. The time window can be synced to hours of standard time, such that a window opens at the top of each standard time hour (e.g., 9 am, 10 am, 11 am, etc.). Each saved time window entry can include data indicating the standard time and date (e.g., 9 am-10 am, Aug. 5, 2018) of the window. Time zone and other time shifting data may also be saved in the time window entry. In some cases, the sprayer 1 may have no way to identify its location (e.g., GPS chip or Wi-Fi connection), and thus no location information is saved in connection with the time windows or other collected information.

There may be other ways in which to form a time window. For example, a clock module of control circuitry 21 may increment once a second for the duration of the time window (e.g., 3600 increments for a one hour time window). The clock module may start when fluid sprayer 1 is positioned for spraying and stop counting when fluid sprayer 1 is not positioned for spraying (e.g., based on an accelerometer or gyroscope in fluid sprayer 1). In some examples, the clock module may be continuously counting.

The process further includes a step 51 of the control circuitry 21 determining whether the current time window has expired. For example, step 51 can evaluate whether the current time is outside of the definition of the window (e.g., onboard clock indicates it is currently 10:01:01 am while the time window spans 9:00:01 am-10:00:00 am). In step 51, the control circuitry 21 can check a counter that can increment with each second over the predetermined amount of time corresponding to the duration of the time window, such as an hour. While the newly opened time window is unlikely to have expired in one iteration soon after the opening of the window, step 51 is useful for the process for later iterations when returning to step 51.

If the current time window has indeed expired at step 51 (assuming multiple iterations of the process), then the process proceeds to step 52 in which the control circuitry 21 may close the current time window and the process returns to step 50 in which a new window is opened. If in step 51 the current time window has not expired, then the process advances to step 53.

In step 53, the control circuitry 21 may receive an indication of pump cycle. The indication can be received by the processor 24 from the pump cycle sensor 27. The indication of pump cycle can be an indication that a rotating or reciprocating element completed a cycle or completed a portion of a cycle, as previously described. In some cases, the indication may be zero, or the indication might not be received, wherein either case indicates that the pump 9 is not being driven by the motor 4 or the pump 9 is otherwise not cycling. In some cases, the indication received from the pump cycle sensor 27 can indicate that a volume of fluid has been pumped, such as an indication corresponding to the partial or complete cycle of the pump 9. In some embodiments that count by tenths of fluid volume, the indication can indicate that a 0.1 gallon increment of fluid was pumped according to the pump cycle sensor 27.

In step 54, the control circuitry 21 may receive an indication of a pressure parameter. The pressure parameter can be the output of the pressure sensor 28 measuring the pressure of the paint downstream of the pump 9 and upstream of the gun 3 and then received in step 54. In some cases, the received indication of the pressure parameter may be the current pressure setting and not a measured pressure. It is noted that the orders of steps 53 and 54 may be reversed, or they may be concurrent (e.g., contemporaneous).

After receiving the indication of the pressure parameter in step 54, the control circuitry 21 references (e.g., associates) in step 55 the indication of the pressure parameter relative to a spray threshold. The pressure parameter referenced (e.g., associated) is the pressure parameter received in that iteration of the process, and subsequent loops of the process will reference updated pressure parameters received in the respective loops. The spray threshold can be a threshold that distinguishes between a spray pressure generated by the pump 9 and a lower cleaning pressure generated by the pump 9. For example, step 55 may determine whether the pressure parameter of step 54 is greater than (or equal to) a stored spray pressure threshold representing a spray pressure.

As an example, the control circuitry 21, as described above with step 53, may receive the indication of cycle status of the pump 9 and determine a plurality of fluid output values representing fluid output volume over time based on the indication of the cycle status of the pump 9. The control circuitry 21 may store the plurality of fluid output values in memory 22 of the control circuitry 21. For instance, as described above, the memory 22 may store a ratio or coefficient value that indicates the volume of fluid that is sprayed per cycle of the pump 9. Based on the cycle status of the pump 9, the control circuitry 21 may determine the volume of fluid that the fluid sprayer 1 sprayed (e.g., a ratio or coefficient value multiplied by the number of strokes through the cycle). The control circuitry 21 may perform multiple such measurements over time (e.g., within a time window) to determine a plurality of fluid output values.

Each of the fluid output values may be associated with a fluid pressure. For example, a first fluid output value of the plurality of fluid output values may be based on a first cycle status of the pump 9 and a first fluid pressure may be the pressure of the spray during the first cycle. A second fluid output value of the plurality of fluid output values may be based on a second cycle status of the pump 9 and a second fluid pressure may be the pressure of the spray during the second cycle. In this example, the first fluid pressure is associated with the first fluid output value and the second fluid pressure is associated with the second fluid output value.

The control circuitry 21 may be configured to compare respective fluid pressure, associated with respective fluid output values, to the threshold. Based on the result of the comparison, the control circuitry 21 may determine whether or not to store the associated fluid output value. As described in more detail elsewhere in this disclosure, if the fluid pressure is less than or equal to the threshold, then the fluid sprayer 1 was in a non-atomizing flushing mode (e.g., cleaning mode or flushing mode), which tends not to cause wear and tear on the fluid sprayer 1. If the fluid pressure is greater than the threshold, then the fluid sprayer 1 is being used for its intended purpose (e.g., spraying coats of paint and is in a paint spraying mode also called fluid atomizing spray mode), which tends to cause wear and tear on the fluid sprayer 1. In some examples, storing information of when the fluid sprayer 1 was operating for its intended use (e.g., in fluid atomizing spray mode) may be more important than when the fluid sprayer 1 was in non-atomizing flushing mode (e.g., cleaning mode), such as for determining whether the fluid sprayer 1 is due for maintenance or nearing its end-of-life.

For instance, the control circuitry 21 may compare the first fluid pressure, associated with a first fluid output value, to a threshold and compare the second fluid pressure, associated with a second fluid output value, to the threshold. The control circuitry 21 may store the first fluid output value in a spray log tracking volume based on the first fluid pressure being above the threshold, and not store the second fluid output value in the spray log tracking volume based on the second fluid pressure not being above the threshold. Also, the control circuitry 21 may store the second fluid output value in a cleaning log tracking volume based on the second fluid pressure not being above the threshold, and not store the first fluid output value in the cleaning log tracking volume based on the first fluid pressure being above the threshold.

In various embodiments, spray threshold can be a pressure value above 5 PSI, above 50 PSI, above 100 PSI, above 200 PSI, or above 400 PSI, among other options. In various embodiments, the spray threshold can be a pressure value between 5-500 PSI, 50-500 PSI, 100-500 100 PSI, 200-500 PSI, 300-500 PSI, or 300-400 PSI, among other options.

Before returning to step 55, a discussion of the cleaning procedure will be helpful. An operator of the sprayer 1 will typically spray paint at a pressure above 500 PSI, and more likely between 1000-4000 PSI, to adequately atomize the fluid being sprayed to form a desired spray fan with which to evenly coat surfaces being sprayed. At the end of the spray session (e.g., at the end of the job and/or day) the operator will ordinarily flush and clean the sprayer 1 (including the pump 9) with water or other solvent to remove paint before the paint dries, which would otherwise risk seizing the pump 9 or clogging a fluid line. Such flushing is normally done below 500 PSI, and is ordinarily done well below 400 PSI, because no atomization of the flushing fluid is needed and high flow is desired instead of high pressure. The operator may set the output pressure between 100-400 PSI (e.g., manually with the pressure dial or automatically by selecting a cleaning mode) and feed water into the intake hose 2B. The operator may also remove the atomizing nozzle in the gun 3 to transition the sprayer 1 from high pressure, low volume spraying to high flow, low pressure cleaning. Based on the pressure setting, the processor 24 will control the motor controller 25 to maintain the measured pressure at the pressure setting as assessed by the pressure sensor 28. The pump 9 is used to move the cleaning fluid through the sprayer 1 but the pumped volume of cleaning fluid should not be counted as a volume (e.g., gallon) of sprayed paint for several reasons. A first reason is that if tracking painting productivity and/or paint consumption, then cleaning volume should not be counted as painting volume. Also, pumping of cleaning fluid at low pressure is not as stressful on the sprayer 1 components and does not contribute to wear of the components to the degree that high pressure pumping of paint does.

Step 55 is used to discriminate between cleaning volume pumped and spray volume pumped by comparing the measured or set pressure to a spray threshold. If the received pressure parameter is above the spray threshold, then the received indication of a pump cycle in step 53 is assumed to relate to (i.e., categorized as) spraying, and the volume pumped will be allocated to a spray log and not a cleaning log. If the received pressure parameter is below the spray threshold, then the received indication a pump cycle in step 53 is assumed to relate to (i.e., categorized as) cleaning, and the volume pumped will be allocated to a cleaning log and not a spray log. Accordingly, the control circuitry 21 may store the first fluid output value, associated with a first fluid pressure, in a spray log tracking volume based on the first fluid pressure being above the threshold, and not store the second fluid output value, associated with a second fluid pressure, in the spray log tracking volume based on the second fluid pressure not being above the threshold. Also, the control circuitry 21 may store the second fluid output value, associated with a second fluid pressure, in a cleaning log tracking volume based on the second fluid pressure not being above the threshold, and not store the first fluid output value, associated with a first fluid pressure, in the cleaning log tracking volume based on the first fluid pressure being above the threshold As an alternative to using a pressure parameter, in some embodiments, a user indicates, using an one or more interfaces 20 on the sprayer 1 (e.g., a button), whether a spraying or cleaning mode (e.g., non-atomizing flushing mode) has been entered. In such examples, at step 55, the control circuitry 21 may be a check whether the sprayer 1 is in a fluid atomizing spray mode or a cleaning mode and allocate spraying or cleaning volume accordingly in respective spray or cleaning volume logs.

If in step 55 the pressure parameter is less than the spray threshold, then the process advances to step 56 and the control circuitry 21 increments a cleaning log volume count. The cleaning log volume count can be stored in memory and associated with the open time window. If in step 55 the pressure parameter is greater than the spray threshold, then the process advances to step 57 and increments a spray volume log count associated with open time window. The volume increment for either cleaning or spraying can correspond with the indication of the pump cycle received in step 53. For example, if an indication of the completion of one piston cycle is received, then the displaced volume for one piston cycle (and/or just an indication of completion of a piston cycle) may be incremented in either the cleaning volume log or the spray volume log. In some cases, if an indication of the completion of a partial piston cycle is received, then the displaced volume for the partial piston cycle (and/or just an indication of completion of the partial piston cycle) may be incremented in either the cleaning volume log or the spray volume log.

It is noted that some embodiments do not include a cleaning log volume count, in which case no cleaning log volume count is maintained in memory and accordingly is not incremented if the pressure parameter is less than the spray threshold. The check of the pressure parameter relative to the spray threshold can still be useful to discriminate between spray volume and cleaning volume so as not to count cleaning volume as spray volume. In which case, the indications of pump cycle are not counted or otherwise stored in any memory past the comparison of step 55. It may be useful, but not necessary, to discriminate between spraying and cleaning pumped volume because paint is more expensive than cleaning fluid (typically water), spraying represents productivity on a project for a painter, and spraying at high pressure wears the motor 4, drive components 7, and pump 9 faster than low pressure cleaning, amongst other reasons.

It is noted that if there is no increment or other type of advancement or change in the indication of pump cycle as compared to the previous iteration of the loop and step 53, then no increment, increase, or other change is made in either the cleaning volume log or the spray volume log for that loop of the algorithm of FIG. 8A. If such a check indicates no change, then the process can proceed from step 53 directly to step 51. In some embodiments, as part of step 53, the process frequently checks (e.g., every ¼ or ¹⁄₁₀ of a second, or multiple times per second) the current indication of pump cycle, and if there was a change relative to the last check, then a lifetime pump cycle counter stored in memory 22 is incremented, the lifetime pump cycle counter representing the total pump cycles over the then-current lifetime of the sprayer 1. Instead of a lifetime pump cycle counter, the counter may be a pump cycle counter that represents a broader timeframe (e.g., resetting once per day, week, month, or year) than the time window which may only be an hour. A check can then be performed periodically, (e.g., once per second or once every ten seconds, but less frequently than the check of the indication of pump cycle) of the lifetime or other counter to see if there is a change relative to the last time the counter was checked (e.g., one second ago or last loop iteration). If there is a change, the amount of change is used to calculate or otherwise determine (e.g., by subtracting the counter level at last check from the current counter level) the volume pumped since the last check, the volume being used to increment logs as further discussed in connection with steps 56, 57.

After incrementing in either step 56 or 57, the process returns to step 51 to check the current time window to see if the current time window has expired. If the current time window has expired, then the current window is closed in step 52 and the spray volume (also called fluid output value) incremented or otherwise counted is saved in memory 22 for that time window. As such at the end of the time window, such as after an hour or otherwise representing an hour of data, the process calculates the volume sprayed (and optionally pumped for cleaning purposes) in that time window. Because the process includes counting the number of spray volume increments dispensed in each of consecutive windows, the process tracks productivity over a period of time comprising multiple time windows.

In some embodiments, the incrementing steps 56 and 57 can save a check (or other type of increment) in memory 22 associated with the time window for the spray volume log and/or the cleaning volume log. Each check can represent a full or partial pump cycle, but in either case it is known (e.g., saved in memory 22) or can be calculated (e.g., based on displacement of the piston 13) how much fluid would have been pumped by each full or partial pump cycle. The checks made within a time window can be totaled after closure of the time window to calculate the total volume sprayed or flushed in a cleaning procedure with the time window. Alternatively, the checks can be totaled as a running volume value through the course of the time window, the total being updated with each pump cycle increment.

For example, for one time window, five different checks or increments can be saved in association with a spray volume log in step 57, which can later be totaled and a total spray volume for the window calculated. Alternatively, a counter can be maintained during the window and incremented at each occurrence of step 57. For example, for the first occurrence of step 57, the counter would be at one, and after the second occurrence the counter would be at two, after the third occurrence the counter would be at three, and so on. As another alternative, step 57 could include calculating and saving the volume sprayed instead of saving checks or increments. For example the first occurrence of step 57 might count 0.1 gallons sprayed, and the second occurrence of step 57 might increment the total count to 0.2 gallons sprayed, and the third occurrence of step 57 might increment the total count to 0.3 gallons sprayed.

Below is an example table which can correspond with data stored in memory 22 for multiple time windows. As shown, each time window extends for an hour, and various types of data are stored for each time window. The data includes a window serial number (which are incremented sequentially and not repeated to provide a reference independent of time for each window), date of the window, timeframe of the window, spray volume pumped during the window, and cleaning volume pumped during the window. In some cases, only dates and times are used, instead of window serial numbers, to differentiate data sets corresponding to different time periods. This table shows the time before a working session (in which no spraying or cleaning volumes are logged), the time in which work is occurring including spraying transitioning into cleaning, and the time after the working session (in which no spraying or cleaning volumes are logged), which can be reviewed later to track productivity and paint usage and otherwise profile the use of the sprayer 1.

| Window # | Date | Time | Spray volume | Cleaning volume |
|---|---|---|---|---|
| 13256 | Aug. 5, 2018 | 6 am-7 am | 0.0 | 0.0 |
| 13257 | Aug. 5, 2018 | 7 am-8 am | 4.5 | 0.0 |
| 13258 | Aug. 5, 2018 | 8 am-9 am | 5.4 | 0.0 |
| 13259 | Aug. 5, 2018 | 9 am-10 am | 1.8 | 0.0 |
| 13260 | Aug. 5, 2018 | 10 am-11 am | 0.3 | 5.1 |
| 13261 | Aug. 5, 2018 | 11 am-12 pm | 0.0 | 0.0 |

In some embodiments, the above data types are the only types of data saved for tracking productivity. For example, the voluminous pressure and pump cycle data received in steps 53 and 54 are not saved, or are saved only so long as to complete the current loop, or are saved only until closure of the time window, but in any case are not referenced or otherwise used following closure of the time window. Saving only one spray volume value and one cleaning volume value for each time window, which can be calculated from thousands of measurements, minimizes data storage and data transmission. For example, the pressure and pump cycle data of steps 53 and 54 are not saved as part of the spray volume and cleaning volume logs, nor is the pressure and pump cycle data of steps 53 and 54 transmitted off of the sprayer 1. That is, the pressure and pump cycle data can be deleted (i.e., removed from memory), such as upon closing of a respective time window. Accordingly, in some examples, only the aggregated running total of output volumes (spraying and/or cleaning volumes) can be stored for each time window, thereby decreasing an amount of data stored within memory of the sprayer. In this manner, the example techniques may packetize and reduce the amount of data that needs to be stored and transmitted, thereby promoting memory storage and transmission bandwidth, while ensuring that sufficient data is available to track productivity of the sprayer 1 (e.g., which may include productivity of sprayer 1 or the user of sprayer 1).

In FIG. 8A, in some embodiments, if the indication of pump cycle of step 53 is the same as the last iteration of the process (e.g., the pump 9 has not been driven or otherwise cycled in any way since the last iteration) than the process loops back to the window steps (e.g., step 51) without updating the spray volume log in step 57 or the cleaning log in step 56 (e.g., pump cycle information is not saved or otherwise logged for that iteration of the process).

FIG. 8B shows flowcharts of processes A and B. Processes A and B can be part of the processes of the embodiment of FIG. 8A. As previously mentioned, processes A and B can be performed by the control circuitry 21 (or possible other circuitry in combination with control circuitry 21). Process A can be performed by the processor 24, which can be one or dual processors performing the respective processes A and B. In some embodiments, process A can be performed by processor 24 while process B can be performed by the wireless module 23.

Similarly numbered steps between the embodiments of FIGS. 8A and 8B can be the same between the two embodiments of FIGS. 8A and 8B. Additional steps include step 57A, in which a spray volume log count is updated if the pressure parameter is greater than a spray threshold is determined by step 55. The updating of step 57A can include increasing a running total of spray volume stored in memory 22. For example, if the current iteration of process A measures a 0.0001 gallon output based on the received indication a pump cycle in step 53, then the running total of spray volume can be increased by 0.0001 gallons. Step 57A alternatively stores a spray volume count in a log in memory 22, wherein iterations of process A create serial spray volume log entries of the volumes sprayed, if any, which can later be totaled or otherwise aggregated.

The embodiment of process A further includes step 58A in which the updated spray volume log count is sent. Step 58B includes receiving the updated spray volume log count for use in process B. The sending of step 58A can include sending between components of control circuitry 21, such as between processors and/or wireless module. For example, the processor 24, while performing process A, can send the updated spray volume log count to the wireless module 23, performing process B. Sending can also include sending to the memory 22 for temporary storage before being referenced in the memory 22 in the receiving step 58B.

Process B includes a step 59 of determining whether the spray volume log count has changed. If the updated spray volume log count is not received in step 58B, or is received but is the same as the last time it was received in the last iteration of process B (e.g., is equal to the spray volume log count stored in memory 22 in the last iteration), then the process B can return to step 51 of determining whether the current time window has expired. However, if the spray volume log count has changed since the last iteration of process B (e.g., is not equal to the spray volume log count stored in memory 22 in the last iteration), then the spray volume log for the current time window is updated in step 57B. In step 57B, the updated spray volume log for the current time window is attributed or otherwise saved in connection with the current open time window. The updated spray volume log the current time window can be a running total of volume sprayed within the open time window, wherein each update increases the running total by the amount measured for the current iteration (e.g., the amount received in step 58B, or the calculated difference between the amount received in step 58B in the current iteration of process B as compared to the last iteration of process B).

Figure 8C:
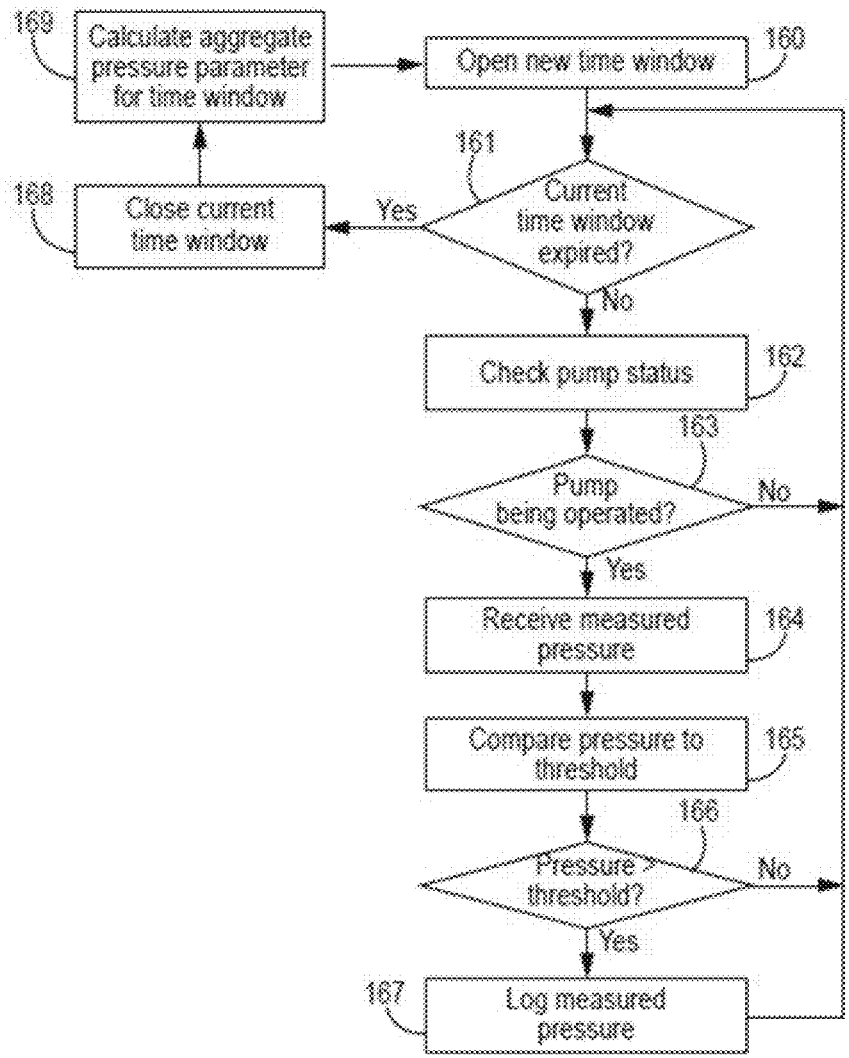
FIG. 8C is a flow diagram illustrating example operations for generating time-based spray pressure information on a sprayer.

FIG. 8C shows a flowchart of a process for generating time-based pressure information on the sprayer 1. The process can be performed by the control circuitry 21. More particularly, the process can be performed by the processor 24 and memory 22 by receiving inputs from the pump cycle sensor 27 and the pressure sensor 28. Generally, the sprayer 1 collects pressure measurements when the pump 9 is being operated during a time window. Pressure measurements collected when the pump 9 is not being operated are not saved. The sprayer 1 calculates an aggregate pressure parameter, such as average pressure, based on closure of the window from pressure data collected within the time window to represent a pressure metric for the time window.

Step 160 includes opening a new time window. Step 161 includes determining whether the current time window has expired. Step 168 includes closing the current time window. The step 160 can be the same as step 50, step 161 can be the same as step 51, step 168 can be the same as step 52, such that the time window is the same for both processes. Alternatively, the operation of a time window for pressure data can be performed similarly to any time window operation referenced herein. Therefore, the process of FIG. 8A can run concurrently with the process of FIG. 8C and similar steps can be the same step between the processes. In other embodiments, steps 160, 161, 168 can operate similarly to steps 50, 51, 52, respectively but can be different time windows corresponding to different periods of time. For example, the length of the time window of the process of FIG. 8A can be less than the length of the time window for the process of FIG. 8C (e.g., one hour and multiple hours (e.g., 24 hours), respectively). Due to the similarities of steps, the opening and closing the time window will not be present again, but any of the time window options referenced herein are possible for this embodiment.

Step 162 includes checking the pump status. Checking the pump 9 status can include determining if the pump 9 is currently being cycled, such as whether the piston 13 is being reciprocated. Checking the pump 9 status can be performed by receiving a signal from the pump drive cycle sensor 27. Checking the pump 9 status can include determining if the motor 4 is operating (e.g., outputting rotational motion to pump 9). Checking the pump 9 status can include determining whether the processor 24 and/or motor controller 25 is causing driving power to be delivered to the motor 4. A comparison can be performed to determine whether the position of components (e.g., drive components on which sensor components are mounted) has changed since the last time data was received, which can be on a quarter second or other short, periodic basis.

Step 163 includes determining whether the pump 9 is being operated. The assessment of step 163 is performed based on the information collected in step 162. Step 163 can include comparing the most recently received pump drive cycle sensor 27 output to the second most recently received pump drive cycle sensor 27 output to determine whether the state of the pump has changed. Step 163 can include a binary determination of whether driving power is being delivered to the motor 4 by the motor controller 25.

If step 163 determines that the pump 9 is not being operated ("no"), the process loops back to the time window steps, such as step 161 or another step. If step 163 determines that the pump 9 is being operated ("yes"), the process continues to step 164. In step 164, the measured pressure is received. Step 164 could be the same as step 54 or any other step referenced herein for measuring pressure or otherwise receiving pressure data. The process advances to step 165 in which the measured pressure is compared to a pressure threshold. Based on this comparison, in step 166 if the measured pressure is greater than the pressure threshold then the process advances to step 167. If the measured pressure is less than the pressure threshold, then the process can revert back to assessing time windows, such as example step 161. The pressure comparison in steps 165 and 166 can be similar to the comparison of step 55. For example, the pressure threshold can be the same value, and the check may be performed only once and the results of the check used to drive each process. The purpose of the check is that some operations of the pump 9 may not correspond to spraying. For example, some low pressure operations concern cleaning the pump which do not put as much wear on the pump parts (e.g., by pumping water instead of abrasive paint) and are not indicative of high-pressure airless spraying which puts more mechanical stress on the parts due to the high pressure. The pressure threshold can be 400 pounds per square inch. The pressure threshold can be 500 pounds per square inch. The pressure threshold can be between 50 pounds per square inch and 700 pounds per square inch. Other threshold values are possible, including higher and lower threshold values.

If in step 166 it is determined that the measured pressure is greater than the pressure threshold, then the process can in step 167 save the measured pressure from step 164 in a pressure log. Logging the measured pressure can include saving an indication of each pressure value in memory 22. After the measured pressure is saved, the process returns to the window steps, such as step 161 determine whether the current window has expired. In this way the process of FIG. 8C can loop iteratively on a periodic basis, such as once every quarter second, once every second, once every ten seconds, once every minute, or on some other periodic basis. A dwell step might be inserted in the loop to ensure that each iteration is performed on a scheduled periodic basis. The measured pressure is stored in the pressure log for every iteration of the loop in which the pump 9 is being driven. The measured pressure is not stored for any iteration of the loop in which the pump 9 is not being driven because such pressure is not indicative of the pressure when spraying. Only saving pressure measurements in the pressure log when spraying means that the pressure log for each time window will only indicate the spray pressure and not the pressure which may have been measured in the window while not spraying, which may include fluctuations due to spikes and/or pressure control changes by the user.

When an iteration of the loop step 161 determines that the duration of the current time window has expired, then the process moves to step 168 in which the current time window is closed. Based on the closure of the window, the process in step 169 calculates the aggregate pressure parameter for the time window (e.g., the time window that disclosed) using the pressure log that was generated during the time window. The aggregate pressure parameter can be the average pressure calculated from all of the logged (e.g., step 167) measured pressure values (e.g., step 164) in that time window. For example, all of the pressure values can be added together then divided by the number of pressure values. In some embodiments, the pressure log comprises a first number representing a running sum of all pressure values and a second number representing the number of values contributed to the running sum, so that the calculation of the average pressure for the time window comprises dividing the first number by the second number. Alternatively, the median or mode pressure value can be calculated for the time window. The aggregate pressure parameter then indicates the spray pressure used within the time window. The process can be repeated to calculate different aggregate pressure parameters for various time windows, including consecutive time windows, to understand changes in aggregate pressure parameter over multiple time windows.

Such an aggregate pressure parameter can be useful in understanding the quality of the spray. Lower pressure spray typically produces a better finish and less paint wastage while high-pressure spray might provide higher hourly productivity. Reporting of aggregate pressure parameters for time window can provide an indication of whether the painter favored quality and paint efficiency or speed for the particular time window. The purpose in only logging pressure measurements from when the pump 9 is being driven for the aggregate pressure parameter is that pressure measurements during non-spray periods are not indicative of the spray quality even though the measured pressure may be near the spray pressure. Likewise, pressure threshold check of step 166 can differentiate between cleaning and spraying, whereby the measured pressure during cleaning would spoil the aggregate pressure parameter if included.

After calculation of the aggregate pressure parameter value, the pressure log for the time window can be deleted from memory 22 while the aggregate pressure parameter value can be saved. As further discussed herein, the aggregate pressure parameter value can be wirelessly communicated to the handheld computer 14 and then to the network server 35. Only saving the aggregate pressure parameter value after closure of the window while deleting most or all of the pressure measurement values (and the indicator of pump status) from the time window saves space in memory 22 and is more efficient to transmit to the handheld computer 14 and the network server 35.

In some embodiments, the measured pressure values and/or the pump status indicator data are wirelessly transmitted from the sprayer 1 to the handheld computer 14 and the handheld computer performs the steps of FIG. 8C. However, such a system may not be ideal because data may be then lost when the sprayer 1 is not in wireless communication with the handheld computer 14. Therefore, calculation of the aggregate pressure parameter aboard the sprayer 1 captures the data regardless of whether the handheld computer 14 is in range of the sprayer 1, allowing aggregate pressure parameters for multiple window time windows to be uploaded when in range.

Accordingly, the examples illustrated with FIGS. 8A-8C describes a hand portable paint sprayer 1 for spraying spray fluid. Control circuitry 21 may be configured to receive plurality of cycle status indications of pump 9 and determine a plurality of output values representing spray fluid output volume over a plurality of time windows. Output values (e.g., spray fluid output values) may refer to fluid output values when sprayer 1 is in the fluid atomizing spray mode. For example, as described above, in some examples, output values may indicate spray fluid output volume when sprayer 1 is in the fluid atomizing spray mode and exclude fluid output values when sprayer 1 is in the non-atomizing flushing mode (e.g., cleaning mode or flushing mode). Control circuitry 21 may store the plurality of spray fluid output values (or simply "output values") generated over a plurality of time windows (e.g., as described with respect to FIGS. 8A-8C) in memory 22 and cause wireless module 23 to transmit one or more of the stored output values externally from the sprayer.

For instance, as described in more detail, handheld computer 14 may request for output values that are stored in memory 22 but were not previously output from memory 22. In such examples, wireless module 23 may transmit some, but may be not all, of the stored output values (e.g., not transmit previously transmitted output values). As another example, based on connectivity of handheld computer 14 to cellular network 41, handheld computer 14 may request for all of the stored output values or some of the output values.

Whether sprayer 1 is outputting spray fluid (e.g., paint) may be based on whether sprayer 1 is in fluid atomizing spray mode or non-atomizing flushing mode. Control circuitry 21 may determine a spray fluid output value based on sprayer 1 operating in the fluid atomizing spray mode (e.g., paint spraying mode). There may be various ways in which control circuitry 21 may determine if sprayer 1 is in a fluid atomizing spray mode or non-atomizing flushing mode. As one example, control circuitry 21 may rely on user selected operation mode (e.g., a user indicates, using an one or more interfaces 20 on the sprayer 1, whether a fluid atomizing spray mode (e.g., paint spraying mode) or non-fluid atomizing spray mode (e.g., non-spraying mode) has been entered).

In some examples, control circuitry 21 may determine whether an indication of the cycle status from the plurality of cycle status indications of pump 9 is associated with sprayer 1 being in fluid atomizing spray mode or a non-atomizing flushing mode. For instance, control circuitry 21 may determine, for a particular indication of the plurality of cycle status indications, whether the pressure associated with that particular indication is greater than a spray threshold or whether sprayer 1 was in fluid atomizing spray mode. In such examples, control circuitry 21 may determine a spray fluid output value for the indication of the cycle status when the indication of the cycle status of the pump is associated with sprayer 1 being in the paint fluid atomizing spray mode.

For example, to determine the plurality of output values, control circuitry 21 may be configured to determine whether one or more indications of the plurality of cycle status indications of the pump are associated with sprayer 1 being in a fluid atomizing spray mode or a non-spraying flushing mode. Control circuitry 21 may determine one or more output values of the plurality of output values (e.g., output values representing spray fluid output volume) using the one or more indications of the plurality of cycle status indications associated with sprayer 1 being in the fluid atomizing spray mode.

Similarly, in some examples, control circuitry 21 may be configured to track volume in non-atomizing flushing mode (e.g., non-spraying mode). In such examples, as illustrated with respect to FIG. 8A, control circuitry 21 may determine whether an indication of a cycle status of pump 9 is associated with sprayer 1 being in the fluid atomizing spray mode or the non-atomizing flushing mode, and determine a non-spray fluid output value for the indication of the cycle status from the plurality of cycle status indications when the indication of the cycle status of pump 9 is associated with sprayer 1 being in the non-atomizing flushing mode (e.g., store the output values for non-atomizing flushing mode in a cleaning log tracking volume in memory 22).

For example, control circuitry 21 may be further configured to determine a plurality of non-atomizing flushing output values. To determine the plurality of non-atomizing flushing output values, control circuitry 21 may be configured to determine whether one or more of the plurality of cycle status indications of the pump 9 are associated with the sprayer 1 being in a fluid atomizing flushing mode or a non-atomizing flushing mode. Control circuitry 21 may determine one or more non-atomizing flushing output values of the plurality of non-atomizing flushing output values using the one or more indications of the plurality of cycle status indications associated with the sprayer being in the non-spraying flushing mode.

As described above with respect to FIGS. 8A-8C, one example way in which control circuitry 21 may determine whether a current time window of the plurality of time windows expired is based on a count of cycles (e.g., partial or full cycles) of pump 9. However, control circuitry 21 may not count every single cycle. For instance, in some examples, if a received indication of the pump cycle of the plurality of cycle status indications (e.g., step 53) is not associated with sprayer 1 being in fluid atomizing spray mode (e.g., pressure, as measured is too low, or as set by user is too low), then control circuitry 21 may not increase the count cycle.

For example, control circuitry 21 may be configured to generate data indicative of spray volume (e.g., such as plurality of fluid output values include output values for sprayer 1 in fluid atomizing spray mode and, optionally, output values for sprayer 1 in non-atomizing flushing mode). To generate the data indicative of spray volume, control circuitry 21 may count full or partial pump cycles of pump 9 and generate the data indicative of spray volume based on the count of full or partial pump cycles of pump 9. In some examples, control circuitry 21 may count a pump cycle if sprayer 1 is in a fluid atomizing spray mode and not count a pump cycle if sprayer 1 is in a non-atomizing flushing mode. For example, to generate the data indicative of the spray volume, control circuitry 21 may be configured to determine whether sprayer 1 is operating in a fluid atomizing spray mode (e.g., paint spraying mode) or a non-atomizing flushing mode (e.g., non-paint spraying mode). As one example, for each indication of the pump cycle, control circuitry 21 may determine whether that indication of the pump cycle is associated with sprayer 1 being in a fluid atomizing spray mode or non-atomizing flushing mode. Control circuitry 21 may generate the data indicative of spray volume based on a count of full or partial cycles of pump 9 when sprayer 1 is operating in the fluid atomizing spray mode.

As an example, control circuitry 21 may determine a first fluid output value, associated with a first pressure, based on a first indication of the cycle status of the pump, and determine a second fluid output value, associated with a second pressure, based on a second indication of the cycle status of the pump. Control circuitry 21 may determine that the first fluid output value is one of the output values (e.g., spray fluid output value representing spray fluid output volume) based on the first pressure being greater than a threshold, and determine that the second fluid output value is not one of the output values (e.g., is not a spray fluid output value representing spray fluid output volume) based on the second pressure being less than the threshold.

In this example, control circuitry 21 may increase the count of the cycle of pump 9 for the first fluid output value and may not increase the count of the cycle of pump 9 for the second fluid output value. Control circuitry 21 may store the first fluid output value in the spray log tracking volume (e.g., based on the determination that the first fluid output value is one of the output values representing spray fluid output volume) and not store the second fluid output value in the spray log tracking volume (e.g., based on the determination that the second fluid output value is not one of the output values representing spray fluid output volume). In the examples where a cleaning log volume is maintained, control circuitry 21 may store the second fluid output value in the cleaning log (e.g., based on the determination that the second fluid output value is not one of the output values representing spray fluid output volume) and not store the first fluid output value in the cleaning log (e.g., based on the determination that the first fluid output value is one of the output values representing spray fluid output volume).

FIGS. 9-13 are flowcharts representing communications between different system components, particularly between the sprayer 1, the handheld computer 14, the network server 35, and the personal computer 29, which may be by short range wireless communication, cellular network 41, and/or the internet. These transmissions can be carried out by the wireless module 23, the wireless module 17, the communication module 32, and the communication module 38. Such communication can use the methods referenced herein, for example, amongst other possible communication techniques. Arrows crossing over dashed lines between the columns associated with the sprayer 1, the handheld computer 14, the network server 35, and/or the personal computer 29 represent wired and/or wireless communications between the sprayer 1, the handheld computer 14, the network server 35, and the personal computer 29 facilitated by the wireless module 23, the wireless module 17, the communication module 32, the communication module 38, the cellular network 41, and/or other infrastructure for digital communication.

FIG. 9 is a flowchart demonstrating the steps in coupling the handheld computer 14 to the sprayer 1 and then moving data generated on the sprayer 1 to the network server 35 via the handheld computer 14. The flowchart demonstrates transmission and reception of communications between the sprayer 1, the handheld computer 14, and the network server 35. As will be further discussed, two modes are shown (modes A and B), depending on the connectivity between the handheld computer 14 and the network server 35. More specifically, mode A is used when there is a wireless connection between the handheld computer 14 and the network server 35 at the time that data retrieval from the sprayer 1 is requested. Mode B is used when there is no connection between the handheld computer 14 and the network server 35 at the time that data retrieval from the sprayer is requested (i.e., a communication path from the handheld computer 14 to the network server 35 is inaccessible), but is usable at a later time (i.e., the communication path from the handheld computer 14 to the network server 35 is accessible). Both of the flowcharts for the modes presume that a wireless connection between the sprayer 1 and the handheld computer 14 for data transfer has already been established.

As an example, handheld computer 14 may be configured to operate in an accessible mode (mode A) or an inaccessible mode (mode B). Handheld computer 14 may be in different locations for mode A and mode B. For example, handheld computer 14 may be configured to operate in an accessible mode in which handheld computer 14 is in a first location where wireless connectivity, via a continuous or near continuous communication path, to network server 35 is accessible. Handheld computer 14 may be configured to operate in an inaccessible mode in which handheld computer 14 is in a second location out of range of the continuous or near continuous communication path to network server 35. In one or more examples, handheld computer 14 may be configured to ferry data from when handheld computer 14 is at the second location and in the inaccessible mode to when handheld computer 14 is in the first location and in the accessible mode.

As described in more detail, in the accessible mode, handheld computer 14 may transmit at least some of the plurality of fluid output values, received from sprayer 1, to network server 35. For example, handheld computer 14 may receive, from the data stored on sprayer 1, data that has not been previously transmitted to network server 35 and transmit that data (referred to as archival data). However, in some examples, handheld computer 14 may receive substantially all (including all) of the data from sprayer 1 when handheld computer 14 is in the accessible mode.

The handheld computer 14 can determine whether the communication path to the network server 35 is inaccessible or accessible based on one or more attempted communications with the network server 35. For instance, the handheld computer 14 can attempt to establish wireless communications with the network server 35 on a periodic basis. The handheld computer 14 can determine that the communication path to the network server 35 is inaccessible in response to one or more failed communication attempts, such as one or more communication attempts that do not result in a response message from the network server 35 within a threshold time duration (e.g., a threshold number of seconds, minutes, or other threshold time durations). The handheld computer 14 can determine that the communication path to the network server 35 is accessible in response to one or more successful communication attempts, such as one or more communication attempts that result in receiving a response message from the network server 35. The handheld computer 14 can, in some examples, determine which of the processes of Mode A and Mode B to utilize in response to the determination of whether the communication path to the network server 35 is accessible (i.e., Mode A) or inaccessible (i.e., Mode B).

Mode A includes step 60 in which a request for data (e.g., from the user) is received on the handheld computer 14. The request for data can be received by the processor 18 from the one or more interfaces 20. Reception of the request can include the opening of an application on the handheld computer 14, selecting the particular sprayer 1 from amongst other sprayer options (e.g., multiple sprayers in wireless range or sprayers to which the handheld computer 14 has previously connected), and/or the user selecting a data refresh or update option from the sprayer 1. Upon reception of the request, the handheld computer 14 (e.g., via the wireless module 17) sends a data history inquiry in step 61, and the inquiry is received by the network server in step 62. The data inquiry request sent in step 61 can be considered an archival data request from the processor 18 for a request for identification of a most recent fluid output value in a time series of archival fluid output values stored by the network server 35 as associated with the sprayer 1.

For example, the memory 37 of the network server 35 may store data (e.g., fluid output values, pressure values, etc.) for a plurality of fluid sprayers including the fluid sprayer 1. The data for each one of the plurality of fluid sprayers may be stored as separate tables, or generally, in such a way that data for each sprayer may be accessible individually. In some examples, simultaneous group access for data for multiple sprayers may be possible (e.g., such as for a batch download).

The handheld computer 14, in some examples, may be configured to upload data (e.g., fluid output values) from the sprayer 1 for storage in the network server 35. Then, at some later time, after the memory 22 of the sprayer 1 stores new data, a user may wish to upload the new data to the memory 37 of the network server 35. However, there may be a possibility that another user had already uploaded the new data to the memory 37 at some intermediate time.

As an example, on a job site, there may be multiple users of the sprayer 1, each with their own handheld computer. For instance, if there are two users of the sprayer 1, there may be a first handheld computer and a second handheld computer. In such examples, a first user of first handheld computer may have utilized the sprayer 1 and uploaded the data for the sprayer 1 to the network server 35. Then, when a second user of the second handheld computer goes to use the sprayer 1, he or she may not know whether data needs to be stored to the memory 37 or not.

Also, in some examples, the second user of second handheld computer may use the sprayer 1 and when finished, the memory 22 may store data of the sprayer 1 from when the first user used the sprayer 1 and the new data from when the second user used the sprayer 1. However, the memory 37 already stored the data from when the first user used the sprayer 1 and resending and restoring the data from when the first user used the sprayer 1 may not be memory and bandwidth efficient.

Accordingly, in some examples, prior to storing data in the memory 37, the handheld computer 14 may first receive information indicative of the most recent data (e.g., serial number or timestamp) that is stored in the memory 37 for the sprayer 1. The handheld computer 14 may then request from the sprayer 1 only the data that is new since the most recent data that is stored in the memory 37 and upload only the new data. In this way, if there is delta between the data that is stored in memory 37 and data stored in memory 22, only the difference is transmitted for storage in memory 37, which promote memory and bandwidth efficiencies.

Transmission of the inquiry in step 61 can include wireless transmission over a cellular, Wi-Fi, or other type of network. The inquiry can uniquely identify the handheld computer 14 sending the inquiry, the user making the request, and/or the sprayer 1 with which the handheld computer 14 is currently connected.

As described above, the network server 35 stores historical spray information for the sprayer 1 in memory 37. Historical spray information stored by the network server 35 can be considered archival spray information, which can be stored as a time series of archival fluid output values. This spray information can include information that was previously transmitted using modes A and/or B. The spray information can be spray volume log and/or cleaning volume log generated in the process of FIGS. 8A and 8B. For example, the network server 35 can store a spray volume log containing the volume of paint sprayed in each of a plurality of time windows. The network server 35 can likewise store a cleaning volume log containing the volume of fluid flushed in each of a plurality of time windows. The network server 35 receives the inquiry in step 62. The network server 35 then identifies the most recent spray volume and cleaning volume logs that the network server 35 has stored in association with the sprayer 1, in step 63. The network server 35 can identify the most recent logs received in association with the sprayer 1 by reviewing timestamps of the data (e.g., the time and date of the time window saved in association with the time window data) and/or a serial number information (e.g., each sequential time window may be given a progressively higher serial number). The request can also include the serial number of the sprayer 1, and the data saved by the network server 35 can include a reference to the serial number of the sprayer 1, so that the network server 35 may only find the most recent log for the sprayer 1 and not a more recent log for a different sprayer.

The network server 35 then sends the identification of the most recent data in the log in step 64. The identification of the most recent data can be the most recent time window and/or the highest serial number previously received. The identification of the most recent data sent by the network server 35 is received by the handheld computer 14 in step 65.

Based on the reception of the identification of the most recent data in step 65, the handheld computer 14 then sends a request to the sprayer 1 for any spray volume log or cleaning volume log data newer than the most recent data identified. For example, if the most recent data is identified to be a time window of 4-5 pm, Aug. 30, 2018, then the request is for any spray volume log or cleaning volume log data newer than 4-5 pm, Aug. 30, 2018. If the most recent data is identified to have a serial number of 10,200, then the request is for any spray volume log or cleaning volume log data having a serial number greater than 10,200 (e.g., 10,201, 10,202, etc.). The request to the sprayer 1 transmitted in step 65 can be considered an archival fluid output values update request to request the sprayer 1 to transmit an archival fluid output values update that includes only those fluid output values stored by the sprayer 1 that are more recent than the identification of the most recent data.

Figure 9:
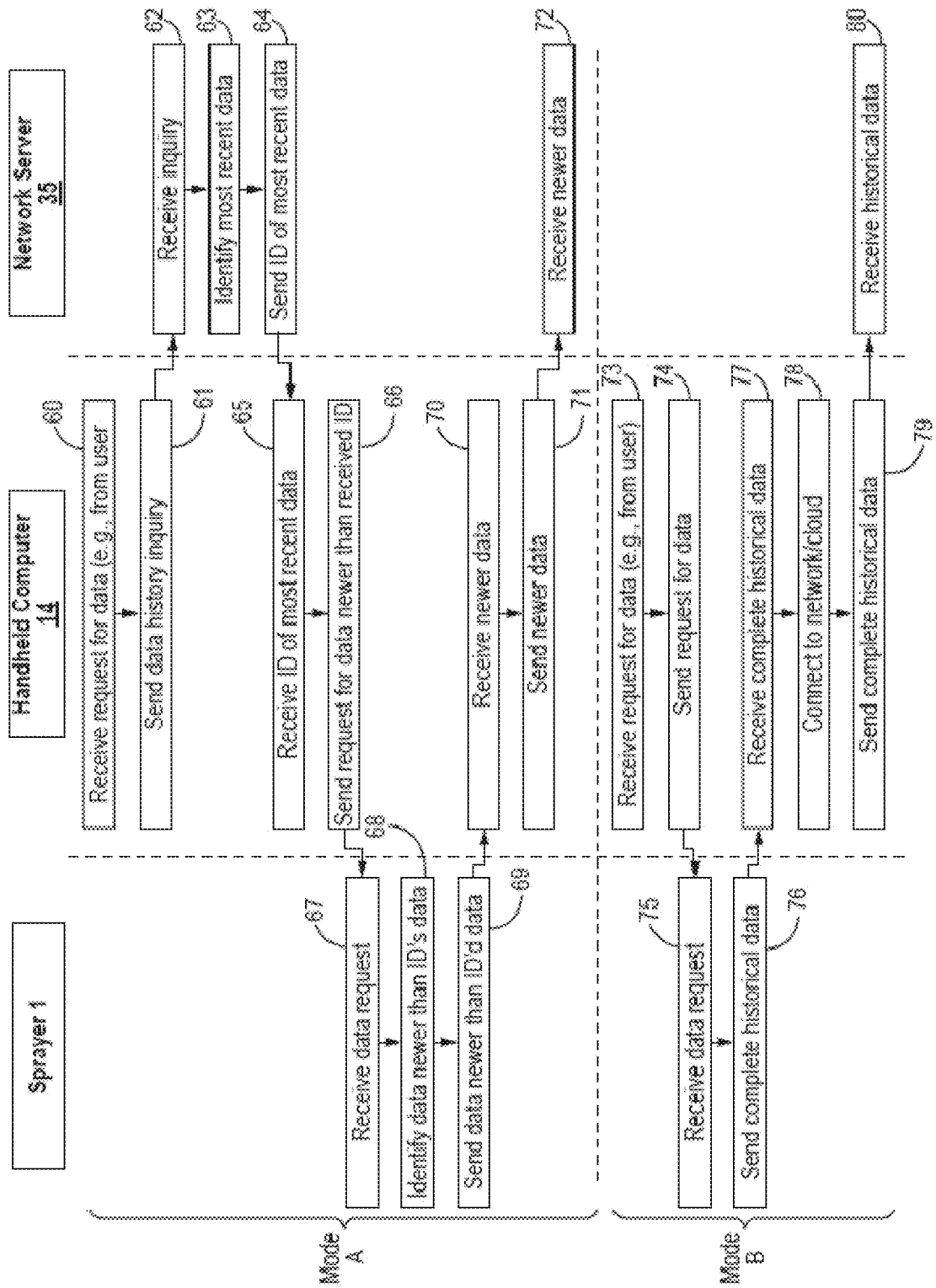
FIG. 9 is a flow diagram illustrating example operations for coupling a handheld computer to a sprayer moving data generated on the sprayer to a network server via a handheld computer.

In the example of FIG. 9, the sprayer 1 receives the spray volume log or cleaning volume log data request from the handheld computer 14 in step 67. The control circuitry of the sprayer 1 (e.g., wireless module 23 and/or processor 24), in step 68, then identifies any spray volume log or cleaning volume log data newer than the identified most recent data which the network server 35 already has stored. For example, if the most recent spray volume log or cleaning volume log data is identified to be a time window of 4-5 pm, Aug. 30, 2018, then the processor 24 identifies all time window data stored in memory associated with time windows after 4-5 pm, Aug. 30, 2018, which may be one time window (e.g., 5-6 pm, Aug. 30, 2018) or may be many time windows (6 pm, Aug. 30, 2018-8 am, Sep. 5, 2015). Such data can be the spray volume and cleaning volume pumped within each time window and may not include pump cycle or pressure measurement data. If the most recent data is identified to have a serial number of 10,200, then the processor 24 identifies any spray volume log or cleaning volume log window data having a serial number greater than 10,200, which may be data for one time window (e.g., 10,201) or may be data for multiple time windows (10,201-10,300).

In step 69, the sprayer 1 then sends the identified newer data to the handheld computer 14. The identified newer data sent to the handheld computer 14 in step 69 can be considered an archival fluid output values update sent by the sprayer 1 in response to receiving the archival fluid output values update request from the handheld computer 14. In step 70, the handheld computer 14 receives the newer data. In step 71, the handheld computer in turn sends the newer data to the network server 35. In step 72, the network server receives the newer data and saves it in memory 31.

In this manner, in the accessible mode, handheld computer 14 may transmit at least some of the plurality of fluid output values to network server 35. As one example, the at least some of the plurality of fluid output values refers to the archival data. However, in some examples, handheld computer 14 may transmit substantially all of the plurality of fluid output values stored on sprayer 1 (e.g., including previously sent data).

The process of mode A can be repeated on a periodic basis (e.g., once every minute, or on a basis timed with the closure of time windows such as once per hour) when there is continuous, or near continuous, connectivity between the sprayer 1, the handheld computer 14 and the network server 35. The advantage of mode A is that data is selectively transferred from the sprayer 1, to the handheld computer 14, and then to the network server 35 depending upon which data the network server 35 has already received, such that only new data is transferred. This mode saves on power usage, data transmission, and processor usage as compared to transferring data that is already been received by the network server 35. The process of mode A to request data from the sprayer 1 and transmit the data to the network server 35 can, in some examples, be initiated automatically by the handheld computer 14 in response to determining that the communication path to the network server 35 is accessible. The automatic initiation by the handheld computer 14 can include, in certain examples, initiation of the data transmission without receiving user input at the handheld computer 14 to initiate the data transmission.

Mode B demonstrates the communication technique when there is not continuous, or near continuous, connectivity between the sprayer 1, the handheld computer 14 and the network server 35. In mode B, the handheld computer 14 receives the data request from the user in step 73, which can be essentially identical to step 60. The handheld computer 14 can then check whether there is a connection to the network server 35 (e.g., via cellular network 41), and upon determining that there is no current data connection to the network server 35 (i.e., the communication path is inaccessible), the handheld computer 14 sends a request for data to the sprayer 1 in step 74. In step 75, the sprayer 1 receives the data request from the handheld computer 14. The data request can be for spray volume or cleaning volume log data, such as for each time window. In response to the data request, the sprayer 1 sends the complete historical data to the handheld computer 14 in step 76. Complete historical data can include spray volume and/or cleaning volume log data for all time windows and/or serially numbered entries stored in the memory 22 (i.e., a time series of the data). The complete historical data may not include the pressure and pump cycle data that was used to calculate the spray and cleaning volumes of the time windows, but rather just a single total spray volume and a single total cleaning volume for each time window. Alternatively, the handheld computer 14 may store in memory 26 a record of the most recent time stamped or serial numbered logs sent to the network server 35, and may only send newer logs and not send logs previously sent to the network server 35. In some cases, this historical data can include usage information representing hours, days, and/or years' worth of time windows even if some of the data had previously been communicated to the network server 35. In step 77, the handheld computer 14 receives the complete historical data.

The handheld computer 14 then stores the complete historical data in memory 16 until the handheld computer 14 can transfer the complete historical data to the network server 35, which requires a connection between the handheld computer 14 and the network server 35. In some cases, the sprayer 1 will be used at a remote site without cellular data connections such that the handheld computer 14 cannot communicate with the network server 35, although the handheld computer 14 will be able to collect the usage data from the sprayer 1 as demonstrated in the previous steps. At a later time, the user may bring the handheld computer 14 within range of the network server 35, which might be at the end of the day or at a later date as compared to when the complete historical data was received by the handheld computer 14, to complete steps 79-80. Accordingly, the handheld computer 14 can store the usage data in response to determining that the communication path to the network server 35 is inaccessible at a first time (e.g., a time when the data is collected by the handheld computer 14 from the sprayer 1 at a first location), and can transmit the usage data to the network server 35 at a second time that is later than the first time, in a second, different location, in response to identifying that the communication path to the network server 35 is accessible at the second time.

Once the handheld computer 14 is able to communicate to the network server 35 in step 78, such as by way of a cellular or other type of data connection, the handheld computer 14 sends a complete historical data to the network server and 35 in step 79. For example, handheld computer 14 may transition (e.g., automatically without user intervention but user intervention based transition is possible) from the inaccessible mode to the accessible mode in response to determining that the continuous or near continuous communication path to network server 35 is accessible for transmitting the stored fluid output values.

Furthermore, although the above examples describe handheld computer 14 receiving all of the fluid output values from the sprayer 1, the techniques described in this disclosure are not so limited. In some examples, even in the inaccessible mode, handheld computer 14 may receive some of the fluid output values from sprayer 1 (e.g., such as if handheld computer 14 determines that some data stored on sprayer 1 is now stale, or if handheld computer 14 tracked the last data sent to network 35) and store the received fluid output values in handheld computer 14 until handheld computer 14 is able to transition from the inaccessible mode to the accessible mode in response to determining that the continuous or near continuous communication path to the network server is accessible for transmitting the stored fluid output values.

In some examples, the in the inaccessible mode, handheld computer 14 is configured to receive a first number of the fluid output values from sprayer 1, and in the accessible mode, handheld computer 14 is configured to receive a second number of the fluid output values from the sprayer 1. The first number of fluid output values may be greater than the second number of the fluid output values. For example, in the inaccessible mode, handheld computer 14 may receive substantially all (e.g., all, all but earliest few minutes of data, 90% of the data or greater) of the data from sprayer 1 but in the accessible mode, handheld computer 14 may receive only data not previously transmitted to network server 35.

In step 80, the network server 35 receives the complete historical data. The network server 35 can then reconcile the recently received complete historical data with the data it has already received, and update the spray volume and cleaning volume data logs in memory 37 with any new data of the complete historical data that the network server 35 had not previously received.

In mode B, the handheld computer 14 physically ferries the data from being within wireless range of the sprayer 1 but not within range of the cellular network 41, to being within range of the cellular network 41 (but possibly not within wireless range of the sprayer). In contrast, the handheld computer 14 principally functions as a node within two overlapping wireless networks that do not directly communicate with each other in mode B.

The complete historical data is transmitted between the sprayer 1 and the handheld computer 14 in mode B because it is not known to the sprayer 1 or the handheld computer 14 what data has already been collected by the network server 35 or otherwise transmitted from the sprayer 1. Generally, the sprayer 1 does not include a log of what data has been transmitted to a handheld computer 14 or other device. Also, the handheld computer 14 does not store spray volume or cleaning volume log data from the sprayer 1 (because it is assumed that users with their individual handheld computer 14 will be switching sprayers frequently, such as for different colors and/or when working with sprayer fleets), and does not have a data history chronicling which data has been transferred. Therefore, all historical data is retrieved from the sprayer 1 and sent to the network server 35. The purpose of this is that various different handheld computers, such as handheld computer 14, can be used with the sprayer 1, such that one operator with one handheld computer 14 can use the sprayer 1 in the morning while a different operator with a different handheld computer 14 can use the sprayer 1 in the afternoon, wherein the one central collection point for the data is network server 35.

Accordingly, the disclosure describes examples in which the handheld computer 14 is configured to operate in an accessible mode (e.g. mode A) in which a continuous or near continuous communication path to the network server 35 is accessible or operate in an inaccessible mode (e.g., mode B) in which the continuous or near continuous communication path to the network server 35 is inaccessible. The communication path to the network server 35 may be a cellular communication path (e.g., via a cellular network) or a WiFi communication path. In one or more examples, the handheld computer 14 may operate differently based on whether the handheld computer 14 is in the accessible mode or the inaccessible mode. For instance, in the accessible mode, the handheld computer 14 may ensure that only the newly stored fluid output values, stored in memory 22, are uploaded to the network server 35. However, where the handheld computer 14 is operating in the inaccessible mode, the handheld computer 14 may temporarily store the plurality of fluid output values in memory 16 for eventual transmission to the network server 35.

In the accessible mode, the handheld computer 14 may be configured to transmit an archival data request to the network server 35 to request an identification of a most recent fluid output value in the time series of archival fluid output values associated with the sprayer 1. The archival fluid output values update request may include the identification of the most recent fluid output value in the time series of archival fluid output values associated with the sprayer 1.

The handheld computer 14 may receive, from the network server 35, the identification of the most recent fluid output value in the time series of archival fluid output values associated with the sprayer 1. The identification of the most recent fluid output value may include at least one of a time and date of the most recent fluid output value or a serial number of the most recent fluid output value. The handheld computer 14 may then transmit an archival fluid output values update request to the sprayer 1 to request the sprayer 1 to transmit an archival fluid output values update that includes only those fluid output values of the plurality of fluid output values that are more recent than the identification of the most recent fluid output value in the time series of archival fluid output values associated with the sprayer 1. The handheld computer 14 may transmit the fluid output values that are more recent to the network server 35 for storage in memory 37.

In the inaccessible mode, the handheld computer 14 may be configured to receive a plurality of fluid output values from the sprayer 1, the plurality of fluid output values representing fluid output volumes of the sprayer 1 over time. Memory 16 of the handheld computer 14 may store the plurality of fluid output values in response to determining that the continuous or near continuous communication path to the network server 35 is inaccessible (e.g., the wireless module 17 of the handheld computer 14 is unable to connect to a cellular network or WiFi). In such cases, the handheld computer 14 may transmit the plurality of fluid output values to the network server 35 in response to determining that the continuous or near continuous communication path to the network server 35 is accessible.

For example, the handheld computer 14 may automatically transmit, without receiving user input at the handheld computer 14 to initiate the transmitting, the plurality of fluid output values to the network server 35 in response to determining that the communication path to the network server 35 is accessible. The handheld computer 14 may be configured to periodically attempt communication with the network server 35 and to determine that the communication path to the network server 35 is accessible in response to a successful communication attempt with the network server 35.

This disclosure describes various examples of the plurality of fluid values. For instance, similar to elsewhere, the plurality of fluid output values may include values respectively representing volumes of fluid output by the sprayer 1 within a plurality of time windows. The plurality of time windows may represent a plurality of consecutive time periods, each of the consecutive time periods having a predetermined duration. As described above, such as with respect to FIGS. 8A-8C, for each time window of the plurality of time windows, the control circuitry 21 of the sprayer 1 may be configured to open the respective time window, calculate and recalculate the respective fluid output value as a running value for each increase in the indication of cycle status received within the respective time window, and close the respective time window after the predetermined duration, so that the fluid output volume value of the respective time window is the running value at expiration of the predetermined duration.

In some embodiments, the handheld computer 14 adds location information from the GPS module 19 to the spray volume and cleaning volume logs between receiving the spray volume and cleaning volume logs location information from the sprayer 1 to the network server 35. This is because the sprayer 1 may not include a GPS module but general location information may still be useful for later reference from the network server 35, such as for retrieval from the personal computer 29 from the network server 35 the manager of the fleet to understand where the sprayers are being used. Such attachment of location information may occur between steps 70 and 71.

Figure 10:
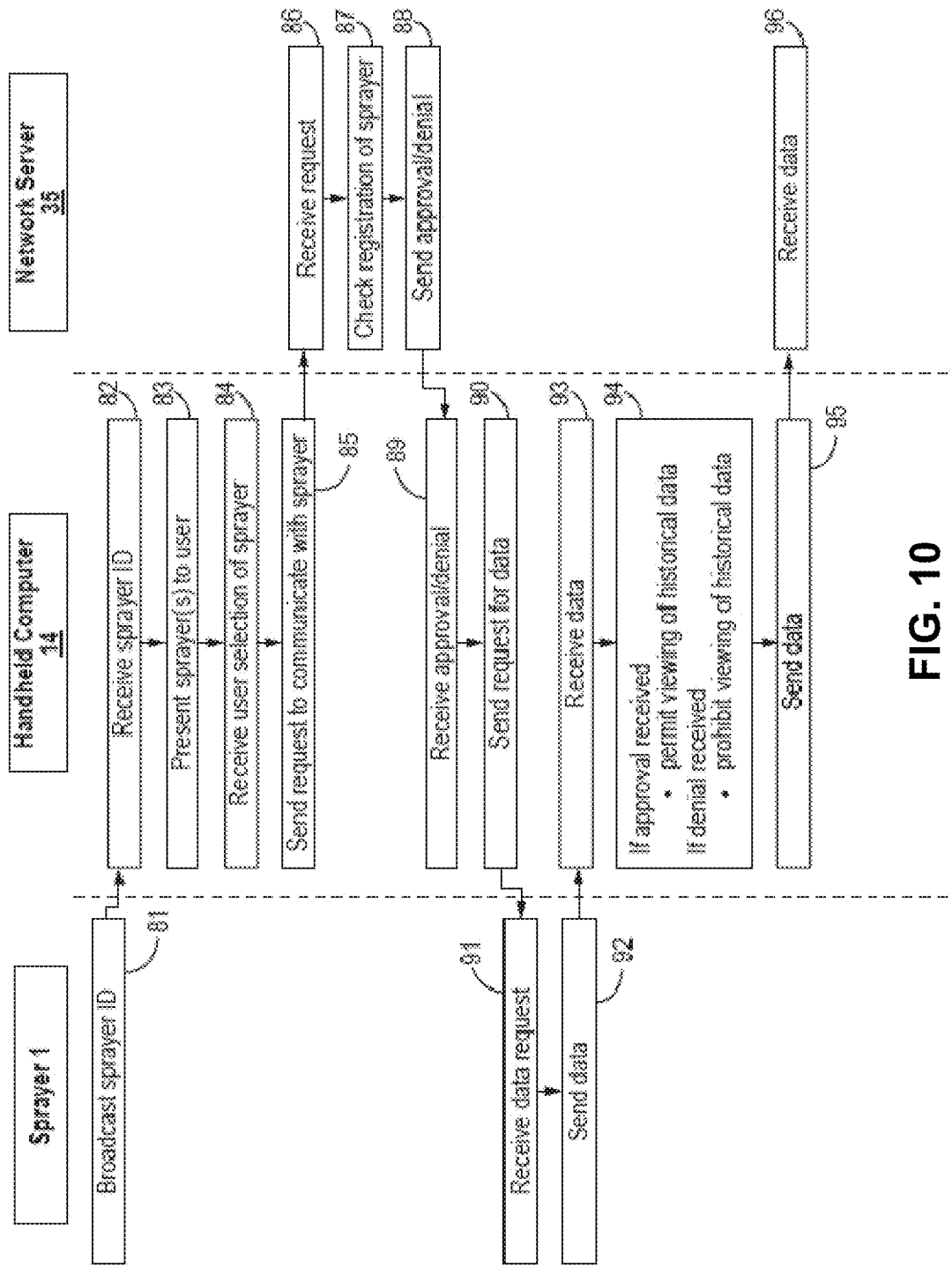
FIG. 10 is a flow diagram illustrating example operations for coupling a sprayer to a handheld computer.

FIG. 10 is a flowchart demonstrating the steps for coupling the sprayer 1 to a handheld computer 14 according to various embodiments. As shown, whether or not the user of the handheld computer 14 is authorized in connection with the particular sprayer 1, the network server 35 may or may not give permission to view historical data. Even if the network server 35 denies rights to view historical data, the handheld computer 14 can still connect with the sprayer 1 and ferry data from the sprayer 1 to the network server 35, yet the handheld computer 14 may not allow the user to view the historical data depending on the approval.

When the sprayer 1 is powered, the sprayer 1 broadcasts identification information (e.g., a sprayer identifier (ID)) in step 81. Broadcasting the sprayer ID can include broadcasting over a short-range wireless protocol, such as BLUETOOTH™, from the wireless module 23 of the sprayer 1. The broadcast information can include a model number of the sprayer 1, a serial number of the sprayer 1, and/or any particular name previously assigned to the sprayer 1. This information can be stored in memory 22 of the sprayer 1 or in the wireless module 23 of the sprayer 1.

In step 82, the handheld computer 14 receives the identification information (e.g., sprayer ID) broadcast from the sprayer 1, such as model number, serial number, and/or assigned sprayer name. The handheld computer 14 can receive the broadcast with the wireless module 17 of the handheld computer 14. In a small area (e.g., within a 100-foot radius), multiple sprayers can simultaneously broadcast respective sprayer IDs such that the handheld computer 14 can receive the multiple sprayer IDs from these multiple sprayers in the small area at the same time.

The handheld computer 14 can present a sprayer ID, or multiple sprayer IDs, to a user in step 83 corresponding to the number of sprayer IDs received. These sprayer ID(s) can be presented by being displayed as different icons, one for each respective sprayer, on a screen (e.g., touchscreen) of the one or more interfaces 20. The presentation can include showing a model number, a serial number, and/or an assigned name as part of the icon. The handheld computer 14 can then receive a selection of one of the sprayers in step 84. The selection can include a user touching one of the icons associated with a particular one of the sprayers on the touchscreen of the one or more interfaces 20. The user selection is received by the processor 18. The user selection indicates which one of the sprayers the user wants to communicate with. Based on the selection, the handheld computer 14 can begin bidirectional communication with the selected sprayer to the exclusion of the other sprayers that were not selected.

Based on the selection of the particular sprayer, the handheld computer 14 sends a request to communicate with the selected sprayer to the network server 35 in step 85. The request can include the model number, serial number, and/or the assigned name of the selected sprayer. In step 86, the network server 35 receives the request. Following receipt of the request, the network server 35 checks, in step 87, the registration of the selected sprayer to determine whether the sprayer (e.g., sprayer 1) has been previously registered. In this way, the network server 35 can include a registry of some or all sprayers of one or more types that have been manufactured. Specifically, upon manufacture, the model number and serial number of each sprayer are saved in memory 37 of the network server 35. The network server 35 can also save an indication of whether or not the sprayer has been registered, including information concerning the owner of the sprayer. The sprayer 1 may not save or contain any information (e.g., in memory 22) that indicates whether or not the sprayer 1 has been registered, although possible for sprayer 1 to store such information. In some examples, it is the network server 35 that logs and tracks sprayer registration.

In the example of FIG. 10, the network server 35 may, in step 88, send an indication of approval or denial to the handheld computer 14. For instance, if the sprayer 1 is unregistered, the network server 35 may send a communication to the handheld computer 14 to prompt the handheld computer 14 to request that the user register the sprayer 1. In registration, the user can input an owner name (which can be a company name or an individual) of the sprayer 1. The owner name can be sent back to the network server 35 for saving in memory 37 in association with the sprayer ID. The network server 35 can then store in memory 37 an indication that the sprayer 1 is registered so that the sprayer 1 will be recognized in future connection requests that the sprayer 1 is registered. The owner name may be associated with other sprayers commonly owned.

Registering a sprayer 1 may also include setting up one owner account or associating a new sprayer 1 with an existing owner account. An owner account may allow or disallow some or all historical data to be viewed and/or changed by user accounts. User accounts can be created using the handheld computer 14 and are generally created by painters not in association with any particular sprayer or sprayers. The owner account can have rights to allow or deny particular user accounts to view historical data generated by or transmitted from a sprayer 1. Using the handheld computer 14 or the personal computer 29 when registering a sprayer 1, or at a later date, the user of the owner account can input or select which user accounts will be allowed to view historical data, and the input or selection can be stored in memory 37 of the network server 35.

A user account can include a particular user identification (e.g., user name and/or number). A user can use the user identification, along with a password, to log into the program running on the handheld computer 14 (e.g., an application or "app"). The combination of the user identification and the password can be considered user credentials. The program facilitates communication with the sprayer 1 and the network server 35 as discussed herein. The network server 35 can save in memory 37 a list of all user accounts indicated by the owner account to be allowed to view historical data for the sprayer 1 (as well as other sprayers), whereas the users of all other user accounts are not permitted to view historical data for the sprayer 1.

If the check in step 87 determines that the sprayer 1 is registered, then a check can be made of whether the particular user, logged in under the user account on the handheld computer 14, has been authorized to view historical data by the owner account, while the handheld computers 14 of both authorized and non-authorized users may be able to transfer spray data from the sprayer 1 to the network server 35.

Depending on whether the particular sprayer 1 is registered, the network server 35 sends an approval or denial in step 88 to the handheld computer 14, approval for an authorized user account being associated with the sprayer 1 in memory 37 of network server 35, and a denial for any user account not being approved by the owner account associated with the sprayer 1 in memory 37 of network server 35. The handheld computer 14 receives the communication from the network server in step 89. The handheld computer 14 then, in response, sends a request for data to the sprayer 1 in step 90. The sprayer 1 receives the data request in step 91 and then sends some or all historical data to the handheld computer 14 in step 92. It is noted that historical data refers to data that is not indicative of the current operational state of the sprayer 1. For example, in some cases, historical data can be information sensed, calculated, developed, or otherwise collected more than 1 hour ago. In some cases, historical data is information sensed, calculated, developed, or otherwise collected at least one day prior, or more than 12 hours ago, or more than 24 hours ago. In some cases, historical data may be data not from the current spray session, or data not collected since the sprayer 1 was last powered on.

The handheld computer 14 receives the data from the sprayer 1 in step 93. The program running on the handheld computer 14 allows the transferred historical data to be viewed on the handheld computer 14 by the user if the approval was previously received in step 89. The program running on the handheld computer 14 does not allow the handheld computer 14 to display the historical data to the user if the denial was received in step 89. Regardless of whether a denial or approval was received, the handheld computer 14 sends the historical data to the network server 35 in step 95. The network server 35 receives the historical data in step 96.

In this way, the handheld computer 14 can ferry data from the sprayer 1 to the network server 35, either allowing or disallowing the user of the handheld computer 14 to see the historical data. A reason to disallow some users from seeing the historical data is because different workers may be using the sprayer day-to-day. The owner of the sprayer 1 may trust some users to view historical data and may not trust other users to view historical data while using the sprayer 1. The historical data may be competitively sensitive, such as by including productivity information that may be reflective of the operations of the owner. Workers can often work with multiple contracting companies at once, moving between projects, and an owner may not want a painter viewing historical data if the owner thinks the painter will be working for a competitor.

For example, handheld computer 14 may receive user credentials of a user of handheld computer 14 and identification information of the sprayer 1 that is in wireless communication with the handheld computer 14. Handheld computer 14 may receive, from the sprayer 1, a plurality of fluid parameter values representing fluid by the sprayer 1 over time. In some examples, the plurality of fluid parameter values include a first set of fluid parameter values generated during use of the sprayer 1 by the user and a second set of fluid parameter values generated prior to use of the sprayer 1 by the user.

The fluid parameter values may be various values indicative of fluid output volume. As one example, the fluid parameter values may be the spray output values (e.g., output values representing spray fluid output volume) when sprayer 1 is operating in the fluid atomizing spray mode. As another example, the fluid parameter values may be the pressure values (e.g., actual pressure values measured by the pressure sensor or pressure values set by the user).

For example, handheld computer 14 may store historical data (e.g., the second set of fluid output values generated prior to use of the sprayer 1 by the user) and store contemporaneous data (e.g., the first set of fluid output values generated by use of sprayer 1 by the user). The historical data may be the spray fluid output values and/or pressure values for when a previous user used sprayer 1 and the contemporaneous data may be the spray fluid output values and/or pressure values for when the current user used sprayer 1.

Handheld computer 14 may determine whether the user credentials are authorized for viewing one or more of the plurality of fluid parameter values including the first set of fluid parameter values and the second set of fluid parameter values. For example, a first user may be authorized to view most any (including all) fluid parameter values generated by sprayer 1. A second user may be authorized to view fluid parameter values generated by sprayer 1 during the use by the second user but may not be authorized to view fluid parameter values generated by others (e.g., historical fluid parameter values). A third user may be authorized to view some of the fluid parameter values (e.g., pressure values from when the third user used sprayer 1) and not other fluid parameter values (e.g., actual spray fluid output values representing fluid output volume when the third user used sprayer 1). The third user may be not be authorized to view any historical fluid parameter values.

In one or more examples, although the second user and the third user are limited in the amount of data the second user and the third user can view on respective ones of their handheld computer 14, the respective ones of their handheld computer 14 may be used to ferry data. In other words, even though the second and third user may be prevented from viewing fluid parameter values (or at least some of the fluid parameter values), the handheld computers of the second and third users may ferry the fluid parameter values even if not viewable by the second and third users.

For example, handheld computer 14 may cause the wireless transceiver 17 to wirelessly transmit the plurality of fluid parameter values to network server 35 that is remote from the sprayer 1 and the handheld computer 14. Handheld computer 14 may prevent the user (e.g., second user and the third user from above example) from viewing, via the display device (e.g., interface 20), at least the second set of fluid parameter values of the plurality of fluid output values (e.g., historical fluid output values) at the handheld computer 14 in response to determining that the user credentials are not authorized for viewing the second set of fluid parameter values of the plurality of fluid parameter values.

In some examples, control circuitry 15 may cause the display device of handheld computer 14 to display at least some of the first set of fluid parameter values (e.g., pressure values and fluid output value, or pressure values but not fluid output values) despite determining that the user credentials are not authorized for viewing the second set of fluid parameter values (e.g., historical fluid output values or historical pressure values) of the plurality of fluid parameter values. However, control circuitry 15 may cause the display device of handheld computer 14 to display the second set of fluid parameter values based on the user credentials of the user indicating that viewing the second set of fluid parameter values is enabled Assume that in the above example, it was the third user that was using sprayer 1. After the third user, a fourth user, with his/her own handheld computer 14 may couple with sprayer 1 and the fourth user may use sprayer 1. Similar to above, handheld computer 14 for the fourth user may receive user credentials of the fourth user and identification information of the same sprayer 1 used by the third use. In this example, the sprayer 1 is in wireless communication with the handheld computer 14 of the fourth user.

The handheld computer 14 of the fourth user may receive, from the sprayer 1, a plurality of fluid parameter values (e.g., pressure values or fluid output values representing fluid output volumes) of the sprayer 1 over time. This plurality of fluid parameter values includes a third set of fluid parameter values generated during use of the sprayer 1 by the fourth user and a fourth set of fluid parameter values generated prior to use of the sprayer 1 by the fourth user. Handheld computer 14 of the fourth user may determine whether the user credentials of the fourth user are authorized for viewing one or more of the plurality of fluid parameter values including the third set of fluid parameter values and the fourth set of fluid parameter values, and cause the wireless transceiver of the handheld device 14 of the fourth user to wirelessly transmit the plurality of fluid parameter values to the network server 35.

However, in this example, the fourth user may have additional viewing rights than the third user. For example, the third user was prevented from the viewing the first and the second sets of fluid output values (but may be able to see parameter values such as pressure). In some examples, the handheld device 14 of the fourth user may enable the fourth user to view both the third set of fluid parameter values and the fourth set of fluid parameter values at the display device of the handheld computer 14 of the fourth user in response to determining that the user credentials of the fourth user are authorized for viewing the third set of fluid parameter values and the fourth set of fluid parameter values.

In some examples, while the third user may be prevented from viewing the fluid output values (e.g., representing fluid output volume), but the third user may be enabled to possibly view one or more values used to generate the fluid output values. As one example, the third user may be authorized to view pressure values (e.g., an example of the fluid parameter values) used to generate the fluid output values but not be authorized to view the actual fluid output values.

Also, in some examples, the third user may be enabled to view the actual fluid output values while the third user is using sprayer 1. But when the third user is done using sprayer 1, the third user may be prevented from viewing the fluid output values even if the fluid output values were generated while the third user was using the sprayer 1. Stated another way, the values captured by the handheld computer 14 of the third user may be considered as real time data. The handheld computer 14 of the third user may enable the user to view at least some of the first set of parameter values (e.g., the pressure values) while the user is using the sprayer, and prevent the user from viewing the first set of parameter values (e.g., fluid output values, the pressure values, or both the fluid output values and the pressure values) after a predetermined amount of time in which the first set parameter values is no longer real time data.

Figure 11:
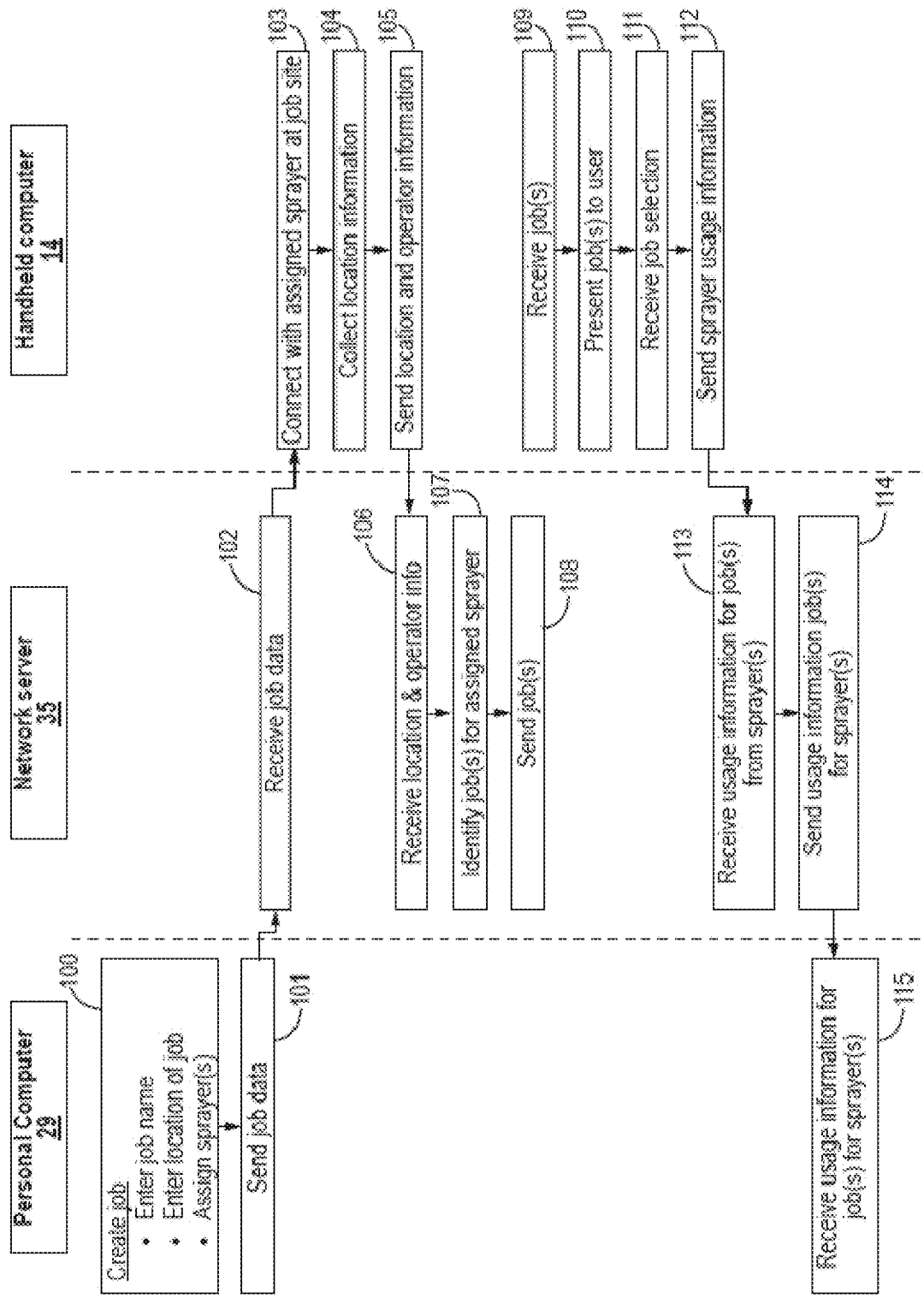
FIG. 11 is a flow diagram illustrating various aspects of job features.

FIG. 11 is a flowchart demonstrating various aspects of job features. A "job" as used herein is a spraying project that the manager of the sprayer 1 is tasked with completing. The term manager is used herein to refer to a person or persons who direct and oversee spraying operators, and may direct and oversee one or more workers and one or more sprayers. The manger may be a business owner and an owner of the paint sprayer, or may be appointed by the owner to manage painting operations. The manager may be the person operating the owner account while the workers (e.g., painters) operate user accounts on their handheld computers 14. The manager may be the owner. In some cases, the handheld computers 14 may be owned by the painting company and/or handheld computers 14 may be individually owned by one or more workers.

Typically, the manager will have competitively bid on a project to complete the project, factoring in paint usage and labor. The manager can win the project with a competitive bid. The manager is then concerned with completing the project within budget according to the bid, which requires monitoring paint and labor utilization. A job can be created by the manager profiling the project and assigning one or more sprayers 1.

In many cases, there are a plurality of sprayers, like sprayer 1, that are being used at a job. Moreover, the same sprayer may be used at multiple jobs. Having an individual gather data of how many of the sprayers are used at a job or gather information of how a particular sprayer was used at multiple jobs may be difficult, and practically impossible in many instances such as where such information is needed and processed in a relatively short amount of time. For instance, if there are many job sites across town, it would be practically impossible for the manager to determine hourly or may be even daily the progress and sprayer information.

Furthermore, merely gathering the data and presenting the data may be insufficient for usage, especially given the amount of information.

Accordingly, this disclosure describes example techniques relying on wireless access coupled with timing of access to selectively retrieve packetized data from sprayers, like sprayer 1, to determine progress at a job. Moreover, the sprayer 1 may be leveraged as a way to communicate additional information such as job reports and the like.

In some examples, given the number of sprayers and number of job sites, the permutations of sprayers to job sites may be exceptionally large, and ensuring that sprayers are associated with the correct jobs may be computationally difficult. As described in more detail, in one or more examples, this disclosure describes ways in which to store, access, and otherwise process information to ensure to address technical issues present in managing jobs.

For example, as described in more detail, there may be one or more sprayers (e.g., like sprayer 1) for spraying fluid at one or more job sites. The network server 35 may be configured to store job information such as information indicative of manners in which the one or more sprayers are to be used at the one or more job sites and receive information indicative of manners in which the one or more sprayers are being used. The network server 35 may compare the received information with the stored job information and output information indicative of usage information based on the comparison (e.g., for display on personal computer 29).

The manager can use the personal computer 29 to manage the jobs. The personal computer 29 can take various forms. The personal computer can be a desktop, laptop, tablet, or handheld mobile computer such as a smart phone. The personal computer 29 can be the same as the handheld computer 14. The personal computer 29 can be used to generate job(s). While a personal computer 29 is used in this example, it is noted that the handheld computer 14 can be used instead for the same functions.

In creating the job, one or more sprayers and/or locations is associated with each job. The step of associating the sprayer and/or location with the job is performed by a manager account, which may be the same or different account as the owner account. A user-painter (who may be a different person than the manager or owner, or may be the same person) using a handheld computer 14 can connect with the sprayer 1 at a job site. Depending on the rights of that user and/or the location of the handheld computer 14 (e.g., as determined by the GPS module 19), the painter using the handheld computer 14 can view one or more jobs associated with that sprayer 1, select one of the jobs, and then work on the selected job using the sprayer 1 while the handheld computer 14 collects usage data from the sprayer 1 (as previously described herein), the handheld computer 14 sending the information to the network server 35 to track productivity for the selected job.

For example, the job information that defines manners in which one or more sprayers are to be used at the one or more job sites may include data associating the one or more sprayers with the one or more job sites (e.g., sprayers A-D are for job site A, sprayers E-G are for job site B, and so forth). As another example, the job information that defines manners in which one or more sprayers are to be used at the one or more job sites may include information of date or date range for when work is to be done with the one or more sprayers at the one or more job sites. As another example, the job information that defines manners in which one or more sprayers are to be used at the one or more job sites may include information indicative of users that are allowed to work at the one or more job sites.

The painter (e.g., user) using a handheld computer 14 can wirelessly connect with the sprayer 1, the handheld computer 14 can communicate the sprayer ID (e.g., as previously described) as well as GPS location information to the network server 35. The network server 35 can review the sprayer ID and the GPS location information to identify one or more jobs which are either associated with the sprayer 1 or near the GPS location, or both, and send job information back to the handheld computer 14. For instance, the job information may include data associating the one or more sprayers with one or more job sites. Network server 35 may receive information identifying a sprayer (e.g., based on a sprayer ID) of the one or more sprayers and information identifying a job site of the one or more job sites where the identified sprayer is located (e.g., based on GPS location). The network server 35 may compare whether the identified sprayer is to be located at the identified job site based on the information indicative of which sprayers of the one or more sprayers are associated with which job sites of the one or more job sites. For instance, if the sprayer at a job site is being used, but should be not used because the sprayer is not associated with that job site, then the network server 35 may output information indicative of usage information that the sprayer is being used improperly.

The user can then be presented with those jobs and can select one of those jobs. Subsequent usage data concerning the sprayer 1 by the user can be sent from the handheld computer 14 to the network server 35 to be saved in association with the selected job to indicate productivity in a particular window of time (i.e. the time the worker worked using the sprayer 1 at the location). For example, information indicative of manners in which the one or more sprayers are to be used at the one or more job sites includes information indicative of how much fluid the one or more sprayers are to spray within a time period. The network server 35 may receive information indicative of usage data of the one or more sprayers and compare the received information indicative of usage data of the one or more sprayers to information indicative of how much fluid the one or more sprayers are to spray within the time period. The network server 35 may output information indicative of whether the usage data of the one or more sprayers is less than, equal to, or greater than the how much fluid the one or more sprayers are to spray within the time period.

Information about usage of the sprayer 1, such as productivity and paint consumption, can be collected at the network server 35 and then viewed from the personal computer 29 (or another device) via the manager account. It is noted that multiple sprayers (used by one or multiple users) can work on the same job and send usage and productivity information to the network server 35, which can be aggregated for the job and then reviewed by the manager using the personal computer 29 to track overall productivity of the sprayer 1 fleet on the job.

Using the personal computer 29, the manager creates a job in step 100 of FIG. 11. Creation and input is performed using the interface of the personal computer 29. It is noted that a handheld computer 14 can substitute for the personal computer 29. Creation of a job can include receiving a job name given by the manager, such as "Miller house" or "High School". The name can be a quick reference indicating the nature and/or location of the job, for example. A location of the job can also be input. The location can be a postal address. The location can additionally or alternatively be selected from a mapping software program that displays a map, allowing the user to select a particular location. Such a feature may be useful where addresses are not yet assigned due to the building(s) in the area not yet being completed, or for when the project relates to remote and/or unaddressed infrastructure (bridges, pipelines, cell towers, fences, etc.). Accordingly, in some examples, job information indicative of manners in which the one or more sprayers are to be used may include location information of the job, and the manners in which the one or more sprayers are to be used may include information about the sprayers being used at the location of the job.

The input job information can include a date or date range. Such date or date range can correspond with the time that is planned for work to be done. For example, a date input can be Oct. 15, 2018. A date range can be Oct. 10-20, 2018. Accordingly, in some examples, job information indicative of the manners in which the one or more sprayers are to be used may include date or date range for when work is to be done at the one or more jobs, and the manners in which the one or sprayers are to be used may include information about the sprayers being used on that date or in that date range.

Creation of a job can also include assigning one or more sprayers 1 to the project (e.g., information indicative of which sprayers 1 are to be used at the one or more job sits). The manager may oversee a fleet of sprayers 1 and may deploy the sprayers 1 based on needs. For example, the manager may assign one particular sprayer 1 to a particular job, or may assign multiple (e.g., three) particular sprayers 1 to a particular job, or may assign one particular sprayer 1 to three particular jobs, etc. Other information may be input to create the job.

The input information for the job is sent to the network server 35 in step 101. The network server 35 receives the job information in step 102. The job information is stored in memory 37 on the network server 35 while the network server 35 waits for work on the job to begin. In this manner, the network server 35 may store job information including information indicative of manners in which the one or more sprayers are to be used at the one or more job sites.

In step 103, an assigned sprayer 1 connects with a handheld computer 14 at the location of the job site. The connection can occur in any way mentioned herein. For example, the sprayer 1 may connect via a BLUETOOTH™ protocol with a smartphone serving as the handheld computer 14. The handheld computer 14 then collects location information in step 104. The location information can include longitudinal and latitudinal coordinates from the GPS module 19. In another embodiment, the user can input an address of the location using the one or more interfaces 20. In some cases, the location information can be location information associated with a cell tower (e.g., cellular communication tower information) or Wi-Fi module (e.g., wireless network identification information) with which the handheld computer 14 is wirelessly connected. The handheld computer 14 can also collect operator information. In some examples, the operator information can include the name of the user, or the particular user account, using the program on the handheld computer 14 that is interfacing with the sprayer 1 and the network server 35. In step 105, the handheld computer 105 sends the location, operator information, ID of the sprayer 1, and/or other information to the network server 35. In step 106, the network server 35 receives the location, operator information, sprayer ID, and/or other information.

In step 107, the network server 35 can reference a list of jobs to identify which job or jobs meet criteria based on the location, operator information, sprayer ID, date, and/or other information. For example, only those jobs created or otherwise associated the owner and/or operator of the sprayer 1, based on sprayer ID as previously registered, may be identified. As one example, the network server 35 may receive information identifying a sprayer of the one or more sprayers and information identifying a job site of the one or more job sites where the identified sprayer is located. The network server 35 may determine whether the identified sprayer is to be located at the identified job site based on the information indicative of which sprayers of the one or more sprayers are associated with which job sites of the one or more job sites (e.g., compare the identified sprayer and identified location to stored information of which sprayers are associated with which job sites).

Additional or alternative identification criteria for a job can be based on the operator information. For a particular sprayer 1 or company, only certain user accounts may be able to view certain jobs. When creating a job in step 100, the manager may have selected which user account(s) are allowed to view or add data in association with the particular job being created, and in step 107, the network server 35 may only identify those jobs for which the current operator or user account is allowed to view or contribute to. For instance, the job information may include information indicative of users that are allowed to work at the one or more job sites (e.g., authorized operators). In such examples, the network server 35 may determine which ones of the one or more handheld computers 14 are to receive job information. The network server 35 may then transmit the job information to the determined ones of the one or more handheld computers 14.

Additional or alternative identification criteria can be based on proximity, comparing the distance between the location indicated by the handheld computer 14 collected in step 104, to the location of the job collected in step 100. In some alternative embodiments, the sprayer 1 itself may have a GPS module and may generate its own location information to be sent to the network server 35 via a handheld computer 14 to indicate the location. In this way, as one example, the network server 35 may determine whether a sprayer is proximate to an identified job site. Based on whether the sprayer is proximate to the identified job site, the network server 35 may determine whether the sprayer is to be located at the identified job site.

As an example, there may be a plurality of sprayers associated with a job site. In one example, the network server 35 may receive information indicative of a location of a particular sprayer. In this example, the network server 35 may determine if the particular sprayer is proximate to the job site. If the particular sprayer is proximate to the job site, the network server 35 may determine whether the particular sprayer is associated with the job site and should be located at the identified job site, or elsewhere.

The network server 35 may have a predetermined range, such as 100 feet, 1000 feet, 1 mile, 5 miles, or some other range, within which job(s) will be identified if the job is within the range from the location of the handheld computer 14 (or sprayer 1 if the sprayer 1 generated its own location information). For example, if the predetermined range is 1000 feet, then the network server 35 will identify all jobs having a location that is within 1000 feet of the location of the handheld computer 14, and will not identify those jobs having a location that is more than 1000 feet of the location of the handheld computer 14.

Additional or alternative identification criteria can be based on a date or date range associated with the job. When created, a job can have a date range associated with it. The date or date range can be the window of time in which the job is to be completed. If the current date is the same as the date or within the date range, then that job can be identified, whereas if the current date is not the same as or is outside of the date range, then that job may not be identified in the search by the network server 35. In some cases, a job may be identified if it is within a particular timeframe of the date or date range, even if the current date falls outside of the date or date range. For example the timeframe might be a 7 days window or 30 days window (or other window), so that all jobs having a date or date range within a 7 days window or 30 days window (or other window) of the current date will be identified, whereas if the current date is outside of the timeframe of a particular job, then the job will not be identified. Extending the search within a time window beyond the planned date or date range of completion of the job may be useful because jobs may be delayed due to weather or other factors, and it can be desirable for painters to be able to find a job even if the job was supposed to already be completed, yet still filter out jobs outside of the timeframe so as to not overwhelm the search for the correct job.

For example, the information indicative of manners in which the one or more sprayers are to be used at the one or more job sites includes information indicative of time ranges for each of the job sites during which time one or more of the one or more sprayers are to be used at the one or more job sites. The network server 35 may be configured to receive information identifying a sprayer of the one or more sprayers 1 and information identifying a job site of the one or more job sites where the identified sprayer is located. The network server 35 may determine whether the identified sprayer is to be used at the identified job site based on information indicative of time ranges for the job site from the information indicative of the time ranges for each of the job sites (e.g., compare the time ranges to the actual time to determine if sprayers are authorized to spray fluid at the job site).

The network server 35 may additionally or alternatively only identify those jobs for which the manager has approved the particular user account of the user of the handheld computer 14 working on the job or otherwise attempting to view job data. For instance, the network server 35 may transmit job information to the determine ones of the handheld computers 14 that are associated with users that are allowed to work at the job sites.

In some cases, the identified jobs can be those jobs that satisfy single criteria such as any criteria discussed above. In some cases, the identified jobs can be those jobs that satisfy multiple criterions.

A list of all jobs can be saved in memory 37 of the network server 35. The step of identifying jobs based on criteria can be performed by the processor 39 of the network server 35 comparing the criteria to the jobs saved in memory 37. Those jobs meeting the criteria become identified jobs for the session between the handheld computer 14 and the network server 35, while those jobs not meeting the criteria do not become identified jobs for the particular session between the handheld computer 14 and the network server 35. In some cases, multiple jobs will be identified, while in some other cases one job or no jobs will be identified. While the network server 35 is shown as identifying jobs from a stored list of jobs based on criteria, the handheld computer 14 itself may search and identify the jobs based on a list of jobs, including associated job information, sent to the handheld computer 14 by the network server 35 or otherwise saved on in memory 16 of the handheld computer 14.

For instance, each of one or more handheld computers 14 may be associated with one or more sprayers 1. In one example, network server 35 may be configured to determine which ones of the one or more handheld computer 14 are to receive job information and transmit the job information to the determined ones of the one or more handheld computers 14. In one example, the network server 35 may transmit the job information to one or more handheld computers 14 and each of the one or more handheld computers 14 may determine with which job information the one or more handheld computers 14 are associated.

In step 108, the network server 35 sends the identified jobs to the handheld computer 14. The job information sent can include some or all of the information input to create the job in step 100. The job information can include the name of the job, the location of the job, names of one or more sprayers assigned to the job, the type of sprayer associated to the job, and/or other information. In step 109, the handheld computer 14 receives the identified jobs. In step 110, the handheld computer 14 presents the identified jobs to the user, such as on a touchscreen. Presenting the jobs to the user can include presenting the name of the job, the location of the job, and/or any other information input to create the job in step 100. For example, the display on the handheld computer 14 can display multiple icons respectively corresponding to the identified jobs, each icon indicating the name of the particular job as well as its location and/or time information (completion day or window), information on assigned sprayer(s) such as name or type, and/or other information. In step 111, the user of the handheld computer 14 can select one of the presented jobs, such as by touching the particular icon on a touchscreen, the processor 18 of the handheld computer 14 receiving an indication of which job was selected. In some examples, the handheld computer 14 can automatically select a job. That is, rather than receiving an indication of a selected job via user input at the graphical user interface, the handheld computer 14 can automatically select a job without receiving user input for the selection. For instance, the handheld computer 14 can automatically select a job in response to determining that only one job is identified and/or if selection criteria indicate only one job for the location and/or user.

Based on the selection of a job (e.g., via user selection or automatic selection by the handheld computer 14), sprayer usage information of the sprayer 1 can be sent to the network server 35 in step 112. For example, after the reception of the selection in step 111, data previously and/or subsequently generated by the sprayer 1 and sent to the handheld computer 14 during the current session between the handheld computer 14 in the sprayer 1 will be associated in memory with the selected job 111 by the handheld computer 14 and/or by the network server 35 when subsequently sent to the network server 35. More specifically, memory entries for productivity data (e.g., hourly volume sprayed) can include job association information (e.g., the name or ID of the job) that the various productivity data entries can be aggregated between different time frames for the sprayer 1 and from other sprayers 1 to track overall productivity for the job.

For instance, in some examples, the network server 35 may determine how much fluid a particular sprayer 1 is spraying (e.g., usage information of the sprayer) and compare the usage information of the particular sprayer 1 to information indicative of how much fluid the particular sprayer 1 is to spray in a time period. However, in some examples, the network server 35, rather than on a sprayerby-sprayer basis, may determine, on a job site-by-job site basis, how much fluid is being sprayed by aggregating usage information of the sprayers at a job site. The network server 35 may receive information indicative of usage data of each sprayer of the set of sprayers and aggregate the received information indicative of the usage data of each sprayer to generate an aggregated usage data of the set of sprayers. The network server 35 may compare the aggregated usage data of the set of sprayers to information indicative of how much fluid the set of sprayers are to spray within the time period, and output information indicative of whether the aggregated usage data of the set of sprayers is less than, equal to, or greater than the how much fluid the set of sprayers are to spray within the time period.

The associating of sprayer usage data of the sprayer 1 with the selected job can continue for as long as the handheld computer 14 stays wirelessly connected to the sprayer 1 (referred to herein as a session), which can be, e.g., for the remainder of the working day. For instance, the network server 35 may receive information indicative of the amount of volume sprayed for a job site from one or more handheld computers 14 associated with respective ones of the one or more sprayers 1 located at the job site. In some embodiments, data is only sent on a periodic basis, such as hourly or daily. In some cases, associating of sprayer 1 usage data with the selected job can continue for as long as the handheld computer 14 does not start a session with a different sprayer 1, such that the sprayer 1 can be turned off and turned back on to reestablish the connection and resume data generation and transmission to the handheld computer 14 while generated data continues to be associated with the selected job. In some cases, associating of sprayer 1 usage data with the selected job can continue for as long as a different job is not selected using the handheld computer 14. The one or more interfaces 20 of the handheld computer 14 may include an icon for ending a session, which if selected by the user ends associating further collected sprayer 1 usage data with the selected job. In some cases, usage data previously generated by the sprayer 1 and sent to the handheld computer 14 can be associated with the selected job by the user using the one or more interfaces 20 of the handheld computer 14 before the usage data, including job association information, is sent to the network server 35.

In step 113, the network server 35 receives the sprayer 1 usage information. The network server 35 can receive usage information for multiple different sprayers 1 for the same job, and can also receive usage information from a single sprayer 1 over multiple jobs. Sprayer 1 usage information can be stored in memory 37 for later retrieval. The usage information can later be referenced and sent to another device, such as the personal computer 29 as shown in step 114. The personal computer 29 receives this usage information in step 115 for display on one or more interfaces 34. The usage information sent and received can be from multiple sprayers, multiple jobs, and multiple user accounts. For example, a manager operating the personal computer 29 may be able to access all of the usage information of all of the sprayers 1 in their fleet, but may not be able to access usage information for the sprayers 1 that the manager is not indicated in the memory 37 of the network server 35 to be owned by the company with which the manager account is associated. While the usage information is shown as being sent to the personal computer 29, the same information could be sent to a handheld computer 14 for viewing.

Figure 12:
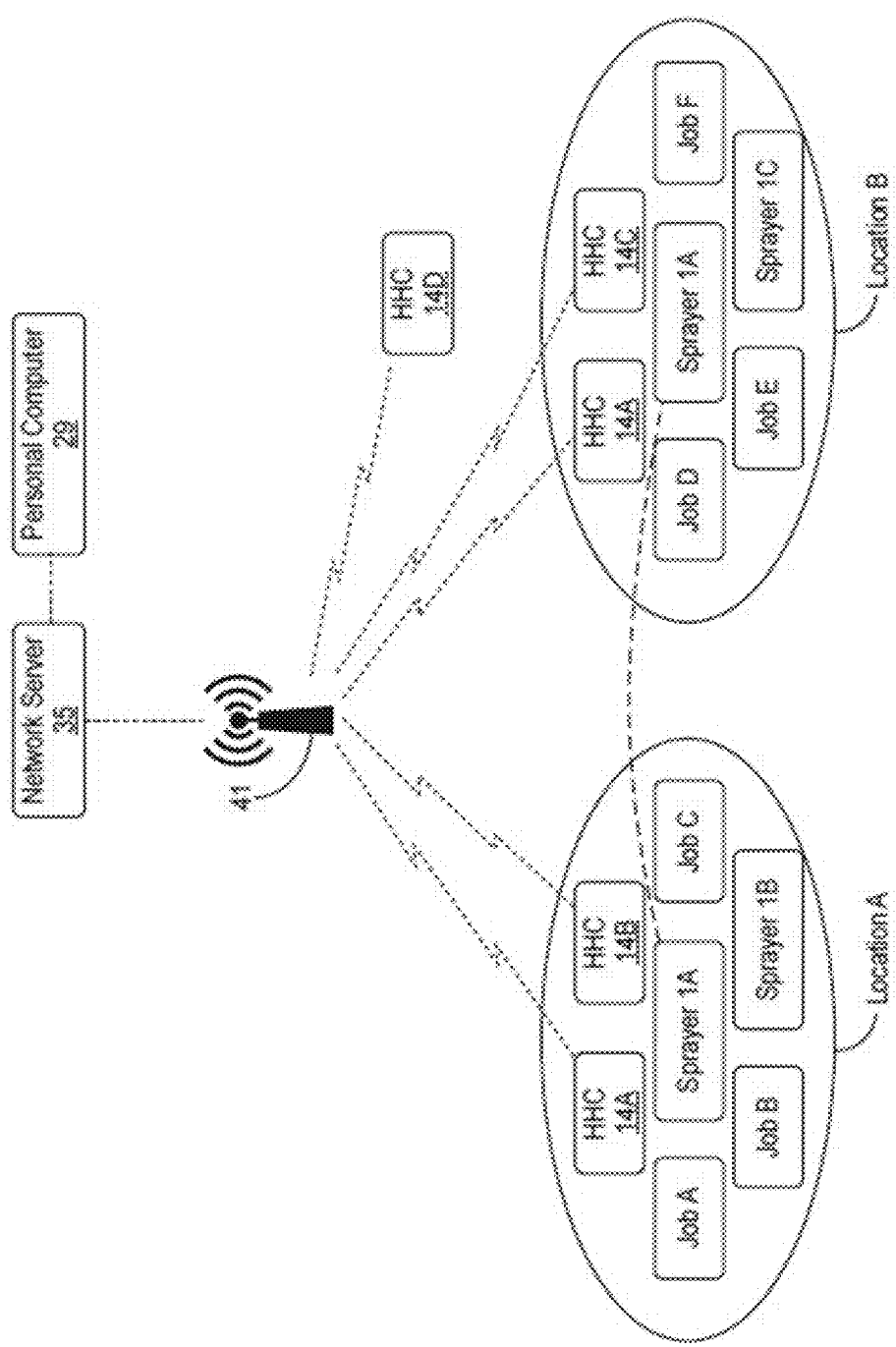
FIG. 12 is a schematic block diagram of a system for tracking productivity.

FIG. 12 is a schematic of a system for tracking productivity. Components with reference numbers similar to that previously shown and described can be the same the system. For example, sprayers 1A and 1B can be different embodiments of sprayer 1, and HHC's 14A-D can be different embodiments of handheld computer 14. Two locations, location A and location B, are shown. Each location can be a single point with a radius indicated, or can be a defined area. As shown, each of handheld computer 14A, handheld computer 14B, sprayer 1A, and sprayer 1B are within location A. Each of handheld computer 14A, handheld computer 14C, sprayer 1A, and sprayer 1C are within location B. As shown, handheld computer 14A is moved from location A to location B. Likewise, sprayer 1A is moved from location A to location B.

Jobs A-C are within location A such that sprayers 1A and 1B can be used to complete jobs A-C. Jobs D-F are within location B such that sprayers 1A and 1C can be used to complete jobs D-F. Workers can move between location A and location B to complete jobs A-F and can bring and/or leave equipment as necessary. For example, sprayer 1A is transportable to complete different jobs in different locations. Any of handheld computers 14A, 14B can be used to wirelessly connect with sprayer 1A, 1B in location A for ferrying of data to the network server 35 via the cellular network 41. Likewise, any of handheld computers 14A, 14C can be used to wirelessly connect with sprayer 1A, 1C in location B for ferrying of data to the network server 35 via the cellular network 41. It is expected that a user will consistently use their particular handheld computer 14, while using different sprayers 1A-1C day-to-day. Therefore, each sprayer 1A-C can connect with different handheld computers 14A-14C at different times.

The schematic of FIG. 12 can demonstrate several scenarios of use of the system. For example, a manager may use the personal computer 29 or handheld computer 14D to register an owner account for a painting company, the account associating the name of the company (e.g., A+Paint Works) with the account in memory of the network server 35. The manager can then register sprayers 1A, 1B while in short range wireless proximity to the sprayers 1A, 1B using the handheld computer 14D (e.g., if both sprayers 1A, 1B and the handheld computer 14D were at location A). The manager can then register sprayer 1C while in short range wireless proximity to the sprayer 1C using the handheld computer 14D (e.g., if both the sprayer 1C and the handheld computer 14D were at location B). The manager can use the personal computer 29 or handheld computer 14D to create jobs A-F. In creating jobs A and C, the manager can associate sprayers 1A, 1B and location A with jobs A and C. In creating job B, the manager can associate sprayer 1B and location A with job B. In creating jobs D-F, the manager can associate sprayers 1A, 1C and location B with jobs D-F. Other criteria can be associated with each of the jobs A-F, such as such job dates/ranges, user accounts, and/or any other criteria referenced herein.

A painter using the handheld computer 14A can go to location A with sprayer 1A and wirelessly connect the handheld computer 14A to the sprayer 1A, as discussed herein. When connected to the sprayer 1A, the painter can use the handheld computer 14A to transmit the sprayer ID of the sprayer 1A and information about location A (e.g., address or global coordinates) to the network server 35 via the cellular network 41. The network server 35 can compare the ID of sprayer 1A and the information about location A to a database of jobs, identifying job A and job C. The network server 35, in this example, did not identify job B because job B was not associated with sprayer 1A by the manager. The network server 35, in this example, did not identify any of jobs D-F because those jobs are associated with location B and not location A.

Information about identified job A and job C can be sent by the network server 35 to the handheld computer 14A via the cellular network 41. The handheld computer 14A can then present information about jobs A and C to the painter, and receive a selection of either job from the painter. Assuming the painter selected job A, usage data (e.g., previously or subsequently generated) from sprayer 1A is sent to the handheld computer 14A, then to the network server 35 via the cellular network 41 for storage on the server network 35 in association with the selected job A.

While remaining in location A, the painter can then select job B using the interface on the handheld computer 14A, which has the result of deselecting job A, such that usage data (e.g., previously or subsequently generated) from the sprayer 1A is sent to the handheld computer 14A then to the network server 35 via the cellular network 41 for storage on the server network 35 in association with the selected job B.

A second painter may use handheld computer 14B to wirelessly connect with sprayer 1B at location A. The handheld computer 14B sends the sprayer ID of sprayer 1B, information regarding location A, and information about the user account of the second painter to the network server 35 via the cellular network 41. The network server 35 compares this criteria to a list of stored jobs and identifies only job C because, when job C was created, it was associated with sprayer 1B, location A, and the user account of the second painter, whereas jobs A and B were not associated by the manager with the user account of the second painter. The second painter can select job C on the handheld computer 14B. Usage data (e.g., previously or subsequently generated) from the sprayer 1B is sent to the handheld computer 14B, then to the network server 35 via the cellular network 41 for storage on the server network 35 in association with the selected job C. The network server 35 then aggregates the usage data generated by sprayer 1A and sprayer 1B to track productivity (e.g., volume sprayed per hour and total) of job C.

After completion of job C, the first painter can transport sprayer 1A and handheld computer 14A to location B. The first painter can use the handheld computer 14A to connect with sprayer 1A or sprayer 1C. In either case, wireless connection to the sprayer and communication by the handheld computer 14A to the network server 35 can return identified jobs D-F for selection. Handheld computer 14C can wirelessly connect to the other of sprayer 1A or 1C and the network server 35 via cellular network 41 to return jobs D-F. The first or the second painter can then use the sprayers 1A, C to generate usage data which is sent by the handheld computers 14A, 14C to the network server 35 via the cellular network 41 for association with the selected job or jobs.

In this way, FIGS. 11 and 12 illustrate examples of aggregating information from different sprayers for one job or information from one sprayer used for different jobs. For example, one or more handheld computer devices 14 communicative couplable to the one or more sprayers 1. Each of the one or more handheld computers 14 may be configured to receive information indicative of one or more jobs from the plurality of jobs. For example, network server 35 may receive information associating the one or more sprayers 1 to the one or more jobs, and transmit the information indicative of the one or more jobs from the plurality of jobs to the handheld computer 14 based on the association of the one or more sprayers to the jobs. As another example, network server 35 may be configured to receive information associating the one or more sprayers to respective locations of the one or more jobs, and transmit the information indicative of the one or more jobs from the plurality of jobs to the handheld computers 14 based on the association of the respective locations to the jobs. As another example, the network server 35 may be configured to receive information associating the one or more jobs with user credentials and transmit the information indicative of the one or more jobs from the plurality of jobs based on received user credentials. As another example, network server 35 may be configured to receive information associating the one or more jobs with one or more of a date, date range, or timeframe within the data range, and transmit the information indicative of the one or more jobs from the plurality of jobs based on a current date and the received information associating the one or more jobs with one or more of a date, date range, or timeframe within the data range.

The information associating the one or more sprayers 1 to the one or more jobs or to respective locations of the one or more jobs may include information associating one sprayer to one job, information associating one sprayer to multiple jobs, or information associating multiple sprayers to one job.

Handheld computers 14 may receive user selection of a job of the one or more jobs. For instance, the user may use the interface 20 to view the one or more jobs and select of the jobs. Handheld computers 14 may receive information from the one or more sprayers 1, the information indicative of an amount of fluid sprayed by the one or more sprayers 1 with which the one or more handheld computer devices 14 are communicatively coupled, and output the information indicative of the amount of fluid sprayed in association with the selected job of the one or more jobs from the plurality of jobs.

Network server 35 may be configured to receive from each of the one or more handheld computers 14 respective information indicative of the amount of fluid sprayed for respective jobs and update respective spray volume logs (as described above) based on respective information indicative of the amount of fluid sprayed for respective jobs. The spray volume logs are respectively associated with the plurality of jobs and each spray volume log includes information indicative of the amount of fluid sprayed at the associated jobs. Network server 35 may generate information for display indicative of respective amounts of fluid sprayed for the plurality of jobs based on the spray volume logs.

As described above, multiple sprayers 1 may be used for one job or one sprayer 1 may be used for multiple jobs. Network server 35 may be configured to aggregate the fluid output values from the different sprayers 1 to determine the amount of fluid (e.g., paint) that is sprayed on a job-by-job basis.

As one example, two or more of the plurality of sprayers 1 are for the same job of the plurality of jobs. In such examples, to receive from each of the one or more handheld computer 14 respective information indicative of the amount of fluid sprayed for respective jobs, network server 35 is configured to receive from respective one or more handheld computers 14 communicatively coupled to the two or more of the plurality of sprayers 1 respective amounts of fluid sprayed by the two or more of the plurality of sprayers 1. Also to update respective spray volume logs, network server 35 is configured to aggregate the respective amount of fluid sprayed by the two or more of the plurality of sprayers 1 to update a spray volume log, associated with the job associated with the two or more of the plurality of sprayers 1.

As another example, a sprayer 1 of the plurality of sprayers 1 is for two or more of the plurality of jobs. In such examples, to receive from each of the one or more handheld computers 14 respective information indicative of the amount of fluid sprayed for respective jobs, network server 35 is configured to receive from respective one or more handheld computers 14 communicatively coupled to the sprayer of the plurality of sprayers respective amounts of fluid sprayed by the sprayer 1 at the two or more of the plurality of jobs. Also, to update respective spray volume logs, network server 35 may be configured to update a first spray volume log for a first job of the two or more of the plurality of jobs based on an amount of fluid the sprayer sprayed at the first job, and update a second spray volume log for a second job of the two or more of the plurality of jobs based on an amount of fluid the sprayer sprayed at the second job.

In this manner, this disclosure describes examples of techniques in which there are one or more sprayers 1 for spraying fluid for a plurality of jobs. Network server 35 may be configured to receive information generated by the one or more sprayers 1. The information may be indicative of the amount of fluid sprayed for respective jobs. Network server 35 may update respective spray volume logs based on respective information indicative of the amount of fluid sprayed for respective jobs. The spray volume logs are respectively associated with the plurality of jobs and each spray volume log includes information indicative of the amount of fluid sprayed at the associated jobs. Network server 35 may generate information for display indicative of respective amounts of fluid sprayed for the plurality of jobs based on the spray volume logs. One or more handheld computers 14, one or more sprayers 1, and network server 35 may operate together in the manner described throughout this disclosure.

In some examples, network server 35 may receive a plurality of job profiles respectively corresponding to a plurality of painting projects for one or more paint sprayers 1. The one or more sprayers 1 may be configured to generate a plurality of spray volume data sets and transmit the plurality of spray volume data sets (e.g., to handheld computer 14 or directly to network server 35). Network server 35 may receive the plurality of spray volume data sets (e.g., directly from the sprayers 1 or from handheld computers 14). Network server 35 may receive inputs respectively associating the plurality of spray volume data sets with the plurality of painting projects, determine spray volume values for the plurality of painting projects based on the plurality of spray volume data sets respectively associated with the plurality of painting projects, and generate an output based on the spray volume values.

As an example, transmitting the plurality of spray volume data sets includes receiving, on one or more handheld devices, information indicative of one or more jobs from the plurality of jobs, receiving user selection of a job of the one or more jobs, receiving information from the one or more sprayers, the information indicative of an amount of fluid sprayed by the one or more sprayers with which the one or more handheld computer devices are communicatively coupled, and outputting the information indicative of the amount of fluid sprayed in association with the selected job of the one or more jobs from the plurality of jobs.

In some examples, receiving inputs respectively associating the plurality of spray volume data sets with the plurality of painting projects includes receiving information indicating that a first spray value data set generated by a first sprayer is associated with a painting project, and receiving information indicating that a second spray value data set generated by a second sprayer is associated with the same painting project. In some examples, receiving inputs respectively associating the plurality of spray volume data sets with the plurality of painting projects includes receiving information indicating that a first spray value data set generated by a first plurality of sprayers is associated with a first painting project and receiving information indicating that a second spray value data set generated by a second plurality of sprayers is associated with a second, different painting project.

In some examples, determining spray volume values for the plurality of painting projects based on the plurality of spray volume data sets respectively associated with the plurality of painting projects includes updating respective spray volume logs based on respective information indicative of the amount of fluid sprayed for respective jobs, wherein the spray volume logs are respectively associated with the plurality of jobs and each spray volume log includes information indicative of the amount of fluid sprayed at the associated jobs.

The spray volume data that is calculated by the sprayer 1 and exported via the handheld computer 14 can be used for managing maintenance of the sprayer 1. The sprayer 1 includes various ware components, such as pump components (e.g., packings, valves, piston, etc.) and gun components such as the spray tip. Each of these components should be replaced on a periodic basis to maintain optimal performance of the sprayer 1, however each component wears at a different rate and has a different life, such that maintenance must be done at different times for different components. The principal wear of the components is due to spraying paint under pressure. Therefore, the spray volume data can be used to monitor the wear of the components and trigger alerts. In some embodiments, the spray volume will be compared to a threshold, and when that threshold is met or exceeded, an alert will be sent to the user to perform maintenance. The threshold can therefore represent a maintenance reminder level for inspection or replacement of components.

Multiple handheld computers 14 may handle spray data for a single sprayer 1, such that one handheld sprayer 14 alone may not handle all spray data for the sprayer 1. Therefore, the maintenance threshold can be held by the network server 35 and can perform comparison of spray data to the threshold is determined when maintenance is needed, and then can issue the alert to a handheld computer 14 being currently used in association with the sprayer 1 when the maintenance threshold is reached. Also, the maintenance threshold and spray data can be measured in terms of lifetime spray volume of the sprayer 1.

The maintenance reminders can be set on the handheld computer 14 or the personal computer 29 and then communicated to the network server 35 and saved therein. For example, multiple maintenance reminders can be input into the handheld computer 14 in association with the particular sprayer 1.

The comparison of the spray volume to the threshold can be performed by the network server 35 as spray volume log information is received from the handheld computer 14. The maintenance alert can be sent out from the network server 35 to the personal computer 29 and/or the handheld computer 14 when the threshold is met. In some examples, the sprayer does not perform the comparison of the spray volume with the threshold to generate the maintenance alert, but rather such comparison is performed by one of the handheld computer 14, the personal computer 29, and the network server 35. In such examples, the functionality of tracking output volumes and maintenance reminders is offloaded from the sprayer to the remote devices (e.g., the handheld computer 14, the personal computer 29, and/or the network server 35), thereby reducing the amount of data that is stored at the sprayer (i.e., the maintenance reminder schedule and corresponding threshold volume outputs) as well as reducing the processing burden on processors of the sprayer to perform the threshold comparisons and maintenance alerts.

In certain examples, any one or more of the handheld computer 14, the personal computer 29, and/or the network server 35 can track multiple alerts (e.g., maintenance reminders) for a sprayer with respect to a common volumetric starting point. For instance, with respect to a current lifetime volumetric output of the sprayer (e.g., current lifetime gallons of output), multiple alerts can be generated to replace, e.g., a tip of the sprayer at a first period of volumetric output (e.g., every first number of gallons) and packings of the sprayer at a second period of volumetric output (e.g., ever second number of gallons, which can be different than the first number of gallons). More than two different thresholds, periods of volumetric output, or other maintenance thresholds can be utilized, such as three or more different thresholds. In certain examples, the differing thresholds utilized for alerts can be generated with respect to a time of use, rather than the volumetric output.

The maintenance comparison is done by the handheld computer 14 or the network server 35. The data for the maintenance tracking is provided by the sprayer 1 and sent to the handheld computer 14 and possibly the networks server 35 as discussed herein. Maintenance logs may be based on spray logs previously described herein. Being that the spray logs only log spray volume when the pressure is greater than the threshold amount, the maintenance tracking is performed with spray data representing spraying at or above a particular fluid pressure threshold, and is not performed using spray data is collected when spraying below the particular fluid pressure threshold.

Figure 13:
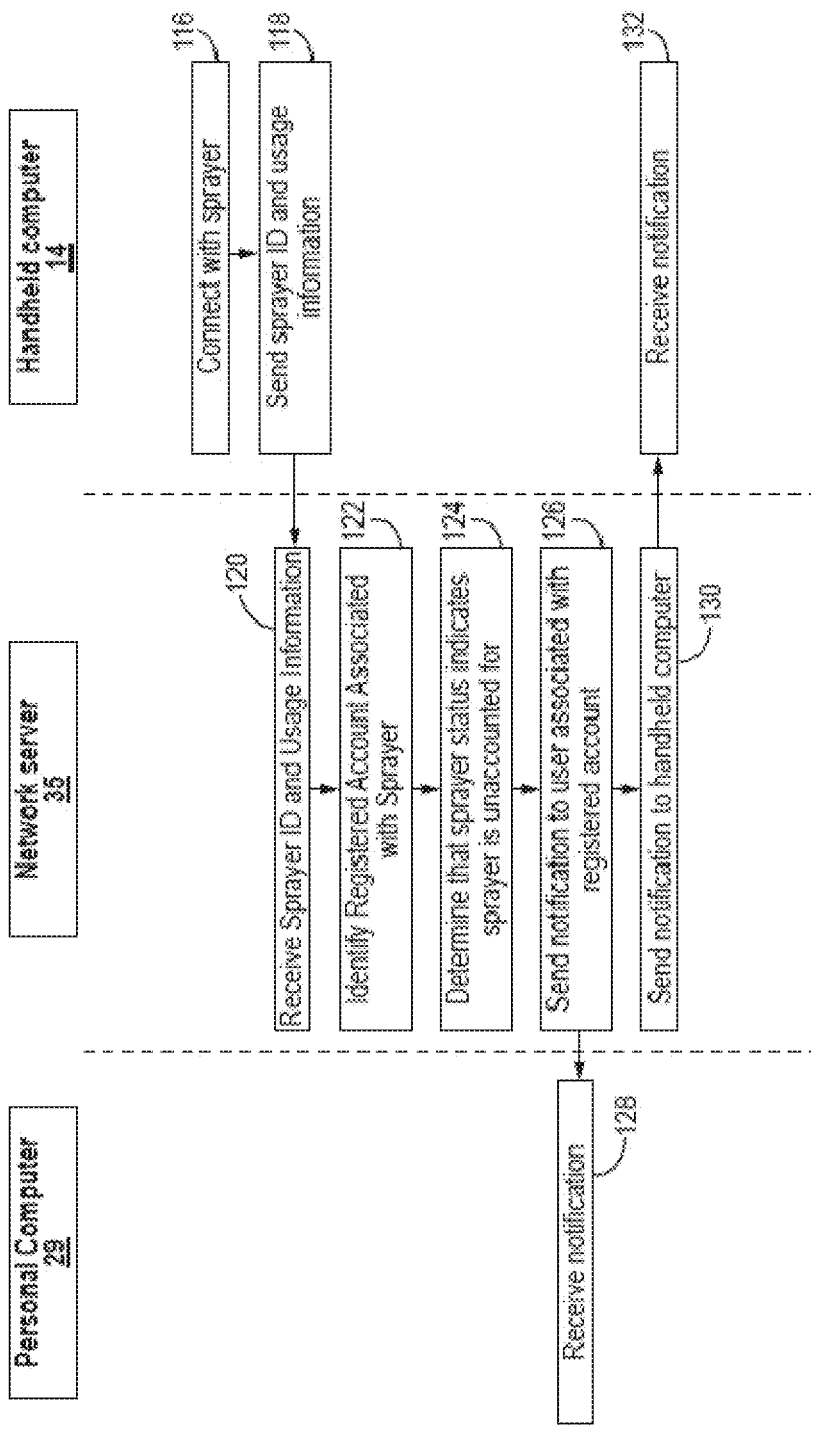

FIG. 13 is a flow diagram illustrating example operations for outputting a notification from the network server 35 in response to receiving sprayer identification data of a sprayer associated with a status indicating that the sprayer is unaccounted for. The example operations of FIG. 13 can be useful for locating a sprayer that may be misplaced, stolen, or otherwise unaccounted for. The example techniques of FIG. 13 can enable an owner, foreman, or other user to log into an account on the network server 35 associated with a sprayer and indicate that the sprayer is unaccounted for (e.g., missing, stolen, or otherwise unaccounted for). After the sprayer is indicated as unaccounted for, and in response to receiving identification information of the sprayer (e.g., from a handheld computer 14 uploading usage or other data of the sprayer), the network server 35 outputs a notification to a user associated with the account (e.g., an owner) and/or the handheld computer 14 that sends the sprayer identification information and/or usage information to the network server 35. In some examples, the notification includes location information of the remote computing device that sends the sprayer identification information, such as GPS coordinates of the remote computing device, thereby enhancing the ability of the owner or other user associated with the registered account to locate the sprayer. While the example operations of FIG. 13 are illustrated and described herein with respect to the handheld computer 14 and the personal computer 29, it should be understood that the techniques of FIG. 13 can be performed using any computing device (or devices) that are remote from and communicatively coupled with the network server 35.

As illustrated in FIG. 13, the handheld computer 14 connects with a sprayer, such as sprayer 1 (Step 116). For instance, the handheld computer 14 can be a smart phone or other computing device of a user, such as a painter, that connects to an assigned sprayer (e.g., sprayer 1) at the location of a job site, as is described in further detail above. The connection can occur in any manner described herein, such as via a BLUETOOTH™ communication protocol with a smartphone serving as the handheld computer 14. For instance, when the sprayer 1 is powered, the sprayer 1 can broadcast identification information of the sprayer 1, such as over a short-range wireless protocol (e.g., the Bluetooth protocol) from the wireless module 23. The broadcasted sprayer identification information can include the model number of the sprayer 1, the serial number of the sprayer 1, a particular name previously assigned to the sprayer 1, or any other information uniquely identifying the sprayer 1. The handheld computer 14 receives the sprayer identification information and/or sprayer usage information (e.g., fluid volume output information or other usage information) from the sprayer 1.

The handheld computer 14 transmits the sprayer 1 identification information and, in some examples, usage information of the sprayer 1 to the network server 35 (Step 118). In certain examples, the handheld computer 14 transmits location information of the handheld computer 14, such as longitudinal and latitudinal coordinates identified by the GPS module 19 of handheld computer 14. The handheld computer 14 can transmit the identification information of sprayer 1 (and, in some examples, location information of the handheld computer 14) while the handheld computer 14 is wirelessly connected to the sprayer 1 or while the handheld computer 14 is not wirelessly connected to the sprayer 1. For instance, the handheld computer 14 can transmit the identification information of the sprayer 1, usage information of the sprayer 1, and/or location information of the handheld computer 14 to the network server 35 while the handheld computer 14 is wirelessly connected to the sprayer 1, such as during operation of the sprayer 1 at a job location. In other examples, such as when a wireless connection between the handheld computer 14 and the network server 35 is unavailable when the handheld computer 14 is wirelessly connected to the sprayer 1, the handheld computer 14 can transmit the identification information of the sprayer 1, the usage information of the sprayer 1, and/or the location information of the handheld computer 14 to the network server 35 when the wireless connection between the handheld computer 14 and the network server 35 becomes available (e.g., when the handheld computer 14 is within range of a cellular communication network or other wireless network).

The network server 35 receives the identification information of the sprayer 1 and, in certain examples, location information of the handheld computer 14 (Step 120). The network server 35 then identifies a registered account associated with the sprayer 1 (Step 122). For example, the network server 35 can store, at memory 37, registered account information that associates the sprayer 1 with, e.g., an owner or other user (e.g., an owner account). The registered account can associate any one or more sprayers with the account, which can be identified by the network server 35 via the sprayer identification information. For instance, the network server 35 can identify one of a plurality of registered accounts (e.g., owner accounts) that is associated with the identification information of the sprayer 1, such as by searching a database or other data store within memory 37 or within memory of a computing device remote from and communicatively coupled with the network server 35 that associates the sprayer identification information with registered accounts.

The network server 35 determines that a status associated with the identified sprayer 1 in the registered account indicates that the sprayer 1 is unaccounted for (Step 124). For example, the network server 35 can store status information associated with any one or more sprayers of the registered account. The status information can indicate, e.g., a status indicating whether the respective sprayer is accounted for or unaccounted for (e.g., by the owner or other user associated with the registered account). That is, an owner or other user associated with the registered account can provide login credentials, such as a username and password, to log into the registered account associated with the sprayer at the network server 35 and provide a status indication that the sprayer is unaccounted for (e.g., has unknown location and/or job status) or accounted for (e.g., has a known location and/or job status). In some examples, the status information can include the location of the sprayer, such as a location of a job to which the sprayer is assigned, or a last known location of the sprayer. In the example of FIG. 13, the network server 35 determines that the status associated with the identified sprayer 1 (based on the received identification information of the sprayer 1) indicates that the sprayer 1 is unaccounted for.

The network server 35 provides a notification to one or more users associated with the registered account in response to determining that the sprayer identification information is received and the registered account includes the status associated with the identified sprayer 1 indicating that the identified sprayer 1 is unaccounted for (Step 126). For example, the network server 35 can store, in association with the registered account, an electronic mail (email) address associated with one or more users of the registered account, a Short Message Service (SMS) address associated with one or more users of the registered account, a voicemail address associated with one or more users of the registered account, or any other electronic communication address associated with one or more users of the registered account. The notification transmitted to the one or more users associated with the registered account can include an indication that the network server 35 received the identification information of the sprayer 1, an indication of the location of the sprayer 1, based on location information received from the handheld computer 14, user credential information of a user (e.g., a painter) connected with the sprayer 1, and/or a time and date when the handheld computer 14 connected with the sprayer 1. In some examples, the notification transmitted to the one or more users associated with the registered account (e.g., the owner) is transmitted without providing a notification to the handheld computer 14 or a user of the handheld computer 14 that reported the status and location of the sprayer 1.

The one or more users associated with the registered account receive the notification transmitted by the network server 35 (Step 128). For instance, as illustrated in FIG. 13, the user can receive the notification at personal computer 29, such as by retrieving the notification in email form, logging into the registered account at the network server 35 to retrieve the notification, or otherwise retrieving the notification via personal computer 29. Though the example of FIG. 13 describes the use of the personal computer 29 to retrieve the notification, in some examples, the user associated with the registered account can retrieve the notification using any computing device that can be communicatively coupled with the network server 35, such as another handheld computer 14 (e.g., a smartphone or tablet computer).

In some examples, such as the illustrated example of FIG. 13, the network server 35 transmits a notification to the user of the handheld computer 14 that transmitted the sprayer identification information (Step 130), which is received by handheld computer 14 at Step 132. The notification can include the same information as the notification sent to the user associated with the registered account (in Step 126) or different information. For instance, in some examples, the notification transmitted to the handheld computer 14 can include an indication that the sprayer 1 has a status indicating that the sprayer 1 is unaccounted for. In certain examples, the notification transmitted to the handheld computer 14 can include the indication that the sprayer 1 has the status indicating that the sprayer 1 is unaccounted for as well as an indication of the registered account and/or users associated with the registered account (e.g., the owner). Information concerning the notification is then displayed on the screen or other interface of the handheld computer 14.

Accordingly, the techniques of the example of FIG. 13 can enable an owner, foreman, or other user having a registered account for which one or more sprayers are associated to indicate that a sprayer is not accounted for, such as when the sprayer is missing, not located at an assigned job sit, stolen, or otherwise unaccounted for. The network server 35 transmits a notification to the user associated with the registered account (e.g., the owner) in response to a connection of the sprayer with a computing device (e.g., a handheld computer 14) that transmits identification information of the sprayer to the network server 35. The notification can alert the owner or other user that the sprayer has been used and, in some examples, a location of the handheld computer 14 that transmitted the data. In examples where the handheld computer 14 transmits the identification data while wirelessly connected with the sprayer, the location information of the handheld computer 14 can coincide with the location of the sprayer, thereby enabling the user of the account to identify a location of use (and possibly the physical location) of the sprayer. The notification can be sent to the owner or other user of the registered account without notifying the user of the handheld computer 14, thereby possibly enabling a stolen sprayer to be recovered. In certain examples, a notification can be sent to the user of the handheld computer 14, thereby enabling the user of the handheld computer 14 (e.g., a painter) to notify the owner, foreman, or other user associated with the registered account of the location of the sprayer.

Figure 14:
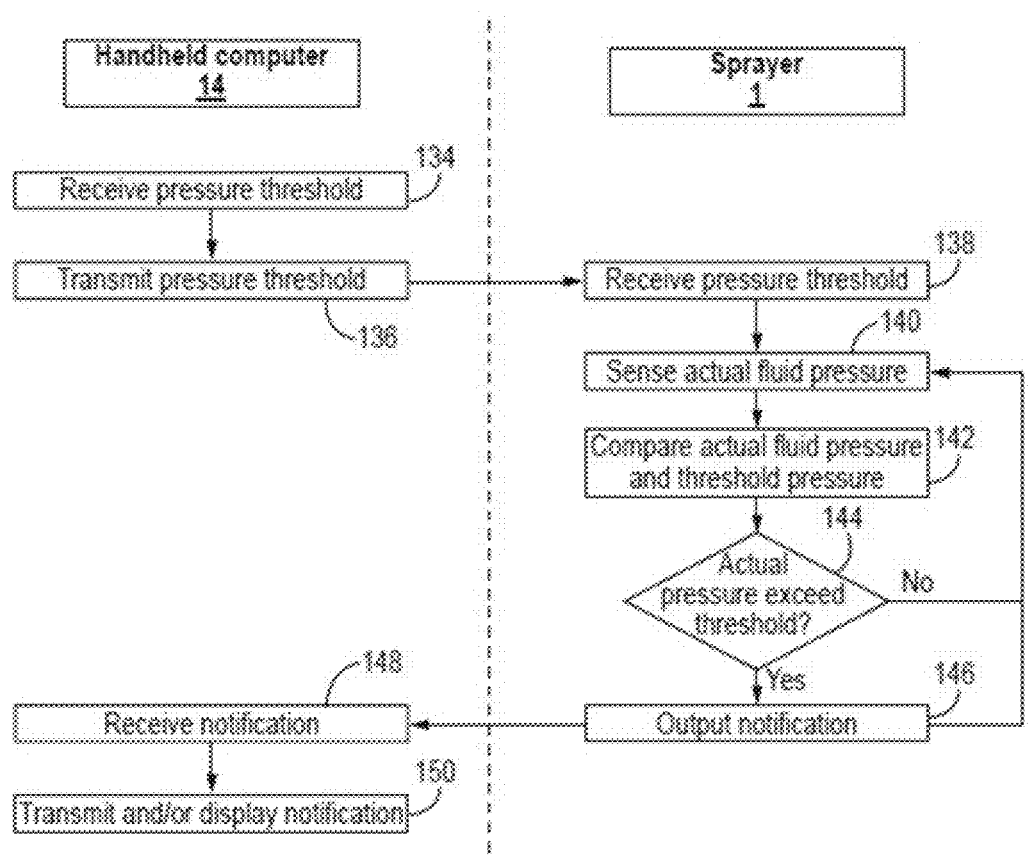
FIG. 14 is a flow diagram illustrating example operations for remotely setting a pressure threshold of a sprayer using a wirelessly connected handheld computer.

FIG. 14 is a flow diagram illustrating example operations for remotely setting a pressure threshold of sprayer 1 using the wirelessly connected handheld computer 14. The example operations of FIG. 14 enable a user, such as a foreman, owner, or other user to remotely set a threshold pressure, such as an upper threshold pressure, of sprayer 1 using the wireless connection between the handheld computer 14 and the sprayer 1.

For example, on a job site, there may be different motivations for the painter and the foreman or owner. The painter may configure the sprayer 1 in a high-pressure mode so as to complete the task. However, the foreman or owner may want the sprayer 1 configured in a low-pressure mode to ensure better finish and reduce wastage.

The sprayer 1 and/or the handheld computer 14 can output a notification based on a comparison of the threshold pressure to a measured pressure of the sprayer 1, such as when the measured pressure exceeds the threshold pressure. That is, it can be desirable for an owner of sprayer 1, a foreman of a job to which the sprayer 1 is assigned, or other user to set an upper threshold pressure guideline for application of fluid (e.g., paint) during a job. An increased output pressure of a pump of the sprayer 1 increases volumetric output of the sprayer 1, thereby providing an incentive for painters or other users to increase the pressure to increase the volumetric output and decrease a time required to complete a job.

Pump pressures and corresponding volumetric outputs that exceed an upper threshold, however, can decrease a quality of finish of the paint or other fluid that is applied at the job, such as by leaving drips, streaks, or an applied thickness of the fluid that is generally undesirable. Over pressurization can also result in wastage of paint which can be a large cost driver. Over pressurization may be also increase the wear-and-tear on the sprayer 1, requiring earlier maintenance or earlier break down. Accordingly, it can be advantageous to alert a user of the sprayer 1, a foreman or other supervisor of the job, an owner of the sprayer 1, or other user when an output pressure of a pump of the sprayer 1 exceeds a threshold pressure for the job.

As illustrated in FIG. 14, the handheld computer 14 receives an indication of a pressure threshold (Step 134). The threshold pressure can be an upper threshold pressure that is, e.g., less than a maximum achievable pressure of a pump of the sprayer 1. The threshold pressure can be changed based on the job to which the sprayer 1 is assigned. The handheld computer 14 (or personal computer 22) can receive the indication of the threshold pressure via a user one or more interfaces 20 of the handheld computer 14, via a communication from the network server 35 when the job to which the sprayer 1 is assigned is selected, or otherwise received via user interaction with the handheld computer 14 or received wirelessly via communication with the network server 35. Being able to remotely change the threshold pressure allows the manager to set a maximum pressure according to various conditions, such as the experience level of the painter, the nature the project, the type of paint being sprayed, environmental factors amongst others. Also, if the worker desires higher pressure, the worker can call the manager to request a higher lower pressure, the manager can remotely increase the maximum pressure. Therefore, the maximum pressure threshold can be changed at all times throughout the day according to changing jobsite conditions.

In the example of FIG. 14, the handheld computer 14 transmits the threshold pressure to the sprayer 1 via wireless communication (Step 136), which is wirelessly received at the sprayer 1 via, e.g., BLUETOOTH™ or other wireless communication protocol (Step 138). In other examples, as is further described below, the handheld computer 14 does not transmit the threshold pressure to the sprayer 1, but rather compares pressures received from the sprayer 1 to the threshold pressure and provides notifications based on the comparison.

As illustrated in FIG. 14, the sprayer 1 senses an actual fluid pressure of fluid downstream of a pump of the sprayer 1 (Step 140), such as via the pressure sensor 28 that measures the hydraulic pressure of the fluid (e.g., paint) exiting, or otherwise pumped downstream of the pump 9 of the sprayer 1. The sprayer 1 compares the sensed actual fluid pressure and the threshold pressure (Step 142) using, e.g., the control circuitry 21 of the sprayer 1. In examples where the threshold pressure is an upper threshold pressure, such as the example of FIG. 14, the sprayer 1 determines whether the actual fluid pressure exceeds the threshold pressure (Step 144). In other examples, such as examples where the threshold pressure is a lower threshold pressure, the sprayer 1 can determine whether the actual fluid pressure is less than the threshold pressure.

As illustrated in FIG. 14, in examples where the measured actual fluid pressure does not exceed the threshold pressure ("NO" branch of Step 144), the sprayer 1 continues to sense the actual fluid pressure downstream of the pump of sprayer 1 (Step 140). The sprayer 1 can continue to iterate through Steps 140, 142, and 144 to measure the actual fluid pressure (Step 140), compare the actual fluid pressure and the threshold pressure (Step 142), and determine whether the actual fluid pressure exceeds the threshold pressure (Step 144) during operation of the sprayer 1. In certain examples, the sprayer 1 does not output an indication of a result of the comparison of the actual fluid pressure and the threshold pressure until the sprayer 1 determines that the actual fluid pressure exceeds the threshold fluid pressure. In other examples, the sprayer 1 outputs an indication that the actual fluid pressure does not exceed the threshold pressure until the sprayer 1 determines that the actual fluid pressure exceeds the threshold pressure.

In response to determining that the actual fluid pressure exceeds the threshold fluid pressure ("YES" branch of Step 144), the sprayer 1 outputs a notification (Step 146). The notification can include any one or more of an indication that the threshold pressure has been exceeded, an extent by which the actual fluid pressure exceeds the threshold pressure (e.g., the difference between measured and threshold pressure), a time duration that the actual fluid pressure exceeds the threshold pressure, and a date and/or time at which the actual fluid pressure exceeds the threshold pressure. In certain examples, the sprayer 1 can output the notification (in Step 146) in response to determining that the actual fluid pressure exceeds the threshold pressure for a threshold time duration, such as one second, five seconds, one minute, or other threshold time durations. In some embodiments, the measured pressure must exceed the pressure threshold for a predetermined duration (e.g., ten seconds) for the notification to be output in step 146, and the pressure exceeding the threshold for a shorter duration does not cause the notification to be output. In some embodiments, the measured pressure must exceed the pressure threshold for a predetermined duration (e.g., ten seconds) while the pump 9 continues to pump (e.g., as determined by the pump cycle sensor 27 or the motor controller 25) for the notification to be output in step 146, and the pressure exceeding the threshold for a shorter duration and/or the pump 9 not being driven during the over pressurization does not cause the notification to be output. It is noted that the sprayer 1 continues to operate and spray (e.g., the motor controller 25 does not limit power to the motor 4) despite the pressure threshold being exceeded so that the paint can continue to complete the job, but the notification is nevertheless sent so that a supervisor can be informed of spraying while overpressure.

The notification is received by the handheld computer 14 (Step 148), and is transmitted from the handheld computer 14 to, e.g., the network server 35 and/or displayed at a display device of the handheld computer 14 (Step 150). In examples where the handheld computer 14 transmits the notification to the network server 35, the network server 35 can notify an owner or other user of a registered account associated with the sprayer 1.

Though the example of FIG. 14 illustrates and describes the sprayer 1 as receiving the threshold pressure and comparing the sensed actual fluid pressure to the threshold fluid pressure for outputting the notification, it should be understood that in some examples, the handheld computer 14 does not transmit the threshold pressure to the sprayer 1 for comparison with the sensed actual fluid pressure. In such examples, the sprayer 1 outputs the sensed actual fluid pressure (or an indicator of measured pressure) to the handheld computer 14 (e.g., periodically, such as at regular time intervals, regular fluid output volumes, or other intervals). The handheld computer 14, in such examples, compares the actual fluid pressure received from the sprayer 1 and the threshold pressure, and outputs any of the notifications referenced herein based on the comparison (e.g., such as when the actual fluid pressure exceeds the threshold pressure).

As such, techniques of FIG. 14 can enable a user of the sprayer 1 (e.g., a painter), a foreman or other supervisor of a job to which the sprayer 1 is assigned, and/or an owner of the sprayer 1 to be informed that a threshold pressure is exceeded. The techniques of FIG. 14 can therefore help to ensure that an output pressure of the sprayer 1 utilized for a particular job is within a range of output pressures that are desirable for the job, such as a range of output pressures that are below an upper threshold pressure that promotes a uniform, high quality distribution of the fluid (e.g., paint) from the sprayer 1.

In this manner, FIG. 14 illustrates example techniques in which handheld computer 14 and/or network server 35 and/or control circuitry 21 of sprayer 1, alone or in combination, may receive a plurality of pressure values when the pump 9 is being operated during a window (e.g., based on a duration of time or number of cycles (full or partial) of pump 9) and determine an aggregate pressure metric for the window based on the plurality of pressure values received during the window. Handheld computer 14 or control circuitry 21 may cause respective wireless modules to transmit the aggregate pressure metric. Examples of the aggregate pressure metric include one of an average, mode, or median of the one or more pressure values.

There may be various ways in which the pressure values are received. As one example, the pressure values may be received based on a user selected pressure level. As another example, the pressure values may be determined based on pressure measurements from a pressure sensor.

Network server 35 may be configured to receive the pressure metric. Network server 35 may then output information indicative of the pressure metric, to a personal computer 29, for display.

Figure 15:
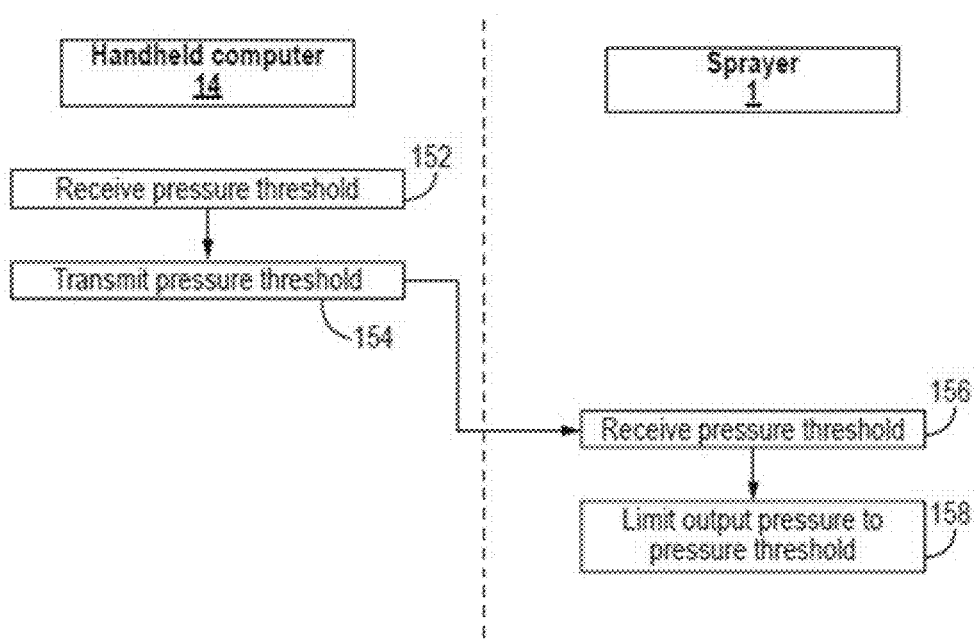
FIG. 15 is a flow diagram illustrating example operations for limiting an output pressure of a sprayer to a threshold pressure that is received via wireless communication from a handheld computer.

FIG. 15 is a flow diagram illustrating example operations for limiting an output pressure of the sprayer 1 to a threshold pressure that is received via wireless communication from the handheld computer 14. The example operations of FIG. 15 enable a user, such as a foreman, owner, or other user to remotely set a threshold pressure, such as an upper threshold pressure, of the sprayer 1 using the wireless connection between the handheld computer 14 and the sprayer 1. The sprayer 1 then limits the output fluid pressure of the sprayer 1 to the received threshold pressure.

As illustrated in FIG. 15, handheld computer 14 receives an indication of a pressure threshold (Step 152). The threshold pressure can be an upper threshold pressure that is, e.g., less than a maximum achievable pressure of a pump of the sprayer 1. The threshold pressure can be changed based on the job to which the sprayer 1 is assigned. For example, each job, as referenced herein, when created or thereafter may have a maximum pressure limit input by the supervisor, and this maximum pressure limit is communicated to the sprayer 1. The handheld computer 14 can receive the indication of the threshold pressure via a graphical user interface of the handheld computer 14, via a communication from the network server 35 when the job to which the sprayer 1 is assigned is selected, or otherwise received via user interaction with the handheld computer 14 or received wirelessly via communication with the network server 35.

The handheld computer 14 wirelessly transmits the threshold pressure to the sprayer 1 via, e.g., the Bluetooth or other wireless communication data protocol (Step 154). The threshold pressure is wirelessly received by the sprayer 1 (Step 156).

The sprayer 1 limits an output pressure of the sprayer 1 so that an actual fluid pressure sensed by sprayer 1 (e.g., via pressure sensor 28 of sprayer 1) does not exceed the threshold pressure (Step 158). For example, the motor controller 25 of sprayer 1 can control motor 4 such that the actual fluid pressure sensed via the pressure sensor 28 of sprayer 1 does not exceed the threshold pressure. For example, if the measured pressure as measured by the pressure sensor 28 exceeds the maximum threshold pressure as determined by the processor 24 then the processor 24 can cause the motor controller 25 to decrease or stop power delivery to the motor 4 to slow or stop the pump 9 so that lower fluid pressure is developed. If the measured pressure as measured by the pressure sensor 28 drops below the maximum threshold pressure as determined by the processor 24 then the processor 24 can cause the motor controller 25 to increase or resume power delivery to the motor 4 to speed up or cycle the pump 9 so that lower fluid pressure is developed. In some embodiments, the measured pressure must exceed the maximum threshold pressure for a predetermined duration, such as 2 seconds, before the power is decreased or cut to the motor 4 to avoid momentary pressure spikes from interrupting spraying. In some examples, the control circuitry 21 of the sprayer 1 adjusts limits corresponding to a potentiometer dial of the control 5 of sprayer 1, such that a maximum input of the potentiometer dial corresponds to the threshold pressure.

Accordingly, techniques of FIG. 15 can enable a threshold pressure (e.g., an upper threshold pressure) of the sprayer 1 to be remotely set using the wireless connection between the handheld computer 14 and the sprayer 1. The sprayer 1 limits the output fluid pressure to the received threshold pressure, thereby ensuring that the output pressure of the sprayer 1 does not exceed the threshold pressure.

For example, control circuitry 21 may receive the threshold pressure and the pump output pressure setting (e.g., actual pressure as determined from the pressure sensor or based on user selected pressure level). Control circuitry 21 may then control the operation of sprayer 1. For example, control circuitry 21 may cause the motor to drive output of pump 9 to the pump output pressure setting unless the pump output pressure setting is greater than the threshold pressure in which case control circuitry 21 may cause the motor to drive the output of pump 9 to the threshold pressure.

While the control circuitry 21 of the sprayer 1 calculating a spray volume metric based on cycle status of the pump 9 and then wirelessly transmitting the spray volume metric to a handheld computer 14 is discussed herein in various embodiments, any such sprayer 1 embodiment may instead not calculate spray volume but rather may wirelessly transmit a pump cycle metric to the handheld computer 14 and the handheld computer 14 (or the network server 35 in the event that the handheld computer 14 transmits the pump cycle metric to the network server 35) and the handheld computer 14 may calculate the spray volume metric based on the pump cycle metric. For example, the sprayer 1 may determine, save in memory 22, and transmit to the handheld computer 14 number or fraction of pump cycles over a time window (e.g., 1 second, 10 second, 1 minute, 1 hour). Based on the number or fraction of pump cycles over the time window, the handheld computer 14 may calculate spray volume for the same time window in the same manner as discussed herein for the sprayer 1 calculating the spray volume. The sprayer 1 may determine, save in memory 22, and transmit to the handheld computer 14 measured pressure to be used in the spray volume calculation as discussed herein. The calculated spray volume 14 may be used in any way discussed herein, such as for tracking painting productivity, managing job data, or other action including being transmitted to the network server 35. Instead of the handheld computer 14 calculating the spray metric, the number or fraction of pump cycles over the time window and/or measured pressure data may be transmitted to the network server 35 and the network server 35 may make the calculation. Every reference to the sprayer 1 calculating a spray volume metric could be modified with the sprayer 1 instead transmitting data for such a calculation and the handheld computer 14 and/or the network server 35 instead calculating the spray volume metric.

Accordingly, FIGS. 14 and 15 illustrate examples in which the control circuitry 21 of the sprayer 1 is configured to receive a threshold pressure wirelessly (e.g., control circuitry 21 may receive the threshold pressure from a remote device such as handheld computer 14, network server 35). There may be benefits to wirelessly receiving the threshold pressure, rather than relying on a constant pre-stored/pre-configured threshold pressure. For example, different job sites, with different jobs, may require different pressure levels. In this way, each of sprayers 1 at the different job sites may be configurable for the different threshold pressures.

The control circuitry 21 of the sprayer 1 may control operation of the sprayer 1 based on the threshold pressure and the actual pressure. For example, to control operation of the sprayer 1, the control circuitry 21 may limit an output pressure of the sprayer so that the actual pressure does not exceed the threshold pressure. The control circuitry 21 may be configured to limit the output pressure of the sprayer 1 by controlling a speed of the motor 4 so that the actual pressure does not exceed the threshold pressure.

As another example, to control operation of the sprayer 1, the control circuitry 21 of the sprayer 1 may be configured to compare the threshold pressure and the actual pressure and output a notification based on the comparison of the threshold pressure and the actual pressure. For instance, the control circuitry 21 may be configured to output the notification based on the comparison of the threshold pressure and the actual pressure by outputting the notification in response to determining that the actual pressure exceeds the threshold pressure. In some examples, the notification includes an indication that the actual pressure exceeds the threshold pressure. In some examples, the notification includes an indication of an extent by which the actual pressure exceeds the threshold pressure.

As described above, there may be benefits in setting the threshold pressure at a level to reduce wear-and-tear. One way to achieve reduction in wear-and-tear may be to set the threshold pressure to be less than a maximum output pressure achievable by the pump 9 of the sprayer 1.

Figure 16:
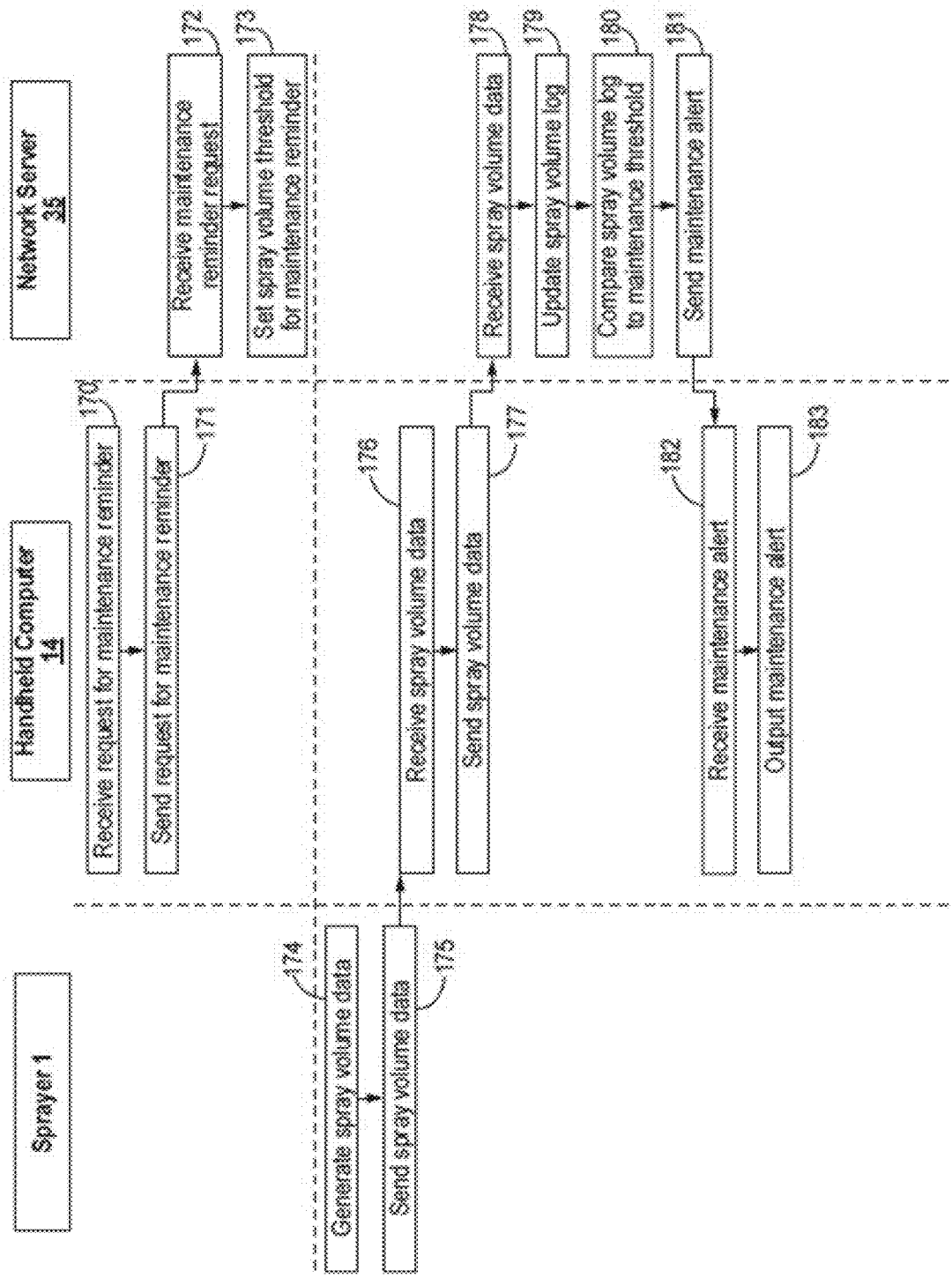
FIG. 16 is a flow diagram illustrating example operations for generating maintenance alerts for a sprayer with data received via wireless communication from a handheld computer.

FIG. 16 shows a flowchart for tracking spray volume relative to a maintenance reminder and issuing an alert once the maintenance threshold is reached. The handheld computer 14 or the personal computer 29 can be used by a user to input one or more maintenance reminders for a particular sprayer 1. The network server 35 can receive (e.g., from the handheld computer 14) and save the maintenance reminder for the particular sprayer 1. Each maintenance reminder can identify a sprayer 1 such as by model number, serial number, owner-assigned sprayer name, and/or or other unique identification. Each maintenance reminder can include a maintenance action such as replace the packings, replace the tip, replace the piston rod, replace the pump, or other action associated with a sprayer 1. Each maintenance reminder can include a maintenance threshold measured in spray volume or an indication of spray volume such as pump cycles. For example, a first maintenance reminder may be to replace the packings of a particular sprayer (e.g., identified by serial number) after 100 gallons of paint are sprayed, and a second maintenance reminder may be to replace a tip nozzle of the particular sprayer after 50 gallons of paint are sprayed.

Returning to the process of FIG. 16, the handheld computer 14 receives a request for a maintenance reminder in step 170. Receiving the request can be the user using the one or more interfaces 20 to input a maintenance reminder, which for example could be the first maintenance reminder and/or the second maintenance reminder referenced above. If the handheld computer 14 is currently wirelessly connected to the sprayer 1, then the maintenance reminder may be automatically associated with that sprayer 1 (e.g., using the serial number of the sprayer 1). Alternatively, a maintenance reminder may be input at the personal computer 29, in which case the sprayer 1 must be uniquely identified, such as by the user selecting a name of a sprayer associated with the user's account causing the serial number of the sprayer to be retrieved from memory and sent. Assuming the maintenance reminder is received by the handheld computer 14, the handheld computer 14 sends the maintenance reminder, including underlying data referenced above, to the network server 35 in step 171. In step 172, the network server 35 receives the maintenance reminder from the handheld computer 14. In step 173, the network server 35 sets the spray volume threshold (e.g., saved the maintenance reminder in memory) based on the received maintenance reminder request. Setting the spray volume threshold for the maintenance reminder may include starting a spray volume maintenance log in memory for the tracking of spray volume specifically for the maintenance reminder. The spray volume maintenance log can be set to zero when the spray maintenance log is first started and then updated as spray volume data is received until the threshold amount is reached in the spray volume maintenance log.

In step 174, the sprayer 1 generates spray volume data. The spray volume data can be any type of data referenced herein, including volume sprayed. The spray volume data may alternatively be pump cycles instead of the calculated spray volume. In step 175, the sprayer 1 sends the generated spray volume data to the handheld computer 14. Step 175 may occur periodically while spraying according to a schedule (e.g., every minute or hour), initiated based on the closure of each time window (referenced above), and/or at the end of each spray session. In step 176, the handheld computer 14 receives the spray volume data. In step 177, the handheld computer 14 sends the spray volume data to the network server 35. In step 178, the network server receives the spray volume data. In step 179, the network server 35 can update the spray volume maintenance log based on the received spray volume data. For example, if the spray volume data generated by the sprayer 1 indicates that 10 gallons were sprayed, and the spray volume maintenance log can be increased by 10 gallons in step 179. In step 180, the network server compares the spray volume maintenance log for the maintenance threshold to determine whether the threshold has been reached. If the threshold has not been reached by the spray volume maintenance log, then no alert is issued. Typically, steps 174-180 will be repeated many times as more spray volume data is accumulated and the spray volume maintenance log is increased until the maintenance threshold is reached by the spray volume maintenance log. It is assumed that it will take multiple spray sessions over multiple days (in which the sprayer 1 is cycled off and on another day and/or the handheld computer 14 disconnects and then reestablishes the connection at a later time), and possibly different handheld computers 14 communicating with the sprayer 1 at different times corresponding to different spray sessions and the different handheld computers 14 relaying different spray volume data to the network server 35 for saving in the same spray volume maintenance log until the maintenance threshold is reached. Once the comparison in step 180 determines that the spray volume maintenance log exceeds the maintenance threshold, the networks server 35 sends the maintenance alert in step 181. Various different devices can receive the alert from the network server 35, including the handheld computer 14 that is currently or most recently connected with the sprayer 1, the personal computer 29 associated with an owner or manager of the sprayer 1, and/or other device. In the example flowchart shown in FIG. 16, the maintenance alert is received by the handheld computer 14 in step 182. The handheld computer 14 then outputs the maintenance alert in step 183 to the user to instruct the user to carry out maintenance on the sprayer 1.

One aspect of the process of FIG. 16 is that the spray volume maintenance log is maintained on the network server 35 and the network server 35 sets the spray volume maintenance log at zero at the creation of the maintenance reminder request. If multiple maintenance reminder requests are received simultaneously, such as for different components, then multiple spray volume maintenance logs may be set to zero and then updated as spray volume data is received by the network server 35, the multiple spray volume maintenance logs being used because the maintenance reminders will have different spray volume thresholds for the different maintenance actions/components.

In some embodiments, spray volume maintenance log is maintained on the network server 35 but is transmitted to and received by the handheld computer 14 when the handheld computer 14 (for which the spray volume maintenance log is being maintained) establishes a connection with the sprayer 1 so that the handheld computer 14 can determine if and when the threshold of a spray volume maintenance log is met regardless of a subsequent loss of connection to the network server 35 and to avoid sending periodic data updates to the network server 35. The handheld computer 14 then updates and tracks the spray volume maintenance log and determines whether the maintenance threshold is reached and issues the alert if the threshold is reached. The updated spray volume maintenance log and/or spray volume is then sent to the network server 35 at the end of the spray session reflecting the spray volume output that day in the spray volume maintenance log. The network server 35 can then store and later send the updated spray volume maintenance logs to another handheld computer 14 for another session when the other handheld computer 14 connects with the sprayer 1 to repeat the process of monitor for reaching the maintenance threshold of the spray volume maintenance log.

Figure 17:
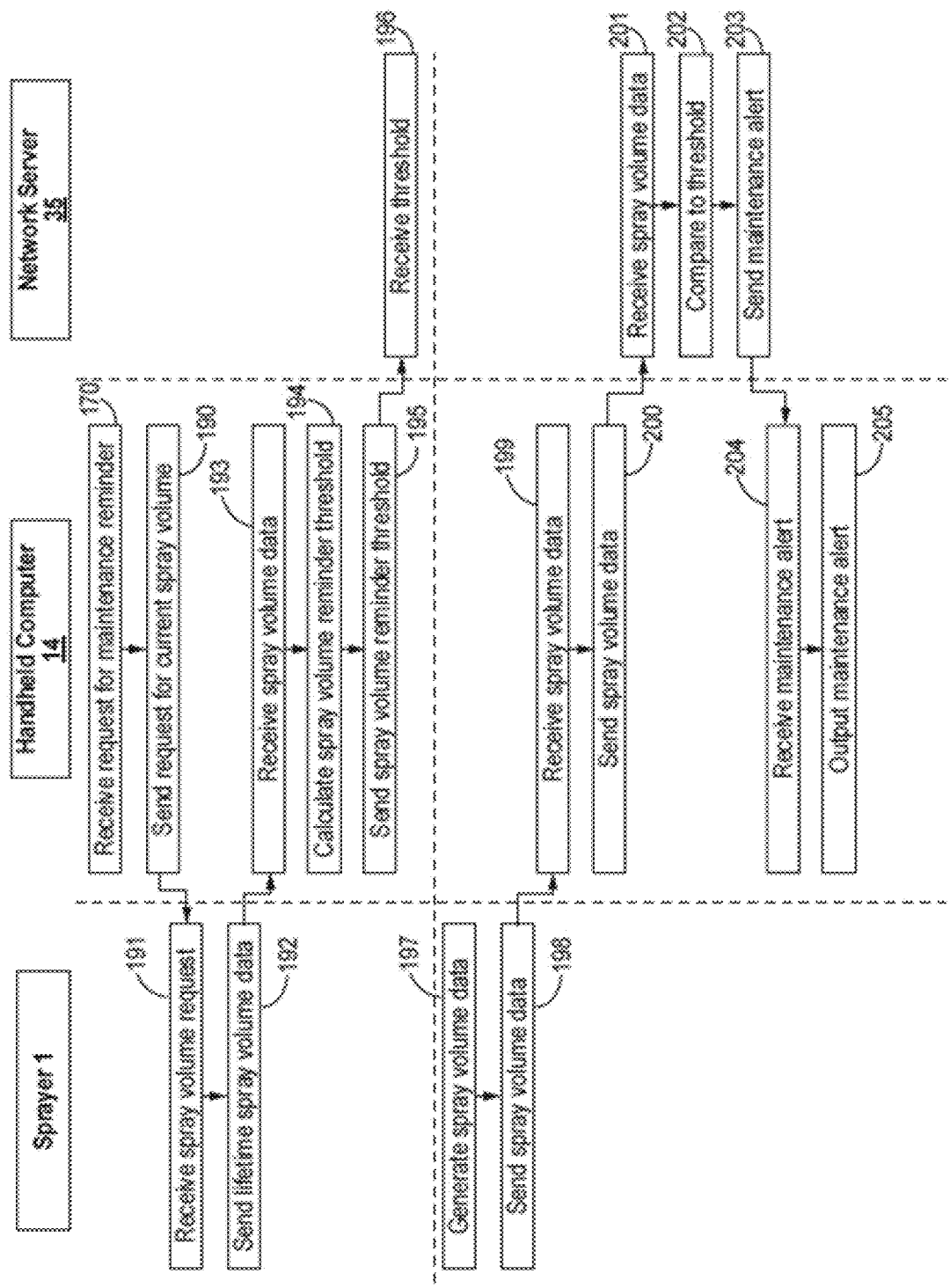
FIG. 17 is a flow diagram illustrating example operations for generating maintenance alerts for a sprayer with data received via wireless communication from a handheld computer.

FIG. 17 is a flowchart for tracking spray volume maintenance log and issuing maintenance alerts similar to the process of FIG. 16. One difference between the process of FIG. 17 and FIG. 16 is that in the process of FIG. 17 the sprayer 1 sends a lifetime spray volume data to the handheld computer 14 which is then sent to the network server 35. The lifetime spray volume data can be the total volume sprayed by the sprayer 1 during the whole life the sprayer 1 which is not reset or set to zero. In some embodiments, the lifetime spray volume data is a log of when spray volume valves were reached, and in some other embodiments the lifetime spray volume data is a single value of total lifetime spray volume. Instead of the handheld computer 14 and/or the network server 35 keeping track of a separate spray volume maintenance log for each maintenance reminder, the process of FIG. 17 sets each maintenance reminder at a particular value of the lifetime spray volume data and issues an alert if the lifetime spray volume data value reaches the particular value.

The process includes receiving a request for setting a maintenance reminder in step 170 similar to the step 170 from the process of FIG. 16. In step 190, the handheld computer 14 sends a request for the current lifetime spray volume data to the sprayer 1. The sprayer 1 stores in memory 22 the lifetime spray volume data. In step 191, the sprayer 1 receives the lifetime spray volume data request and sends the lifetime spray volume data to the handheld computer 14 in step 192. In step 193 the handheld computer 14 risk receives the lifetime spray volume data. In step 194, the handheld computer calculates the maintenance threshold based on the requested maintenance reminder and the lifetime spray volume data received from the sprayer 1. As before, different maintenance reminders will have different spray volume thresholds. For example, a first maintenance reminder may be to replace the packings after 100 gallons of paint are sprayed, and a second maintenance reminder may be to replace a tip nozzle after 50 gallons of paint are sprayed. Therefore, the maintenance threshold for packing replacement can be set by adding 100 gallons to the current lifetime spray volume value. Multiple maintenance thresholds can be set in this way, typically resulting in different maintenance thresholds calculated from the same current lifetime spray volume value starting point. In step 195, the handheld computer 14 sends the maintenance threshold to the network server 35 which receives the maintenance threshold in step 196. It is noted that steps 194 could alternatively be performed by the network server 35 by the handheld computer 14 sending the lifetime spray volume data to the network server 35. The handheld computer 14 and/or the networks server 35 saves the maintenance thresholds in memory for reference.

Possibly in another spray session or on another date, the process of FIG. 17 continues with the sprayer 1 generating spray volume data in step 197. In generating the spray volume data, the sprayer 1 updates the lifetime spray volume data, such as by increasing the lifetime spray volume log or value as more paint sprayed in the session. Periodically while spraying according to a schedule (e.g., every minute or hour), initiated based on the closure of each time window (referenced above), and/or at the end of each spray session, the sprayer 1 then sends the updated lifetime spray volume data to the handheld computer 14 in step 198. The handheld computer 14 receives the lifetime spray volume value in step 199. The handheld computer 14 then sends the lifetime spray volume value to the network server 35 in step 200. The network server 35 receives the lifetime spray volume value in step 201. The network server 35 compares the lifetime spray volume value to the maintenance threshold(s) to determine if one of the thresholds has been met in step 202.

If a threshold is met, then the network server 35 sends the maintenance alert to the handheld computer 14 in step 203. In step 204, the handheld computer 14 receives the maintenance alert. In step 205, the handheld computer 14 outputs the maintenance alert on the one or more interfaces 20 to alert a user of the need for maintenance. It is noted that steps 204 and 205 can be performed only with the handheld computer 14 that is currently interfacing with the sprayer 1 or with multiple handheld computers 14 and/or with personal computer 29, which can be in the form of a text message, email, or other type of message. In some embodiments, the network server 35 sends the maintenance threshold to the handheld computer 14 that is in a current session with the sprayer 1, and of the handheld computer 14 performs the comparison of step 202 and can send an alert similar to step 203 to other devices and/or can output an alert message and in step 205.

In this manner, handheld computer 14 or network server 35 may be configured to receive data indicative of spray volume. Handheld computer 14 and/or network server 35 may be configured to maintain a spray volume maintenance log in memory by updating the spray volume maintenance log with the data indicative of the spray volume from sprayer 1. Handheld computer 14 and/or network server 35 may compare the spray volume maintenance log to a spray volume threshold and cause an alert to be issued when the spray volume maintenance log is greater than the spray volume threshold.

There may be various ways in which sprayer 1 may generate the data indicative of the spray volume. As one example, control circuitry 21 may count full or partial pump cycles of pump 9 and generate the data indicative of spray volume based on the count of full or partial pump cycles of the pump 9. As another example, control circuitry 21 may determine whether the sprayer 1 is operating in a fluid atomizing spray mode or non-atomizing flushing mode and generate the data indicative of spray volume based on a count of full or partial cycles of the pump when the sprayer is operating in the fluid atomizing spray mode. In both examples, the spray volume maintenance log is updated based on the count of full or partial pump cycles of the pump when the sprayer is operating in the fluid atomizing spray mode. In some examples, control circuitry 21 may be configured to determine a pressure of the output fluid, and to determine whether sprayer 1 is operating in the fluid atomizing spray mode or the non-atomizing flushing mode, control circuitry 21 may be configured to determine whether the sprayer 1 is operating the fluid atomizing spray mode or non-atomizing flushing mode based on the pressure of the output fluid.

As described above, there may be a plurality of maintenance reminders. As an example, a first maintenance reminder may be triggered for a first component after a first number of gallons are sprayed by sprayer 1. A second maintenance reminder may be triggered for a second component after a second number of gallons are sprayed by sprayer 1.

For instance, in the above example, the spray volume threshold is a first spray volume threshold associated a first maintenance reminder, and the alert is a first alert for the first maintenance reminder. Handheld computer 14 and/or network server 35 may be configured to compare the spray volume maintenance log to a second spray volume threshold associated with a second maintenance reminder, and cause a second alert associated with the second maintenance reminder to be issued when the spray volume maintenance log is greater than the second spray volume threshold. In this example, the first spray volume threshold and the second spray volume threshold are thresholds for different volumes. As an example, the first spray volume threshold is associated with the first maintenance reminder for replacing one of a packings, a tip, a piston rod, or the pump, and the second spray volume threshold is associated with the second maintenance reminder for replacing another one of the packings, the tip, the piston rod, or the pump.

In some cases, a first user may use sprayer 1 for a certain amount of time, and during that time, may not be sprayed sufficient paint to trigger a maintenance reminder. However, a second, subsequent user may use sprayer 1, and during use by the second user, the second user may have sprayed sufficient paint to trigger a maintenance reminder. Since the first and second users may have their own respective ones of handheld computer 14, in some cases, the respective ones of handheld computer 14 may not be able to determine how much paint has been sprayed. Accordingly, in some examples, network server 35 may be configured to keep a running total of how much paint was output by sprayer 1 even where different users used sprayer 1 so that network server 35 can determine whether sufficient use of sprayer 1 has occurred to cause a maintenance reminder alert to be sent.

For instance, a first handheld computer 14 in wireless communication with the sprayer 1 may be configured to receive a first data indicative of spray volume output by sprayer 1 and transmit the first data indicative of spray volume to the network server 35. A second handheld computer 14 in subsequent wireless communication with the same sprayer 1 may be configured to receive a second data indicative of spray volume output by sprayer 1 generated from a second, subsequent use of the sprayer 1 and transmit the second data indicative of spray volume to the network server 35.

Network server 35 may be configured to update the spray volume maintenance log with the first data indicative of spray volume to generate a first instance of the spray volume maintenance log, compare the first instance of the spray volume maintenance log to the spray volume threshold, and determine that the first instance of the spray volume maintenance log is not greater than the spray volume threshold. Network server 35 may then subsequently update the spray volume maintenance log with the second data indicative of spray volume to generate a second instance of the spray volume maintenance log, compare the second instance of the spray volume maintenance log to the spray volume threshold, and cause the alert to be issued based on the second instance of the spray volume maintenance log being greater than the spray volume threshold.

Various alerts, reports, and data outputs are referenced herein. FIG. 18 is an example of a report that can be output such as on the handheld computer 14, the personal computer 29, or another device. As shown, each window of time is serialized. Each window represents a respective time period, and the respective time periods are shown. In this example, each time period is an hour. A spray volume is indicated for each time window corresponding to the volume sprayed which can be determined as discussed herein. In association with each time window, cleaning volume is also indicated which can be determined as discussed herein. In association with each time window, the metric of spray pressure is indicated. In particular, the average pressure for each time window is shown, however another pressure parameter could additionally or alternatively be indicated. Each time window is also associated with the particular job. The job could be selected before, during, or after the time window.

Job selection has been discussed herein for associated spray data with a particular job. Typically, when the job is selected, all subsequent time windows will have a spray data generated within the time window with the selected job until a command is received by the handheld computer 14 to disassociate the job with subsequent spray data and time windows, or a different job is selected, or in some embodiments if the location of the sprayer is moved out of range of the job (e.g., within a range of the job which is the same as the range for selecting the job as discussed herein). Also associated with each time window is the lifetime spray volume of the sprayer 1, measured in gallons in this example. Also, shown in association with each time window is the spray volume maintenance log value which can build towards the maintenance threshold. In this example, a packing replacement maintenance reminder was set for 100 gallons which was reached in time window 13260 at which time the maintenance notice was issued. An example maintenance notice is shown in FIG. 18 which can appear on an one or more interfaces 20 of a handheld computer 14 that is currently in a session with the sprayer 1. The report of FIG. 18 also shows daily totals for spray volume, cleaning volume, and daily average pressure which are based on the data for that day. The information of FIG. 18 can be issued as report on the handheld computer 14, the personal computer 29, or another device as previously stated. The report can be displayed live throughout the day as data is collected and the report is populated, and/or the report can be issued at the end of a spray session, at the day, and/or can be retrieved at a later day. The report can be saved in memory 16 of the handheld computer 14 and/or the memory 37 of the networks server 35 for retrieval and displayed and/or sent to another device.

FIG. 19 is an example of a report that can be output such as on the interface of a handheld computer 14, personal computer 29, or other device. The report of FIG. 19 can be a job report, containing only information pertaining to a particular job. Such information can be retrieved from a network server 35 by a handheld computer 14 or a personal computer 29 to track job progress.

In this case, the job has a name ("High School") and an identified location. In some cases, a job can have a serial number to uniquely identify which may be displayed in the report or only used by processors for uniquely identifying and avoiding confusion with common job names. The particular job report shown is for one day, although other job reports may cover multiple days. As shown, the day is broken up into time windows corresponding to respective hours. As shown, multiple sprayers contributed to the job report. Specifically, sprayer one and sprayer two contributed data. For each of the sprayers, spray volume, average pressure, and cleaning volume are shown for each hourly time window. The report also totals spray volume, averages the spray pressure, and totals cleaning volume for each sprayer for a day/time period. The report may further include a sum total spray volume for all sprayers that contributed spray volume data for that day or other time period, which in this case would be 39.9 (24.0+15.9). The report also includes a total spray volume calculated for each time window which sums all spray volume values amongst all the sprayers and time windows for the job. The report also includes a running total job spray volume. As shown, the total job spray volume carries over from a previous day (at 35.5 gallons) and increases throughout the day as both sprayers contribute. The sum total spray volume can be useful for understanding total productivity and cost.

Although not shown, the job report can include a work hours total. In this case, the processor can look through a spray log to determine and how many time windows was a sprayer spraying to output a total number of spray hours (or other interval such as quarter hours or minutes). It is noted that the total number spray hours might be calculated from data spanning several days and multiple sprayers. A work hours total can be useful for understanding labor costs and estimating future labor costs for the same project repeated in the future or similar projects.

FIG. 19 also shows two notices having been issued as part of the report. While the notices shown as being part of the report, notices can be issued separately from the report. The first notice indicates that the spray pressure exceeded a pressure limit. In this case, spray pressure is based off of an hourly spray pressure. Hourly spray pressure is compared against a threshold, as previously described, to determine whether the user sprayed above the spray threshold set by a supervisor. In this case, in the hour between 7 am and 8 am, sprayer 1 sprayed an hourly average of 3000 psi which is above the 2700 psi pressure limit set for the job by the supervisor. In this case, the hourly average (or other pressure metric for a time window) can be compared to a pressure threshold, and the alert issued if the hourly average or other pressure metric for the time window exceeds the pressure threshold. In some cases, the alert can include the identity of the user (e.g., using the identity of the user as registered) using the handheld computer 14 that is connected with the particular sprayer that exceeded the pressure limit. In this case, the alert indicates the pressure threshold, the pressure value that exceed the threshold, the identification of the sprayer, the time window during which the pressure limit was exceeded, and the job on which the pressure limit was exceeded.

FIG. 19 also includes a notice that the job spray volume has been exceeded. In setting up a job, a supervisor can input a volume limit or other threshold. As shown, the total job spray volume can be monitored from data from several sprayers over several days (or other time period) to track progress towards the job limit. As spray data associated with a particular job is received by the network server 35 the network 35 can compare the total job spray volume as it is updated with the job spray volume threshold previously set and can determine when the job spray volume threshold is met, and when met the network server 35 can send out an alert. In this case, the job limit of 75 gallons (set by the supervisor) was exceeded in the time window of 3-4 pm. The alert indicates the job spray volume threshold, the time window in which the threshold was met, and an identification of the job. The alert can be sent to each handheld computer 14 that is currently contributing spray data for the job or is otherwise logged into the job at the job site. The alert can also be sent to the handheld computer 14 and/or personal computer 29 associated with the manager for the job. In some cases, a daily report can be sent to the manager's handheld computer 14 and/or personal computer 29. The report can be generated and sent by the network computer 35. In some cases, the report can include the percentage to job completion (e.g., 75% complete, or other parameter indicating portion of job completion) based on current total job spray volume and a previously entered total spray volume expected for the job. The report can also include the average volume per hour as a metric of productivity amongst one sprayer or multiple sprayers (e.g., 6.5 gallons per hour for all sprayers on the job site, or a per sprayer 2.5 gallons per hour on the job site). Such a metric to be calculated by processor review in a spray log to determine the total spray volume for the job divided by the number of hours (or other time window duration) in which spray data was generated to determine the average volume sprayed her time window worked.

The type of data in the reports of FIGS. 18 and 19 are examples of data that a handheld computer 14 may ferry from a sprayer 1 while a user connects with the sprayer 1 and uses the sprayer 1 but that handheld computer does not allow the data of the report to be displayed on the one or more interfaces 20 for viewing by the user despite the handheld computer 14 of the user being trusted to ferry the data to the network server 35.

This disclosure contains references to data and other information that can be generated by sprayer 1, handheld computer 14, personal computer 29, and/or by network server 35. Any such data can be transmitted between these devices and other devices and infrastructure via the means disclosed herein. Any such data can be saved in memory of any of the sprayer 1, handheld computer 14, personal computer 29, and/or by network server 35. Any such data can be output by an interface of the sprayer 1, the handheld computer 14, the personal computer 29, and/or by the network server 35. This disclosure includes many different examples of options, and particular aspects of these options can be combined with other embodiments. Therefore it is contemplated that a single feature, which might be explained in a sentence or part of the sentence in connection with one of the embodiments and/or shown as one feature of a broader FIG., may be used in a separate embodiment without departing from the scope of this disclosure. Therefore, the embodiments presented herein are not to be understood as narrow and discrete examples of the only way that these feature(s) can be implemented, but rather are examples of some, but not all, of the ways the particular feature(s) can be implemented.

The present disclosure is made using several embodiments and examples to highlight various aspects. Modifications can be made to the embodiment presented herein without departing from techniques described in this disclosure. As such, the techniques are not limited to the embodiments disclosed herein.

The invention claimed is:

1. A spray system comprising:
   a sprayer for spraying spray fluid, the sprayer comprising:
      a pump that outputs spray paint under pressure for spraying;
      a motor that drives the pump;
      a drive cycle indicator configured to output a plurality of cycle status indications of the pump;
      a wireless module configured to wirelessly send and receive information; and
      control circuitry configured to receive the plurality of cycle status indications of the pump, determine a plurality of output values representing paint spray fluid output volume over a plurality of time windows based on the plurality of cycle status indications of the pump, store the plurality of output values in memory, and cause the wireless module to transmit one or more of the stored plurality of output values externally from the sprayer;
      wherein the control circuitry is configured to:
         determine a first fluid output value, associated with a first pressure, based on a first indication of the cycle status of the pump;
         determine a second fluid output value, associated with a second pressure, based on a second indication of the cycle status of the pump;
         determine that the first fluid output value is one of the output values representing spray fluid output volume based on the first pressure being greater than a threshold; and
         determine that the second fluid output value is not one of the output values representing spray fluid output volume based on the second pressure being less than the threshold;
         store the first fluid output value in a spray log tracking volume in the memory based on the determination that the first fluid output value is one of the output values representing spray fluid output volume; and
         not store the second fluid output value in the spray log tracking volume in the memory based on the determination that the second fluid output value is not one of the output values representing spray fluid output volume.

2. The spray system of claim 1, wherein the control circuitry is configured to determine whether pump cycles are associated with the sprayer operating in a fluid atomizing spray mode or a non-atomizing flushing mode, and wherein to determine the plurality of output values, the control circuitry is configured to, based on the pump cycles being associated with the fluid atomizing spray mode, determine the plurality of output values.

3. The spray system of claim 2, wherein the control circuitry is configured to determine whether the sprayer is operating in the fluid atomizing spray mode or the non-atomizing flushing mode based on at least one of:
   output from a pressure indicator to indicate the first pressure and the second pressure, or
   user selected operation modes that are respectively associated with the first pressure and the second pressure.

4. The spray system of claim 1, wherein to determine the plurality of output values, the control circuitry is configured to:
   determine whether one or more indications of the plurality of cycle status indications of the pump are associated with the sprayer being in a fluid atomizing spray mode in which the sprayer operates above the threshold or a non-spraying flushing mode in which the sprayer operates below the threshold; and
   determine one or more output values of the plurality of output value using the one or more indications of the plurality of cycle status indications associated with the sprayer being in the fluid atomizing spray mode.

5. The spray system of claim 1, wherein the control circuitry is further configured to determine a plurality of non-atomizing flushing output values, and wherein to determine the plurality of non-atomizing flushing output values, the control circuitry is configured to:
   determine whether one or more of the plurality of cycle status indications of the pump are associated with the sprayer being in a fluid atomizing spray mode in which the sprayer operates above the threshold or a non-atomizing flushing mode in which the sprayer operates below the threshold; and
   determine one or more non-atomizing flushing output values of the plurality of non-atomizing flushing output values, which includes the second fluid output value, using the one or more indications of the plurality of cycle status indications associated with the sprayer being in the non-spraying flushing mode.

6. The spray system of claim 5, wherein the control circuitry is configured to store the plurality of non-atomizing flushing output values in a cleaning log tracking volume in the memory.

7. The spray system of claim 1, wherein to store the plurality of output values in the memory, the control circuitry is configured to store the plurality of output values in the spray log tracking volume in the memory.

8. The sprayer system of claim 1, wherein the control circuitry is configured to:
store the second fluid output value in a cleaning log tracking volume in the memory based on the determination that the second fluid output value is not one of the output values representing spray fluid output volume; and
not store the first fluid output value in the cleaning log tracking volume in the memory based on the determination that the first fluid output value is one of the output values representing spray fluid output volume.

9. The sprayer system of claim 1, wherein the plurality of output values comprises a plurality of spray volume values respectively representing the volumes of paint sprayed within the plurality of time windows, and wherein for each time window of the plurality of time windows, the control circuitry is configured to open the time window, calculate and recalculate the spray fluid output value as a running value for each increase in the plurality of cycle status indications received within the window, and close the window with the running value at close of the window being the spray fluid output value for the time window.

10. The sprayer system of claim 1, wherein the pump is a piston pump, and wherein the plurality of cycle status indications of the pump output by the drive cycle indicator indicates one or both of a partial cycle or a full cycle of a piston of the piston pump.

11. The sprayer system of claim 1, wherein to generate the plurality of cycle status indications of the pump, the drive cycle indicator is configured to, at least one of:
sense position of a reciprocating part of the pump to generate each cycle status indication of the pump, or
sense position of a component of a drive to generate each cycle status indication of the pump, wherein the drive converts rotational motion output by the motor to reciprocating motion which drives the pump.

12. The sprayer system of claim 1, wherein the drive cycle indicator senses position of a component of the motor to generate the plurality of cycle status indications of the pump.

13. The sprayer system of claim 1, further comprising a handheld computer, wherein the wireless module is configured to wirelessly communicate with the handheld computer, and wherein the control circuitry is configured to receive a request via the wireless module for the handheld computer to send one or more of the stored plurality of output values to the handheld computer, and in response to the request, send one or more of the stored plurality of output values to the handheld computer via the wireless module.

14. The sprayer system of claim 1, further comprising a network server, the network server configured to receive and store in memory of the network server the plurality of output values.

15. The sprayer system of claim 3, wherein the first pressure and the second pressure are based on indications of fluid pressure output by the pressure indicator which measures fluid pressure.

16. The sprayer system of claim 1, wherein the first pressure and the second pressure are determined based on a setting and not from a measured fluid pressure.

17. The sprayer system of claim 1, wherein the threshold is between 5-500 pounds per square inch.

18. The sprayer system of claim 1, further comprising an interface, wherein the control circuitry is configured to cause the interface to display one or more spray volume values based on the spray log tracking volume.

19. The sprayer system of claim 8, further comprising an interface, wherein the control circuitry is configured to cause the interface to display one or more spray volume values based on the spray log tracking volume, and to cause the interface to display one or more cleaning volume values based on the cleaning log tracking volume.

20. The sprayer system of claim 1, wherein the control circuitry is distributed between the sprayer and a computing device external from the sprayer.

21. The sprayer system of claim 1, wherein the control circuitry, including the memory, is located on the sprayer, and the control circuitry is configured to cause the wireless module to transmit the one or more of the stored plurality of output values externally from the sprayer including the spray log tracking volume.

22. The sprayer system of claim 1, wherein the plurality of output values represent paint spray fluid output volume respectively within the plurality of time windows.

23. The sprayer system of claim 1, wherein the control circuitry uses the spray log tracking volume to determine an output value of the plurality of output values.

24. The sprayer system of claim 1, wherein the spray log tracking volume represents a total spray volume output during a time window of the plurality of time windows.

25. The sprayer system of claim 24, wherein the total spray volume is determined based on the plurality of cycle status indications of the pump that were generated during the time window.

26. The sprayer system of claim 25, wherein the total spray volume is determined based on which of the plurality of cycle status indications of the pump are associated with pressure being greater than the threshold.

27. The sprayer system of claim 24, wherein the spray log tracking volume is a running total incremented based on which of the plurality of cycle status indications of the pump were generated during the time window.

28. The sprayer system of claim 27, wherein the running total is incremented based on which of the plurality of cycle status indications of the pump are associated with pressure being greater than the threshold.

29. The sprayer system of claim 1, wherein the spray log tracking volume is one of a plurality of spray logs tracking volume.

30. The sprayer system of claim 29, wherein the plurality of spray logs tracking volume represent volume sprayed respectively within the plurality of time windows.

31. A spray system comprising:
a sprayer for spraying spray fluid, the sprayer comprising:
a pump that outputs spray paint under pressure for spraying;
a motor that drives the pump;
a drive cycle indicator configured to output a plurality of cycle status indications of the pump;
a wireless module configured to wirelessly send and receive information; and
control circuitry configured to receive the plurality of cycle status indications of the pump, determine a plurality of output values representing paint spray fluid output volume over a plurality of time windows based on the plurality of cycle status indications of the pump, store the plurality of output values in memory, and cause the wireless module to transmit one or more of the stored plurality of output values externally from the sprayer;

wherein the control circuitry is configured to:
- determine a first fluid output value, associated with a first pressure, based on a first indication of the cycle status of the pump;
- determine a second fluid output value, associated with a second pressure, based on a second indication of the cycle status of the pump;
- determine that the first fluid output value is one of the output values representing spray fluid output volume based on the first pressure being greater than a threshold; and
- determine that the second fluid output value is not one of the output values representing spray fluid output volume based on the second pressure being less than the threshold;
- store the second fluid output value in a cleaning log tracking volume in the memory based on the determination that the second fluid output value is not one of the output values representing spray fluid output volume; and
- not store the first fluid output value in the cleaning log tracking volume in the memory based on the determination that the first fluid output value is one of the output values representing spray fluid output volume.

* * * * *